(12) United States Patent
Mousseau et al.

(10) Patent No.: US 7,953,802 B2
(45) Date of Patent: ***May 31, 2011

(54) SYSTEM AND METHOD FOR PUSHING INFORMATION FROM A HOST SYSTEM TO A MOBILE DATA COMMUNICATION DEVICE

(75) Inventors: Gary P. Mousseau, Waterloo (CA); Tabitha Ferguson, Waterloo (CA); Barry Linkert, Petersburg (CA); Raymond Vander Veen, Kitchener (CA); William D. Castell, Waterloo (CA); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1465 days.

This patent is subject to a terminal disclaimer.

(21) Appl. No.: 11/300,040

(22) Filed: Dec. 14, 2005

(65) Prior Publication Data

US 2006/0095525 A1    May 4, 2006

Related U.S. Application Data

(63) Continuation-in-part of application No. 09/087,623, filed on May 29, 1998, now Pat. No. 6,219,694, and a continuation-in-part of application No. 09/545,963, filed on Apr. 10, 2000, now Pat. No. 6,779,019.

(51) Int. Cl.
*G06F 15/16* (2006.01)
*G06F 3/00* (2006.01)
(52) U.S. Cl. ....................... 709/206; 715/752
(58) Field of Classification Search .................. 709/206; 715/752

See application file for complete search history.

(56) References Cited

U.S. PATENT DOCUMENTS

| | | | |
|---|---|---|---|
| 4,106,060 A | 8/1978 | Chapman, Jr. | |
| 4,417,349 A | 11/1983 | Hills et al. | |
| 4,438,433 A | 3/1984 | Smoot et al. | |

(Continued)

FOREIGN PATENT DOCUMENTS

AU        7843498        2/1999

(Continued)

OTHER PUBLICATIONS

Carthy et al., MAPI Developers Forum post "MAPI Notification", Apr. 12, 1996.*

(Continued)

*Primary Examiner* — Aaron Strange
(74) *Attorney, Agent, or Firm* — The Danamraj Law Group, P.C.

(57) ABSTRACT

A system and method of pushing user-selected data items from a host system to a user's mobile data communication device upon detecting the occurrence of one or more user-defined event triggers is provided. The user may then move (or file) the data items to a particular folder within a folder hierarchy stored in the mobile data communication device, or may execute some other system operation on the data item. Software operating at the mobile device and the host system then synchronizes the folder hierarchy of the mobile device with a folder hierarchy of the host system, and any actions executed on the data items at the mobile device are then automatically replicated on the same data items stored at the host system, thus eliminating the need for the user to manually replicate actions at the host system that have been executed at the mobile data communication device.

23 Claims, 32 Drawing Sheets

U.S. PATENT DOCUMENTS

| | | |
|---|---|---|
| 4,558,454 A | 12/1985 | Hills et al. |
| 4,644,351 A | 2/1987 | Zabarsky et al. |
| 4,695,880 A | 9/1987 | Johnson et al. |
| 4,697,281 A | 9/1987 | O'Sullivan |
| 4,713,780 A | 12/1987 | Schultz et al. |
| 4,768,087 A | 8/1988 | Taub et al. |
| 4,837,798 A | 6/1989 | Cohen et al. |
| 4,837,800 A | 6/1989 | Freeburg et al. |
| 4,845,658 A | 7/1989 | Gifford |
| 4,856,047 A | 8/1989 | Saunders |
| 4,928,096 A | 5/1990 | Leonardo et al. |
| 4,951,044 A | 8/1990 | Nelson et al. |
| 4,972,457 A | 11/1990 | O'Sullivan |
| 4,980,907 A | 12/1990 | Raith et al. |
| 5,008,926 A | 4/1991 | Misholi |
| 5,043,721 A | 8/1991 | May |
| 5,058,431 A | 10/1991 | Karwacki |
| 5,068,916 A | 11/1991 | Harrison et al. |
| 5,086,502 A | 2/1992 | Malcolm |
| 5,125,021 A | 6/1992 | Lebowitz |
| 5,127,041 A | 6/1992 | O'Sullivan |
| 5,128,981 A | 7/1992 | Tsukamoto et al. |
| 5,136,291 A | 8/1992 | Teague |
| 5,157,660 A | 10/1992 | Kuwahara et al. |
| 5,159,592 A | 10/1992 | Perkins |
| 5,177,680 A | 1/1993 | Tsukino et al. |
| 5,181,200 A | 1/1993 | Harrison |
| 5,210,785 A | 5/1993 | Sato et al. |
| 5,265,033 A | 11/1993 | Vajk et al. |
| 5,283,887 A | 2/1994 | Zachery |
| 5,293,253 A | 3/1994 | Okumura et al. |
| 5,299,255 A | 3/1994 | Iwaki et al. |
| 5,307,059 A | 4/1994 | Connary et al. |
| 5,313,582 A | 5/1994 | Hendel et al. |
| 5,315,635 A | 5/1994 | Kane et al. |
| 5,333,152 A | 7/1994 | Wilber |
| 5,333,266 A | 7/1994 | Boaz et al. |
| 5,370,566 A | 12/1994 | Mitchell, Jr. et al. |
| 5,392,390 A | 2/1995 | Crozier |
| 5,406,557 A | 4/1995 | Baudoin |
| 5,410,543 A | 4/1995 | Seitz et al. |
| 5,416,473 A | 5/1995 | Dulaney, III et al. |
| 5,416,842 A | 5/1995 | Aziz |
| 5,436,960 A | 7/1995 | Campana, Jr. et al. |
| 5,438,011 A | 8/1995 | Blalock et al. |
| 5,438,611 A | 8/1995 | Campana, Jr. et al. |
| 5,452,356 A | 9/1995 | Albert |
| 5,479,472 A | 12/1995 | Campana, Jr. et al. |
| 5,487,100 A | 1/1996 | Kane |
| 5,493,692 A | 2/1996 | Theimer et al. |
| 5,495,484 A | 2/1996 | Self et al. |
| 5,548,789 A | 8/1996 | Nakanura |
| 5,557,659 A | 9/1996 | Hyde-Thomson |
| 5,559,800 A | 9/1996 | Mousseau et al. |
| 5,572,528 A | 11/1996 | Shuen |
| 5,579,472 A | 11/1996 | Keyworth, II et al. |
| 5,588,009 A | 12/1996 | Will |
| 5,598,536 A | 1/1997 | Slaughter, III et al. |
| 5,603,054 A | 2/1997 | Theimer et al. |
| 5,604,491 A | 2/1997 | Coonley et al. |
| 5,604,788 A | 2/1997 | Tett |
| 5,613,108 A | 3/1997 | Morikawa |
| 5,625,670 A | 4/1997 | Campana, Jr. et al. |
| 5,627,829 A | 5/1997 | Gleeson et al. |
| 5,630,060 A | 5/1997 | Tang et al. |
| 5,631,946 A | 5/1997 | Campana, Jr. et al. |
| 5,633,810 A | 5/1997 | Mandal et al. |
| 5,638,450 A | 6/1997 | Robson |
| 5,641,946 A | 6/1997 | Shim |
| 5,666,530 A | 9/1997 | Clark et al. |
| 5,666,553 A | 9/1997 | Crozier |
| 5,673,322 A | 9/1997 | Pepe et al. |
| 5,701,423 A | 12/1997 | Crozier |
| 5,705,995 A | 1/1998 | Laflin et al. |
| 5,706,211 A | 1/1998 | Beletic et al. |
| 5,727,202 A | 3/1998 | Kucala |
| 5,729,735 A | 3/1998 | Meyering |
| 5,737,531 A | 4/1998 | Ehley |
| 5,742,668 A | 4/1998 | Pepe et al. |
| 5,742,905 A | 4/1998 | Pepe et al. |
| 5,745,689 A | 4/1998 | Yeager et al. |
| 5,751,960 A | 5/1998 | Matsunaga |
| 5,751,971 A | 5/1998 | Dobbins et al. |
| 5,754,954 A | 5/1998 | Cannon et al. |
| 5,757,901 A | 5/1998 | Hiroshige |
| 5,758,088 A | 5/1998 | Bezaire et al. |
| 5,758,150 A | 5/1998 | Bell et al. |
| 5,761,416 A | 6/1998 | Mandal et al. |
| 5,764,639 A | 6/1998 | Staples et al. |
| 5,764,899 A | 6/1998 | Eggleston et al. |
| 5,765,170 A | 6/1998 | Morikawa |
| 5,771,353 A | 6/1998 | Eggleston et al. |
| 5,781,614 A | 7/1998 | Brunson |
| 5,781,901 A | 7/1998 | Kuzma |
| 5,790,790 A | 8/1998 | Smith et al. |
| 5,790,974 A | 8/1998 | Tognazzini |
| 5,796,806 A | 8/1998 | Birckbichler |
| 5,805,298 A | 9/1998 | Ho et al. |
| 5,812,671 A | 9/1998 | Ross, Jr. |
| 5,812,773 A | 9/1998 | Norin |
| 5,812,819 A | 9/1998 | Rodwin et al. |
| 5,813,016 A | 9/1998 | Sumimoto |
| 5,815,081 A | 9/1998 | Motohashi |
| 5,819,172 A | 10/1998 | Campana, Jr. et al. |
| 5,819,284 A | 10/1998 | Farber et al. |
| 5,822,434 A | 10/1998 | Caronni et al. |
| 5,826,062 A | 10/1998 | Fake, Jr. et al. |
| 5,831,664 A | 11/1998 | Wharton et al. |
| 5,838,252 A | 11/1998 | Kikinis |
| 5,838,926 A | 11/1998 | Yamagishi |
| 5,844,969 A | 12/1998 | Goldman et al. |
| 5,850,219 A | 12/1998 | Kumomura |
| 5,850,444 A | 12/1998 | Rune |
| 5,862,321 A | 1/1999 | Lamming et al. |
| 5,862,325 A | 1/1999 | Reed et al. |
| 5,867,660 A | 2/1999 | Schmidt et al. |
| 5,878,434 A | 3/1999 | Draper et al. |
| 5,881,235 A | 3/1999 | Mills |
| 5,889,845 A | 3/1999 | Staples et al. |
| 5,889,943 A | 3/1999 | Ji et al. |
| 5,900,875 A | 5/1999 | Haitani et al. |
| 5,903,723 A | 5/1999 | Beck et al. |
| 5,905,777 A | 5/1999 | Foladare et al. |
| 5,913,040 A | 6/1999 | Rakavy et al. |
| 5,917,629 A | 6/1999 | Hortensius et al. |
| 5,928,329 A | 7/1999 | Clark et al. |
| 5,937,161 A | 8/1999 | Mulligan et al. |
| 5,941,954 A | 8/1999 | Kalajan |
| 5,941,956 A | 8/1999 | Shirakihara et al. |
| 5,943,426 A | 8/1999 | Frith et al. |
| 5,948,066 A | 9/1999 | Whalen et al. |
| 5,951,636 A | 9/1999 | Zerber |
| 5,953,322 A | 9/1999 | Kimball |
| 5,958,006 A * | 9/1999 | Eggleston et al. ............ 709/219 |
| 5,960,406 A | 9/1999 | Rasansky et al. |
| 5,961,590 A | 10/1999 | Mendez et al. |
| 5,964,833 A | 10/1999 | Kikinis |
| 5,966,663 A | 10/1999 | Gleason |
| 5,966,714 A | 10/1999 | Huang et al. |
| 5,968,131 A | 10/1999 | Mendez et al. |
| 5,969,636 A | 10/1999 | Parvulescu et al. |
| 5,973,612 A | 10/1999 | Deo et al. |
| 5,974,180 A | 10/1999 | Schwendeman |
| 5,974,238 A | 10/1999 | Chase, Jr. |
| 5,974,449 A | 10/1999 | Chang et al. |
| 5,978,689 A | 11/1999 | Tuoriniemi et al. |
| 5,978,837 A | 11/1999 | Foladare et al. |
| 5,983,073 A | 11/1999 | Ditzik |
| 5,987,100 A | 11/1999 | Fortman et al. |
| 5,987,508 A | 11/1999 | Agraharam et al. |
| 5,995,597 A | 11/1999 | Woltz et al. |
| 6,000,000 A | 12/1999 | Hawkins et al. |
| 6,002,427 A | 12/1999 | Kipust |
| 6,002,769 A | 12/1999 | McGough |
| 6,006,274 A | 12/1999 | Hawkins et al. |
| 6,009,173 A | 12/1999 | Sumner |
| 6,009,455 A | 12/1999 | Doyle |

| | | | |
|---|---|---|---|
| 6,014,429 A | 1/2000 | Laporta et al. | |
| 6,016,478 A | 1/2000 | Zhang et al. | |
| 6,018,762 A | 1/2000 | Brunson et al. | |
| 6,018,782 A | 1/2000 | Hartmann | |
| 6,023,700 A | 2/2000 | Owens et al. | |
| 6,023,708 A | 2/2000 | Mendez et al. | |
| 6,034,621 A | 3/2000 | Kaufman | |
| 6,035,104 A | 3/2000 | Zahariev | |
| 6,044,205 A | 3/2000 | Reed et al. | |
| 6,052,442 A | 4/2000 | Cooper et al. | |
| 6,052,563 A | 4/2000 | Macko | |
| 6,052,735 A | 4/2000 | Ulrich et al. | |
| 6,058,431 A | 5/2000 | Srisuresh et al. | |
| 6,067,561 A | 5/2000 | Dillon | |
| 6,072,862 A | 6/2000 | Srinivasan | |
| 6,073,137 A | 6/2000 | Brown et al. | |
| 6,073,165 A | 6/2000 | Narasimhan et al. | |
| 6,078,826 A | 6/2000 | Croft et al. | |
| 6,078,921 A | 6/2000 | Kelley | |
| 6,084,969 A | 7/2000 | Wright et al. | |
| 6,085,192 A | 7/2000 | Mendez et al. | |
| 6,085,231 A | 7/2000 | Agraharam et al. | |
| 6,085,232 A | 7/2000 | Kikinis | |
| 6,091,951 A | 7/2000 | Sturniolo et al. | |
| 6,092,114 A | 7/2000 | Shaffer et al. | |
| 6,092,191 A | 7/2000 | Shimbo et al. | |
| 6,101,531 A | 8/2000 | Eggleston et al. | |
| 6,112,244 A | 8/2000 | Moore et al. | |
| 6,115,394 A | 9/2000 | Balachandran et al. | |
| 6,115,736 A | 9/2000 | Devarakonda et al. | |
| 6,115,754 A | 9/2000 | Landgren | |
| 6,119,167 A | 9/2000 | Boyle et al. | |
| 6,125,281 A | 9/2000 | Wells et al. | |
| 6,125,369 A | 9/2000 | Wu et al. | |
| 6,128,739 A | 10/2000 | Fleming, III | |
| 6,130,892 A | 10/2000 | Short et al. | |
| 6,131,096 A | 10/2000 | Ng et al. | |
| 6,131,116 A | 10/2000 | Riggins et al. | |
| 6,134,432 A | 10/2000 | Holmes et al. | |
| 6,138,089 A | 10/2000 | Guberman | |
| 6,138,146 A | 10/2000 | Moon et al. | |
| 6,141,690 A | 10/2000 | Weiman | |
| 6,144,671 A | 11/2000 | Perinpanathan et al. | |
| 6,144,997 A | 11/2000 | Lamming et al. | |
| 6,151,606 A | 11/2000 | Mendez | |
| 6,154,839 A | 11/2000 | Arrow et al. | |
| 6,157,318 A | 12/2000 | Minata | |
| 6,157,630 A | 12/2000 | Adler et al. | |
| 6,157,950 A | 12/2000 | Krishnan | |
| 6,161,140 A | 12/2000 | Moriya | |
| 6,163,274 A | 12/2000 | Lindgren | |
| 6,167,379 A | 12/2000 | Dean et al. | |
| 6,170,057 B1 | 1/2001 | Inoue et al. | |
| 6,178,331 B1 | 1/2001 | Holmes et al. | |
| 6,185,551 B1 | 2/2001 | Birrell et al. | |
| 6,185,603 B1 | 2/2001 | Henderson et al. | |
| 6,195,533 B1 | 2/2001 | Tkatch et al. | |
| 6,202,085 B1 | 3/2001 | Benson et al. | |
| 6,203,192 B1 | 3/2001 | Fortman | |
| 6,205,448 B1 | 3/2001 | Kruglikov et al. | |
| 6,208,996 B1 | 3/2001 | Ben-Shachar et al. | |
| 6,219,694 B1 | 4/2001 | Lazaridis et al. | |
| 6,222,942 B1 | 4/2001 | Martin | |
| 6,233,318 B1* | 5/2001 | Picard et al. | 379/88.17 |
| 6,233,341 B1 | 5/2001 | Riggins | |
| 6,240,088 B1 | 5/2001 | Gayton et al. | |
| 6,249,820 B1 | 6/2001 | Dobbins et al. | |
| 6,256,666 B1 | 7/2001 | Singhal | |
| 6,263,201 B1 | 7/2001 | Hashimoto et al. | |
| 6,272,545 B1 | 8/2001 | Flanagin et al. | |
| 6,275,848 B1 | 8/2001 | Arnold | |
| 6,275,850 B1 | 8/2001 | Beyda et al. | |
| 6,289,105 B1* | 9/2001 | Murota | 380/286 |
| 6,289,212 B1 | 9/2001 | Stein et al. | |
| 6,292,668 B1 | 9/2001 | Alanara et al. | |
| 6,311,282 B1 | 10/2001 | Nelson et al. | |
| 6,313,734 B1 | 11/2001 | Weiss et al. | |
| 6,314,108 B1 | 11/2001 | Ramasubramani et al. | |
| 6,314,519 B1 | 11/2001 | Davis et al. | |
| 6,324,544 B1 | 11/2001 | Alam et al. | |
| 6,324,569 B1 | 11/2001 | Ogilvie et al. | |
| 6,324,587 B1 | 11/2001 | Trenbeath et al. | |
| 6,327,046 B1 | 12/2001 | Miyamoto et al. | |
| 6,330,244 B1 | 12/2001 | Swartz et al. | |
| 6,332,156 B1 | 12/2001 | Cho et al. | |
| 6,333,973 B1 | 12/2001 | Smith et al. | |
| 6,356,937 B1 | 3/2002 | Montville et al. | |
| 6,356,956 B1 | 3/2002 | Deo et al. | |
| 6,360,272 B1 | 3/2002 | Lincke et al. | |
| 6,363,352 B1 | 3/2002 | Dailey et al. | |
| 6,370,566 B2 | 4/2002 | Discolo et al. | |
| 6,389,455 B1 | 5/2002 | Fuisz | |
| 6,389,457 B2 | 5/2002 | Lazaridis et al. | |
| 6,400,958 B1 | 6/2002 | Isomursu et al. | |
| 6,401,113 B2 | 6/2002 | Lazaridis et al. | |
| 6,438,585 B2 | 8/2002 | Mousseau et al. | |
| 6,442,589 B1 | 8/2002 | Takahashi et al. | |
| 6,449,287 B1 | 9/2002 | Leuca et al. | |
| 6,463,463 B1 | 10/2002 | Godfrey et al. | |
| 6,463,464 B1 | 10/2002 | Lazaridis et al. | |
| 6,470,358 B1 | 10/2002 | Beyda et al. | |
| 6,484,196 B1* | 11/2002 | Maurille | 709/206 |
| 6,487,560 B1 | 11/2002 | LaRue et al. | |
| 6,505,055 B1 | 1/2003 | Kahn et al. | |
| 6,505,214 B1 | 1/2003 | Sherman et al. | |
| 6,580,787 B1 | 6/2003 | Akhteruzzaman et al. | |
| 6,611,358 B1 | 8/2003 | Narayanaswamy | |
| 6,701,378 B1 | 3/2004 | Gilhuly et al. | |
| 6,741,855 B1 | 5/2004 | Martin et al. | |
| 6,763,202 B2 | 7/2004 | Maeda | |
| 6,779,019 B1 | 8/2004 | Mousseau et al. | |
| 6,792,085 B1* | 9/2004 | Rigaldies et al. | 379/88.13 |
| 7,058,683 B1* | 6/2006 | Belissent et al. | 709/206 |
| 7,386,588 B2 | 6/2008 | Mousseau et al. | |
| 2001/0001552 A1 | 5/2001 | Vong et al. | |
| 2001/0015977 A1 | 8/2001 | Johansson | |
| 2001/0029531 A1 | 10/2001 | Ohta | |
| 2001/0040693 A1 | 11/2001 | Saito et al. | |
| 2001/0042093 A1 | 11/2001 | Shirai et al. | |
| 2001/0045885 A1 | 11/2001 | Tett | |
| 2001/0054072 A1 | 12/2001 | Discolo et al. | |
| 2002/0059380 A1 | 5/2002 | Biliris et al. | |
| 2003/0097361 A1 | 5/2003 | Huang et al. | |

FOREIGN PATENT DOCUMENTS

| | | |
|---|---|---|
| DE | 19961345 | 12/1999 |
| EP | 0001552 | 5/1979 |
| EP | 0617373 | 9/1994 |
| EP | 0736989 | 10/1996 |
| EP | 0736989 A | 10/1996 |
| EP | 0772327 | 5/1997 |
| EP | 0777394 | 6/1997 |
| EP | 0788287 | 8/1997 |
| EP | 0793387 | 9/1997 |
| EP | 0825788 | 2/1998 |
| EP | 0838774 | 4/1998 |
| EP | 0838934 | 4/1998 |
| EP | 0918417 | 5/1999 |
| EP | 0930766 | 7/1999 |
| EP | 0986225 | 3/2000 |
| EP | 1096725 | 5/2001 |
| JP | 9305155 | 1/1997 |
| JP | 9214556 | 8/1997 |
| JP | 11289346 | 10/1999 |
| WO | 9619064 | 6/1996 |
| WO | WO 9703341 | 1/1997 |
| WO | 9708904 A1 | 3/1997 |
| WO | 9726709 | 7/1997 |
| WO | 9727717 | 7/1997 |
| WO | WO 97/28518 | 8/1997 |
| WO | 9732251 | 9/1997 |
| WO | 9733421 | 9/1997 |
| WO | 9741654 | 11/1997 |
| WO | 9744942 | 11/1997 |
| WO | 9749251 | 12/1997 |
| WO | 9800787 | 1/1998 |
| WO | WO 9807897 | 1/1998 |
| WO | 9821911 | 5/1998 |

| | | |
|---|---|---|
| WO | 9823108 | 5/1998 |
| WO | 9826344 | 6/1998 |
| WO | 9848560 | 10/1998 |
| WO | 9905620 | 2/1999 |
| WO | 9905813 | 2/1999 |
| WO | 9906900 | 2/1999 |
| WO | 9912365 | 3/1999 |
| WO | 9917505 | 4/1999 |
| WO | 9919988 | 4/1999 |
| WO | 9936870 | 7/1999 |
| WO | 9945484 | 9/1999 |
| WO | 9945684 | 9/1999 |
| WO | 9948312 | 9/1999 |
| WO | 9950974 | 10/1999 |
| WO | 9963709 | 12/1999 |
| WO | 0011567 | 3/2000 |
| WO | 0011832 | 3/2000 |
| WO | 0020994 | 4/2000 |
| WO | 0031931 | 6/2000 |
| WO | 0041359 | 7/2000 |
| WO | WO 00/49819 | 8/2000 |
| WO | WO 01/01264 | 1/2001 |
| WO | 0113572 | 2/2001 |
| WO | 0113656 | 2/2001 |
| WO | 0122669 | 3/2001 |
| WO | 0141472 | 6/2001 |
| WO | 0167716 | 9/2001 |
| WO | 0171539 | 9/2001 |

OTHER PUBLICATIONS

Levitt et al., "IMAP Servers: What differentiates standards-based messaging systems?", 1997, in Proc. of JENC8 8th Joint European Networking Conference, pp. 722-1 to 722-8.*
Feibus, "A Desktop in Your Palm", Informationweek, Aug. 25, 1997, pp. 65ff.
Behr, "Handheld Solutions", Informationweek, Oct. 27, 1997, pp. 106-113.
Moody's Investors Service, Socket Communications Inc.—History & Debt, Investex Report No. 3240276.
Newsletter, E-Mail Merges With Voice Through Infinite Technologies, Voice Technology & Services News, May 26, 1998.
Newsletter, VODAPAGE: Vodapage demos increasing convergence of pagers and mobile communications at TMA 29, M2 Presswire, Nov. 28, 1996.
Mosher, Microsoft Exchange User's Handbook, Duke Press, 1997, pp. 547-549.
DTS Wireless Website located at D.R.L. http://www.dtswireless.com.
"3Com PalmPilot Gets Wireless Link for E-Mail", Spooner, John G., PC Week, Dec. 8, 1997.
"Have Your Pager Call My Pager", Sullivan, Kristina B., PC Week, Dec. 8, 1997.
Briere, Daniel, et al., "One Mailbox, Just Like Old Times," Network World, vol. 14, issue 16, p. 21 (Apr. 21, 1997).
Padwick, et al., Special Edition Using Microsoft Outlook 97, 1997, Que Corporation, pp. 250-251, 353-367.
News Release, "Motorola Rings in 1995 with the Launch of the Marco® Wireless Communicator," Jan. 4, 1995 (4 pgs.).
Timeline, "FLEX™ Technology Timeline," (3 pgs.).
General Magic, Inc., Corporate Backgrounder, 2001 (2 pgs.).
Pegasus Email Settings, ABSnet Internet Services, Inc. (4 pgs.).
Motorola, Inc., emailVClient, 2001 (4 pages).
News Release, "Motorola Announces Pagewriter 250, the World's Smallest Pager with Full Keyboard", Feb. 27, 1997 (2 pgs.).
Dewey, Barney, "Communications Strategies for Newton 2.0," Newton Technology Journal, p. 10, Jun. 1996.
Press Release, "Motorola Announces New Solutions to Provide Consumers with Wireless Access to Personal and Enterprise E-mail Accounts," Mar. 21, 2001 (4 pgs.).
"Motorola's 'Marco' Wireless Communicator," http://www.msu.edu/-luckie/gallery/marco.htm, Jun. 14, 2001 (3 pgs.).
News Release, "CE Software Announces MobileVision," Editorial Contacts, CE Software, Inc., 1995 (3 pgs.).
News Release, "CE Software Ships MobileVision," Jun. 20, 1995 (3 pgs.).
Newton Reference, Communications, 1996-1997(4 pgs.).
PC Pro Issue 31: Realworld Computing, PDA Column, Jul. 30, 1997 (7 pgs.).
Enterprise Solutions for Email Overload, Founder Publications, http://www.amikanow.com/corporte/publications.htm, Aug. 6, 2001 (9 pgs.).
"Motorola's 'Marco' Wireless Communicator," http://www.msu.edu/-luckie/gallery/marco.htm, Aug. 6, 2001 (2 pgs.).
Press Release, "Apple Agrees to License Newton Technology to Schlumberger, Digital Ocean," Nov. 3, 1995 (3 pgs.).
Frezza, Bill, "PDA, PDA, Wherefore Art Thou, PDA?", Freewire, Aug. 6, 2001 (6 pgs.).
Black, Lauren, et al., "Personal Digital Assistants," Macworld Reviews, Aug. 6, 2001 (5 pgs.).
Reference, "MobileVision Direct Wireless Connection to Your LAN-Based Electronic Mailbox," CE Software, Inc., pp. 1, 3, 5, 7, 9, 11, 13, 15, 17, 19, 21, 1995.
User Manual, "MobileVision Direct Wireless Connection to Your LAN-Based Electronic Mailbox," CE Software, Inc. 1995.
Johnson, David B., "Ubiquitous Mobile Host Internetworking," Fourth Workshop on Workstation Operating Systems, pp. 85-90, Oct. 14-15, 1993.
Johnson, David B., "Mobile Host Internetworking Using IP Loose Source Routing," School of Computer Science, Carnegie Mellon University, pp. 1-14 Feb. 1993.
Schoettle, Bob, "IP-Address Management on LANs," Byte, pp. 199-200, Feb. 1996.
Cheshire, Stuart, et al., "Internet Mobility 4×4," Computer Science Department, Stanford University, pp. 1-12, Aug. 1996.
Yeom, Hoen Y., et al., "IP Multiplexing by Transparent Port-Address Translator," Proceedings of the Tenth USENIX System Administration Conference, pp. 113-122, Sep. 29-Oct. 4, 1996.
Johnson, David B., "Scalable and Robust Internetwork Routing for Mobile Hosts," IEEE Computer Society, pp. 2-11, 1994.
Egevang, K. et al., "The IP Network Address Translator," Network Working Group, pp. 1-10, May 1994.
Manual, "Server and BBS Software for the Packet Radio" by Jean Paul Roubelat, pp. 1-173.
Book, "Intenetwork Mobility The CDPD Approach," by Mark S. Taylor, William Waung, and Mohsen Banan, Jun. 11, 1996.
"BlackBerry Technical White Paper," Research in Motion Ltd., Version 1.0, 1998-1999.
Newsletter, "Battery Friendly Bulletin," vol. 1, Issue 3, pp. 1-7 and unnumbered page, 1999.
Article, Comerford, "Handhelds Duke it out for the Internet," Wireless Internet, pp. 35-38 and 41, Aug. 2000.
Press Detail, "Extended Systems and Motorola Bring Short-Range Wireless to the Paging E-volution," Jan. 13, 2000 (3 pgs.).
Press Detail, "3Com Corporation Licenses Bluetooth Technology from Extended Systems," Feb. 22, 2000 (2 pgs.).
Web site Article, Hawaleshka, "The Web in Your Pocket," Maclean's, May 15, 2000 (3 pgs.).
Claxton, "Messaging API's for Voice Networks," Telecommunications, pp. 116-120, 1998.
Gifford, David K., et al., "The Application of Digital Broadcast Communication to Large Scale Information Systems," IEEE Journal on Selected Areas in Communications, vol. SAC-3, No. 3, pp. 457-467 (May 1985).
Gifford, David K., et al., "An Architecture for Large Scale Information Systems," ACM, pp. 161-170 (1985).
Amum, Eric, "The Universal Mailbox Arrives . . . Sort of," Business Communications Review, pp. 49-52 (May 1996).
"Wireless E-Mail Services Gain Windows Clients," Kramer, Matt, PC Week, Apr. 17, 1995.
Perkins, C. et al., "IMHP: A Mobile Host Protocol for the Internet," Computer Networks and ISDN Systems 27 (1994), pp. 479-491.
Inouye, Jon et al., "System Support for Mobile Multimedia Applications," Proceedings of the IEEE $7^{th}$ International Workshop on Network and Operating System Support for Digital Audio and Video, May 19-21, 1997, pp. 135-146.

Xu, Kevin Houzhi, "Reliable Stream Transmission Protocols in Mobile Computing Environments," Bell Labs Technical Journal, Summer 1997, pp. 152-163.

Lavana, Hemang et al.., "Internet-Based Workflows: A Paradigm for Dynamically Reconfigurable Desktop Environments," Conference on Supporting Group Work, Proceedings of the International ACM SIGGROUP Conference on Supporting Group Work: The Integration Challenge, Nov. 16-19, 1997, pp. 204-213.

Perkins, Charles E. et al., "Mobility Support in IPv6," International Conference on Mobile Computing and Networking, Proceedings of the Second Annual International Conference on Mobile Computing and Networking, Nov. 11-12, 1996, pp. 27-37.

Goldszmidt, German et al., "*ShockAbsorber*: A TCP Connection Router," Globecom 97, IEEE Global Telecommunications Conference, Nov. 3-8, 1997, pp. 1919-1923.

SAM Reference Manual, System for Automated Messages (Sep. 1989).

IBM Portable Terminal User's Guide, Third Edition (Jun. 1985).

Binder, Richard et al, The Alohanet Menehune, University of Hawaii, Version II (Sep. 1974).

Computer Structures—Principles and Examples, McGraw Hill (1982).

Krebs, Jay, Portable Computer and Host Talk Over Radio-Frequency Link, Electronic, pp. 142-145 (Aug. 25, 1983).

Gadol, Steve, et al. "Nomadic Tenets-A User's Perspective," Sun Microsystems Laboratories, Inc., pp. 1-16 (Jun. 1994).

Declaration of David A. Keeney regarding SAM System, pp. 1-33 (Sep. 3, 2002).

"SAM™ integrates E-mail, Alpha Paging, Fax, and more!", SAM System for Automated Messages (10 pgs.).

SAMpage Manual, version 2.0, TeckNow! (Feb. 1990).

Reiter, Alan A., "Focus on Technology," Telocator (Jan. 1990) (4 pgs.).

Kuehn, Carl, "More than EMail," Southwest Computer & Business Equipment Review, vol. VII, No. 2, (Feb. 1990) (1 pg.).

SAM System for Automated Messages User's Manual (1988) (17 pgs.).

Motorola Operating Instructions for Your "PMR 2000" Series Display Radio Pagers Personal Message Center (2000) (7 pgs.).

Motorola PMR 2000 Personal Message Receiver POCSAG (CCIR Radio Paging Code #1) (1986) (6 pgs.).

Undated, Information Display Pager D40, NEC Corporation (6 pgs.).

Motorola, "Air*Mobile*™ Wireless Comm Guide for cc:Mail" User Guide Version 1.0, Motorola Wireless Data Group, 1995, pp. 3-48.

Motorola, "Air*Mobile*™ Wireless Comm Server for cc:Mail" User Guide Version 1.1, Motorola Wireless Data Group, 1995, pp. 4-46.

Sun Microsystems, JavaMail API Design Specification, Version 1.0, Dec. 9, 1997, Sun Microsystems, Inc., chapters 1-10 appendices A-E.

Compaq, Aero 2100 Series Color Palm-size PC Reference Guide, Second Edition, Aug. 1999, Compaq Corporation.

Takahashi, Y. et al.: "Communication Method with Data Compression and Encryption for Mobile Computing Environment," Proceedings of INET96, Montreal, Canada, Jun. 24-28, 1996, Transforming Our Society Now, 11 pages.

United States District Court, Northern District of California, San Francisco Division: *Good Technology, Inc.* v. *Research in Motion, Ltd., et al.*, Case No. CO2-2348 MJJ, Plaintiff Good Technology, Inc.'s Preliminary Invalidity Contentions Pursuant to Patent L.R. 3-3 and Response Under Patent L.R. 3-4, Jan. 16, 2004, 33 pages.

Perkins, C.: "RFC 2002—IP Mobility Support," IBM, Oct. 1996, 61 pages.

Johnson, D.: "Scalable Support for Transparent Mobile Host Internetworking," Wireless Networks, The Journal of Mobile Communication, Computation and Information, vol. 1, No. 3, Oct. 1995, pp. 311-321.

Dawson, F., et al.: "iCalendar Message-Based Interoperability Protocol (iMIP)," Standards Track, RFC 2447, iMIP, Nov. 1998, 4 pages, XP-002249002.

Nelson, M.: "Wireless Data Services: Here and Now," PDA Developers 2.6, Nov./Dec. 1994, 3 pages.

SAM Reference Manual, System for Automated Messages (Sep. 1989).

Undated Information Display Pager D40, NEC Corporation.

14th International Conference on Distributed Computing Systems, Poznan Poland, Jun. 21-24, 1994.

EP Communication Examination Report, Application No. 01 923 428.5, dated Aug. 19, 2003, 7 pgs.

EP Communication Examination Report, Application No. 01 923 428.5, dated Feb. 18, 2005, 7 pgs.

EP Communication Examination Report, Application No. 01 923 428.5, dated Mar. 3, 2006, 7 pgs.

EP Communication Examination Report, Application No. 01 923 428.5, dated Sep. 21, 2007, 5 pgs.

EP Communication Examination Report, Application No. 01 923 428.5, dated Nov. 5, 2008, 5 pgs.

EP Communication Search Report, Application No. 10169461, dated Oct. 18, 2010, 7 pgs.

International Preliminary Examination Report, Application No. PCT/CA01/00486, dated Sep. 5, 2002, 6 pgs.

Written Opinion, Application No. PCT/CA01/00486, dated Jul. 30, 2002, 5 pgs.

Written Opinion, Application No. PCT/CA01/00486, dated Feb. 4, 2002, 2 pgs.

Search Report, Application No. PCT/CA01/00486, dated Nov. 7, 2001, 8 pgs.

Netscape Mail Instructions, Maintained by George McMurdo—last update Aug. 1, 1997, 6 pgs.

U.S. Office Action, U.S. Appl. No. 10/240,945, USPTO, Dec. 8, 2010, 17 pgs.

U.S. Office Action, U.S. Appl. No. 10/893,455, USPTO, Feb. 23, 2011, 12 pages.

U.S. Office Action, U.S. Appl. No. 10/240,945, USPTO, Mar. 4, 2011, 17 pages.

\* cited by examiner

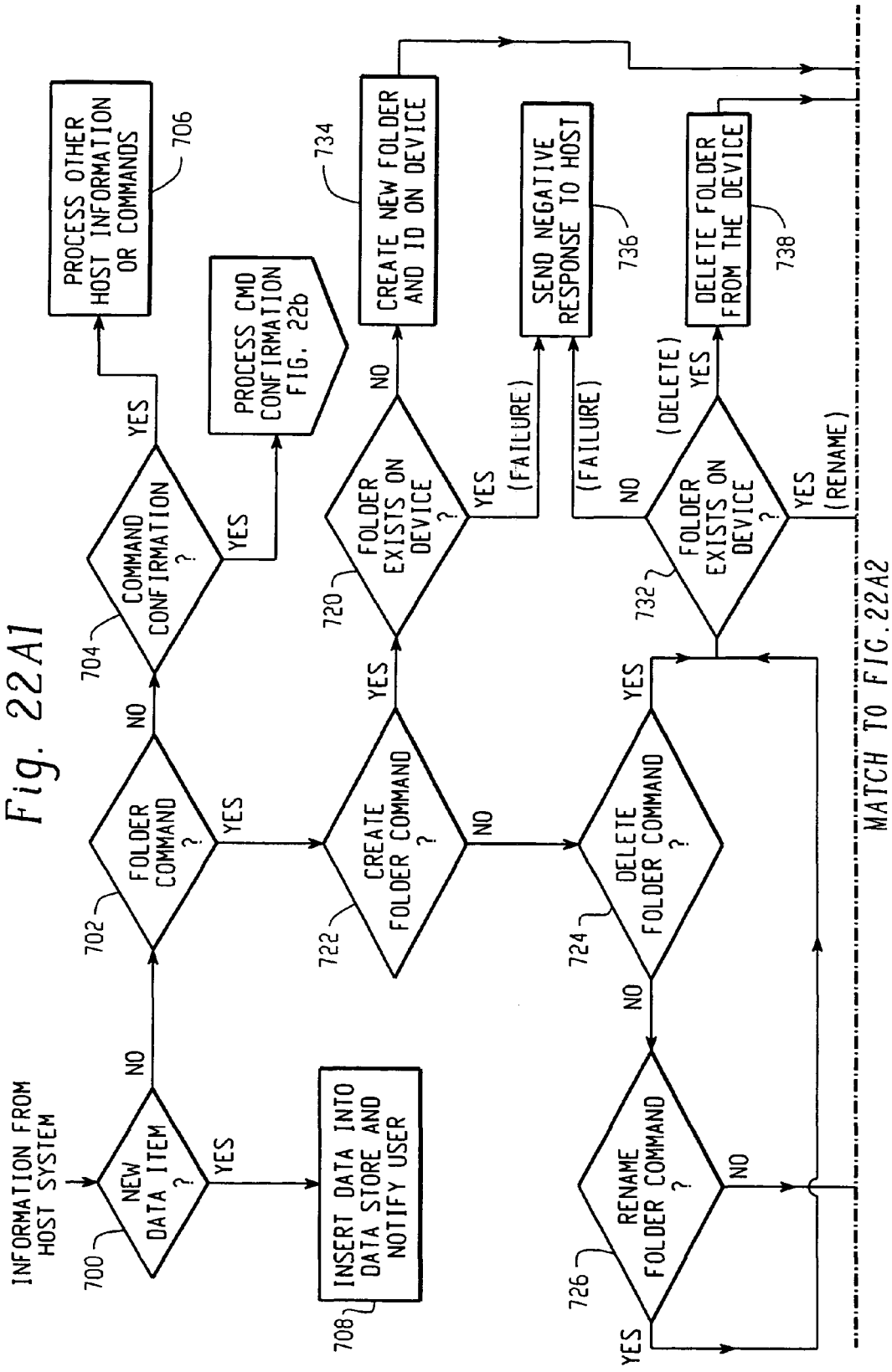
Fig. 22A1

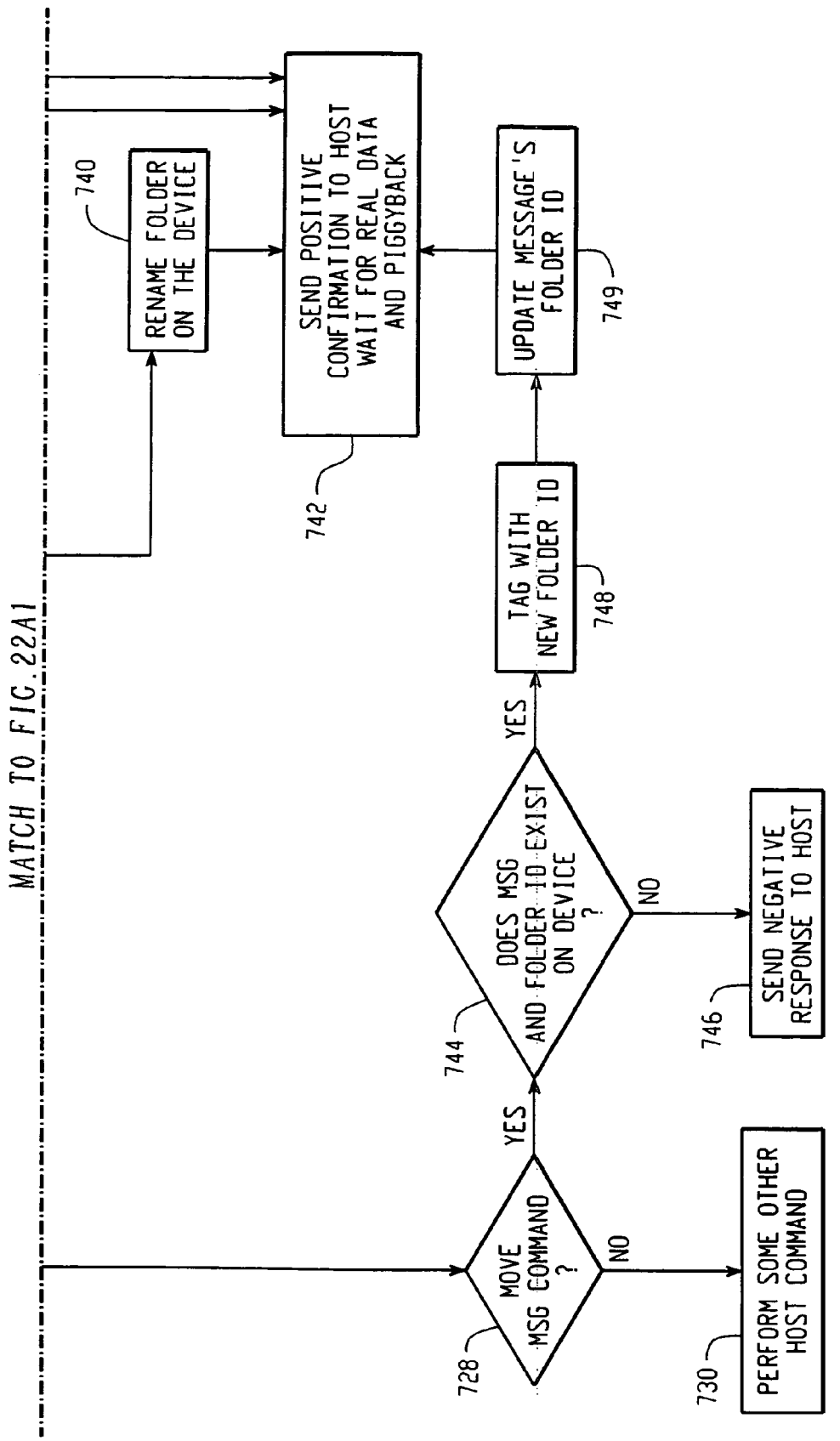
Fig. 22A2

MATCH TO FIG. 23B

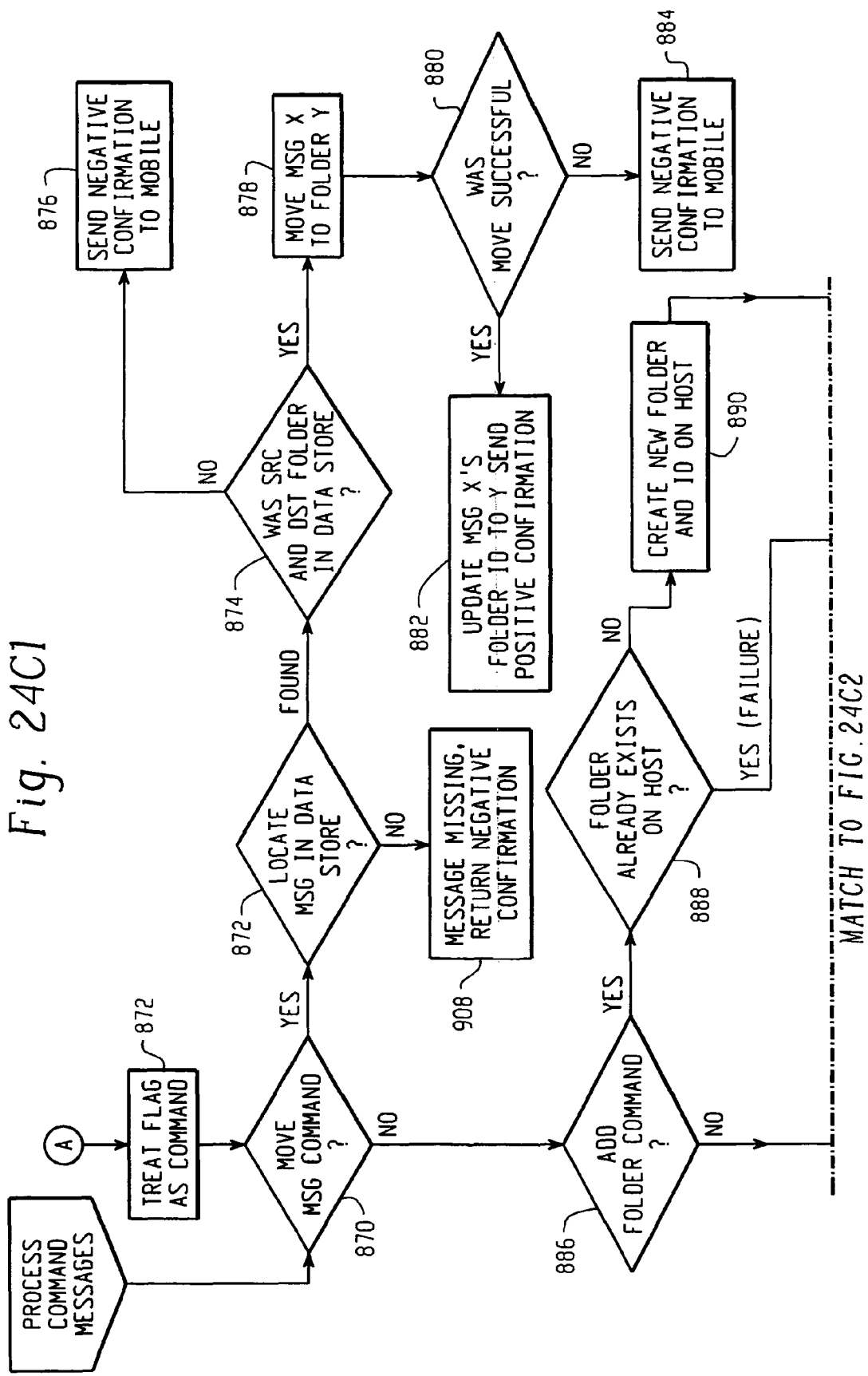
Fig. 24C1

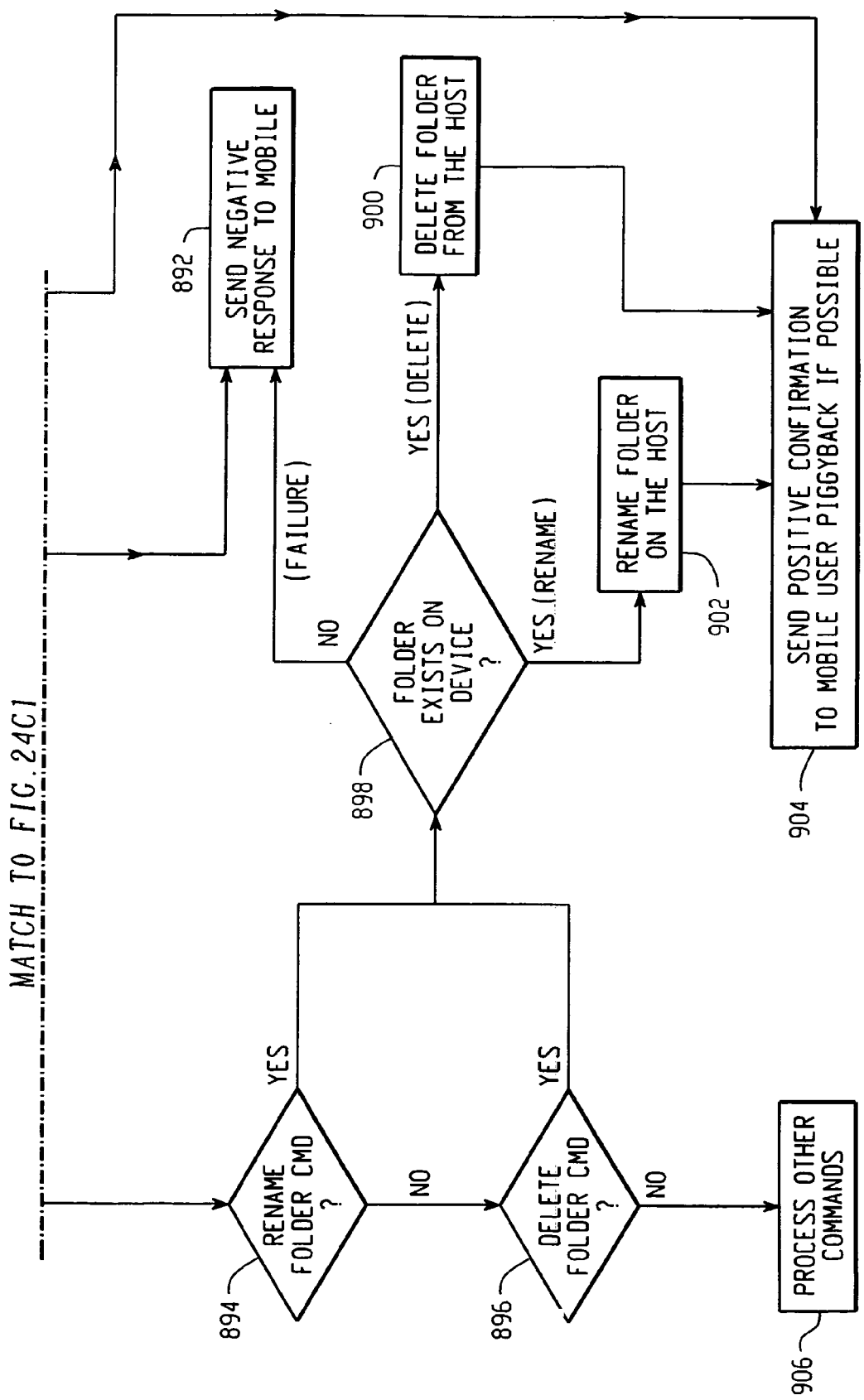
Fig. 24C2

SYSTEM AND METHOD FOR PUSHING INFORMATION FROM A HOST SYSTEM TO A MOBILE DATA COMMUNICATION DEVICE

CROSS REFERENCE TO RELATED APPLICATION

This application is a continuation-in-part of U.S. Utility application Ser. No. 09/087,623, entitled System and Method for Pushing Information from a Host System to a Mobile Data Communication Device, filed May 29, 1998, now U.S. Pat. No. 6,219,694 and assigned to the assignee of the present invention, and U.S. Utility application Ser. No. 09/545,963 filed on Apr. 10, 2000 now U.S. Pat. No. 6,779,019. Both of these related applications are hereby incorporated into the present application by reference.

BACKGROUND OF THE INVENTION

1. Field of the Invention

The present invention is directed toward the field of replicating (or synchronizing) information folders between a host system and a mobile data communication device ("mobile device"). Specifically upon receiving this redirected information at their mobile device, the user can then organize this data into hierarchies, commonly known as folders, and may also perform various other operations on the redirected data. These organizational and other operations are then synchronized back to the original host system for replication. The invention also provides for the synchronization of a storage representation model for storing the data in a hierarchy of folders at the host system and the mobile device.

2. Description of the Related Art

Present systems and methods for replicating information from a host system to a user's mobile data communication device are typically "synchronization" systems in which the user's data items are warehoused (or stored) at the host system for an indefinite period of time and then transmitted in bulk only in response to a user request. In these types of systems and methods, when replication of the warehoused data items to the mobile device is desired, the user typically places the mobile device in an interface cradle that is electrically connected to the host system via some form of local, dedicated communication, such as a serial cable or an infrared or other type of wireless link. Alternatively, the user might have to perform a special 'connection' action every so often that will synchronous all the pending items required by the user, provided they remember. Software executing on the mobile data communication device then transmits commands via the local communications link or a network link to the host system to cause the host to begin transmitting the user's data items for storage in a memory bank of the mobile device. In these synchronization schemes, the mobile unit "pulls" the warehoused information from the host system in a batch each time the user desires to replicate information between the two devices. Therefore, the two systems (host and mobile) only maintain the same data items after a user-initiated command sequence that causes the mobile device to download the data items from the host system.

Another major problem with the current pull-based systems is that the user must deal with the information all over again once the user returns to his office and accesses the information store at the host system. This situation occurs because the average user can get hundreds of pieces of electronic information a day. This is very common in e-mail systems where internal company mail, and external Internet mail, merge into one common mailbox creating a multitude of sources all merged into one location. As a result, once the user returns to their office, even though they may have seen and read the mail while traveling on their mobile device, they still have to re-read the messages and then organize the information into folders based upon the content. This results in user frustration, as the mobile device has not solved the problem of saving them time when the user returns to his office and accesses the information store at the host system.

A general problem with these known synchronization systems is that the only time that the user data items are replicated between the host system and the mobile data communication device is when the user commands the mobile device to download or pull the user data from the host system. Five minutes later a new message could be sent to the user, but the user would not receive that message until the next time the user fetches the user data items. Thus, a user may fail to respond to an emergency update or message because the user only periodically synchronizes the system, such as once per day.

Other problems with these systems include: (1) the amount of data to be reconciled between the host and the mobile device can become large if the user does not "synchronize" on a daily or hourly basis, leading to bandwidth difficulties, particularly when the mobile device is communicating via a wireless packet-switched network; (2) reconciling large amounts of data, as can accrue in these batch-mode synchronization systems, can require a great deal of communication between the host and the mobile device, thus leading to a more complex, costly and energy-inefficient system; and (3) the need to deal with the information a second time once the user returns to the office and accesses the information store at the host system. A more automated, continuous, efficient and reliable system of ensuring that user data items are replicated (synchronized) at the user's mobile device is therefore needed.

SUMMARY OF THE INVENTION

A system and method of pushing user-selected data items from a host system to a user's mobile data communication device upon detecting the occurrence of one or more user-defined event triggers is provided. The user may then move (or file) the data items to a particular folder within a folder hierarchy stored in the mobile data communication device, or may execute some other system operation on the data item. Software operating at the mobile device and the host system then synchronizes the folder hierarchy of the mobile device with a folder hierarchy of the host system, and any actions executed on the data items at the mobile device are then automatically replicated on the same data items stored at the host system, thus eliminating the need for the user to manually repeat the same actions at the host system that have been executed at the mobile data communication device.

As used in this application, the term host system refers to the computer where the redirector software is operating or is associated with. In the preferred embodiment of the present invention, the host system is a user's desktop PC, although, alternatively, the host system could be a network server connected to the user's PC via a local-area network ("LAN"), or could be any other system that is in communication with the user's desktop PC. In a preferred embodiment, the host system and the mobile device share a secure and private encryption key so that all communications that are exchanged between the end points (i.e., between the host system and the mobile device) are private.

A redirector program operating at the host system enables the user to redirect or mirror certain user-selected data items (or parts of data items) from the host system to the user's mobile data communication device upon detecting that one or more user-defined triggering events has occurred. These data items also include properties and attributes like the data item status, its creation time and data, and information about where it has been placed in an information hierarchy. Once the data items and its properties have been redirected to the user's mobile data communication device, the user may then organize and sort the items into folder hierarchies that are replicated at the host system. Additionally the the user may act upon the redirected data items, such as by reading, organizing, replying or forwarding the data item from the mobile data communication device, the host system is then informed of these actions and automatically reflects the changes on the corresponding data item stored at the host system. This reconciliation process creates a mirrored data store between the host system and the mobile device for those parts of their shared information. The term "mirrored" or "mirroring" when used in this description is meant to convey to the reader that all, substantially all or at least all of the pertinent information of a collection of data the user desires to have access to is accessible at either the mobile or host system. Due to limited display screen sizes and other issues relating to real-estate on a limited screen on a mobile communication, it is within the scope of one aspect of the invention to have representation of the data stored in either the host system or mobile device stored at the mobile device or host system, respectively, thereby still providing a "mirrored" data environment without necessarily the same graphical user interface or presentation of the mirrored data.

Another advantage of this data store mirroring is that traditionally in data storage systems, status icons are used to associate a state with a particular data item. A status icon is a graphical image of what state a given data item is in, i.e. read, replied to, or forwarded. The ability to affect these graphical images when viewed via a computer terminal at or associated with the host system from the mobile device allows the user a quick visual method of reviewing a list of data items in a particular folder to determine their states. This allows the user to know what actions have been performed on them, whether an action occurred from the mobile device, or whether nothing has been done to a given set of data items.

Operating at the host system are various sub-systems that can be configured to create triggering events, such as a screen saver sub-system or a keyboard sub-system, as well as sub-systems for repackaging the user's data items for transparent delivery to the mobile data device, such as a TCP/IP sub-system or one or more E-Mail sub-systems. Other sub-systems for creating triggering events and repackaging the user's data items could also be present at the host system. The host system also includes a primary memory store where the user's data items are normally stored with related information as to which folder the message might have originally been placed into.

Using the redirector program, the user can select certain data items for redirection, such as E-mail messages, calendar events, meeting notifications, address entries, journal entries, personal reminders, contact information, task lists, expense lists, etc. The user can also select which folders get redirected to the mobile device. For example, the user may select that only data items in the Inbox and those in the company X folder shall be sent to the device. The user might select only the work-related journal folder in the journal sub-system, their personal address folder within the contacts sub-system, and their 9 to 5 work calendar folder are to be redirected to their mobile device. Having selected the data items for redirection, the user can then configure one or more event triggers to be sensed by the redirector program to initiate redirection of the user data items. These user-defined trigger points (or event triggers) include external events, internal events and networked events.

Examples of external events include: receiving a message from the user's mobile data communication device to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the examples of the types of user-defined events that can trigger the redirector program to push data items from the host to the mobile device.

The concept of a data items stored in a hierarchy is very well known in the field of computer science and in science in general. Categorization in the field of species identification has been done for hundreds of years. This same method of classification has been adopted into information systems so that people can deal with the large quantity of information that comes their way in a daily, weekly or yearly basis. Therefore the term folder is used to represent this categorization of information into meaningful and related associations; i.e. especially meaningful to the person filing the information. Naturally in a professional or business setting you might have one or more people filing the same information, i.e. a personal secretary helping a boss stay on top of the information by pre-filing the data for them.

In addition to the functionality noted above, the redirector program provides a set of software-implemented control functions for determining the type of mobile data communication device and its address, for programming a preferred list of message types or folder names that are to be redirected, and for determining whether the mobile device can receive and process certain types of message attachments, such as word processor or voice attachments. The determination of whether a particular mobile device can receive and process attachments is initially configured by the user of that mobile device at the host system. This configuration can then be altered on a global or per message basis by transmitting a command message from the mobile device to the host system. If the redirector is configured so that the mobile data device cannot receive and process word processor or: voice attachments, then the redirector routes these attachments to an external machine that is compatible with the particular attachment, such as a networked printer or fax machine or telephone. Other types of attachments could be redirected to other types of external machines in a similar fashion, depending upon the capabilities of the mobile device. For example, if a user is traveling and receives a message with an attachment that the user's mobile device can process or display, the user may from a mobile communications device send a command message to the host system indicating that that attachment is to be sent to a fax machine at a hotel where the user will be spending the evening. This enables the user to receive important E-mail attachments as long as the host system is provided with sufficient information about the destination where the attachment is to be forwarded.

Once an event has triggered redirection of the user data items, the host system then repackages these items in a manner that is transparent to the mobile data communication device, so that information on the mobile device appears similar to information on the user's host system. In additional to repackaging the information itself, the repackaging may also include properties about the message. This might include the folder from which the message has been detected and pushed to the device. The preferred repackaging method includes wrapping the user data items in an E-mail envelope that corresponds to the address of the mobile data communication device, although, alternatively, other repackaging methods could be used with the present invention, such as special-purpose TCP/IP wrapping techniques, or other methods of wrapping the user selected data items. The repackaging preferably results in E-mail messages appearing to come from the host system even though they are initiated at the mobile device, thus enabling the user to appear to have a single E-mail address, such that the recipients of messages sent from the mobile communications device do not know where the user was physically located when the message was first sent. The repackaging also permits both messages to the mobile device and sent from the mobile device to be encrypted and decrypted as well as compressed and decompressed.

In an alternative system and method, the redirector program executes on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' mobile data communication devices. In response to receiving one of these triggers, the server redirects the user's data items to the proper mobile data communication device. The user data items and addressing information for a particular mobile device can be stored at the server or at the user's PC. Using this alternative configuration, one redirector program can serve a plurality of users. This alternative configuration could also include an internet- or intranet-based redirector program that could be accessible through a secure webpage or other user interface. The redirector program could be located on an Internet Service Provider's system and accessible only through the Internet.

In another alternative configuration of the present invention, a redirector program operates at both the host system and at the user's mobile data communication device. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host. Another embodiment of this original redirector concept is to 'relay' information from a host to a mobile and onward to another device capable of dealing with certain messages or attachments. By using a standard like Bluetooth™ the mobile device could receive a message with an attached print file and then using Radio Frequency (RF) Bluetooth methods relay that to the printer to produce a hard copy.

Wireless mobile data communications devices, especially those that can return a confirmation signal to the host that the pushed data has been received, are especially well suited for this type of push paradigm. It is also possible for the mobile data communications device to include additional information with the confirmation signal, including, any one or more of the following actions, the fact that the message: has been read (the information associated therewith is a "read signal"); has been filed in a specific folder (the information associated therewith is a "filed signal"); has been forwarded to another recipient (the information associated therewith is a "forward signal"); or, has been replied to (the information associated therewith is a "reply signal"). These actions can then be synchronized with the host system, thus eliminating the need for the user to perform these actions a second time. The action signals may advantageously be used to indicate the state of the message at the mobile.

One aspect of the invention, therefore, provides a method of indicating at the host system the state of the message at the mobile communications device. The steps of this method preferably include: (A) altering the state of a first message at the mobile communications device thereby creating an altered state; (B) forwarding a status signal to the host system; and, (C) changing at the host system a first message status icon based on the altered state at the mobile communications device. Therefore, according to one aspect of the invention, the message status icon change indicates an altered state of the message at the mobile communication device.

One aspect of the invention, therefore, provides a method of indicating at the host system the state of the message at the mobile communications device. The steps of this method preferably include: (A) redirecting a first message from the host system to the mobile communications device, wherein the first message at the host system has a first message status icon; (B) receiving the redirected first message from the host system at the mobile communications device; (C) altering the state of the first message at the mobile communications device thereby creating an altered state; (D) forwarding a status signal to the host system; and, (E) changing at the host system the first message status icon based on the action taken at the mobile communications device.

One aspect of the invention provides a method of indicating at a first device, via the host system, the state of the message at the mobile communications device. The steps of this method preferably include: (A) redirecting a first message from the host system to the mobile communications device, wherein the first message at the host system has a first message status icon; (B) receiving the redirected first message from the host system at the mobile communications device; (C) altering the state of the first message at the mobile communications device thereby creating an altered state; (D) forwarding a status signal to the host system; and, (E) changing at the host system the first message status icon based on the action taken at the mobile communications device; and (F) forwarding a read-receipt to a read-receipt requester's device.

One aspect of the invention provides a method of synchronizing messages between a first system and a second system. The steps of this method preferably include: (A) retrieving a first folder hierarchy from the first system; (B) retrieving a second folder hierarchy from the second system; (C) synchronizing the second folder hierarchy to the first folder hierarchy; (D) retrieving a first plurality of messages from the first system, the first plurality of messages being stored in folders within the first folder hierarchy; (E) retrieving a second plurality of messages from the second system, the second plurality of messages being stored in folders within the second folder hierarchy; (F) comparing the first plurality of messages to the second plurality of messages to identify common messages stored in both the first and second folder hierarchies; (G) determining whether any of the common messages are stored in different folders in the first and second folder hierarchies; and (H) if a common message is located in different folders of the first and second folder hierarchies, then synchronizing the messages by moving the common message to a new folder within the first folder hierarchy or by moving the common message to a new folder within the second folder hierarchy.

Another aspect of the invention provides a method of synchronizing messages stored in a folder hierarchy at a host system and a corresponding folder hierarchy at a mobile data communication device. This method preferably includes the following steps: (A) receiving a message at the host system; (B) storing the message in a first folder of the folder hierarchy at the host system; (C) transmitting the message to the mobile data communication device; (D) storing the message in a first folder of the folder hierarchy at the mobile data communication device; (E) moving the message from the first folder to a second folder at the mobile data communication device; (F) coupling the mobile data communication device to the host system; (G) detecting that the message has been moved to the second folder at the mobile data communication device; and (H) in response to the detection step, moving the message from the first folder at the host system to a second folder of the folder hierarchy at the host system that corresponds to the second folder of the folder hierarchy at the mobile data communication device.

Still another aspect of the invention provides a method of synchronizing messages stored in a folder hierarchy at a host system and a corresponding folder hierarchy at a mobile data communication device, comprising the steps of: (A) receiving a message at the host system; (B) storing the message in a first folder of the folder hierarchy at the host system; (C) transmitting the message to the mobile data communication device; (D) storing the message in a first folder of the folder hierarchy at the mobile data communication device; (E) moving the message from the first folder to a second folder at the mobile data communication device; (F) transmitting a move message from the mobile data communication device to the host system indicating that the message has been moved to the second folder at the mobile data communication device; and (G) receiving the move message at the host system and moving the message stored in the first folder at the host system to a second folder at the host system that corresponds to the second folder at the mobile data communication device.

Yet another aspect of the invention provides a method of synchronizing a first device to a second device, comprising the steps of: (A) providing a first folder hierarchy at the first device; (B) providing a second folder hierarchy at the second device; (C) synchronizing the second folder hierarchy to the first folder hierarchy; (D) retrieving a first plurality of messages stored within the first folder hierarchy and retrieving a second plurality of messages stored within the second: folder hierarchy, wherein at least one of the first plurality of messages and at least one of the second plurality of messages are common messages; (E) determining whether the common messages are stored in similar folders within the first and second folder hierarchies; and (F) if the common messages are not stored in similar folders, then synchronizing the common messages so that they are stored in similar folders within the first and second folder hierarchies.

Another aspect of the invention provides a method of synchronizing a first device to a second device, comprising the steps of: (A) providing a first folder hierarchy at the first device; (B) providing a second folder hierarchy at the second device; (C) retrieving a first plurality of messages stored within the first folder hierarchy and retrieving a second plurality of messages stored within the second folder hierarchy; (D) determining whether the first device executed an operation on a message stored in the first folder hierarchy, and if so, then executing the same operation on a corresponding message stored in the second folder hierarchy at the second device.

Still another aspect of the invention provides a system for synchronizing messages between a first device and a second device, comprising: a pair of matching folders, one of the pair of matching folders being located on the first device, the other of the pair of matching folders being located on the second device; a pair of matching messages, one of the pair of matching messages being located on the first device, the other of the pair of matching messages being located on the second device; and means for moving the pair of messages such that if one of the pair of matching messages is moved to one of the pair of matching folders, the other matching message is moved to the other matching folder.

An advantage of the present invention is that it provides a system and method for triggering the continuous and real-time redirection of user-selected data items from a host system to a mobile data communication device. Other advantages of the present invention include: (1) flexibility in defining the types of user data to redirect, and in defining a preferred list of message types and folder names that are to be redirected or preferred senders whose messages are to be redirected; (2) flexibility in configuring the system to respond to numerous internal, external and networked triggering events; (3) transparent repackaging of the user data items in a variety of ways such that the mobile data communication device appears as though it were the host system; (4) integration with other host system components such as E-mail, TCP/IP, keyboard, screen saver, webpages and certain programs that can either create user data items or be configured to provide trigger points; (5) the ability to operate locally on a user's desktop system or at a distance via a network server; (6) the ability to store folder hierarchies on the mobile data communications device so that user can organize the information during those periods when information is being redirected to said device; and (7) eliminating the need to organize the information a second time once the user returns to the office to work from their host system.

A further advantage of the present invention is that it provides a software structure and method for managing messages between the mobile data communication device and the host system. The software provides a logical structure for folders and messages that can detect movement of messages between folders on either the mobile data communication device or the host system. This allows the user the flexibility to organize messages into folders on the mobile data communication device without having to replicate the organizational work on the host system, or vice versa. The folder and message software structure further provides the redirector program trigger signals for forwarding messages.

These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

DETAILED DESCRIPTION OF THE DRAWINGS

Wireless Information Delivery

This first section illustrates one method for enabling the redirection of information between a host system and a wireless mobile data communication device. The redirection program 12 is a preferred component of the overall system that facilitates the mirroring of data store folders between a host system and a mobile device. The ability to push data and commands in real-time over a wireless two-way data network provides a perfect vehicle for continuous synchronization of data stores between systems.

Figure 1:
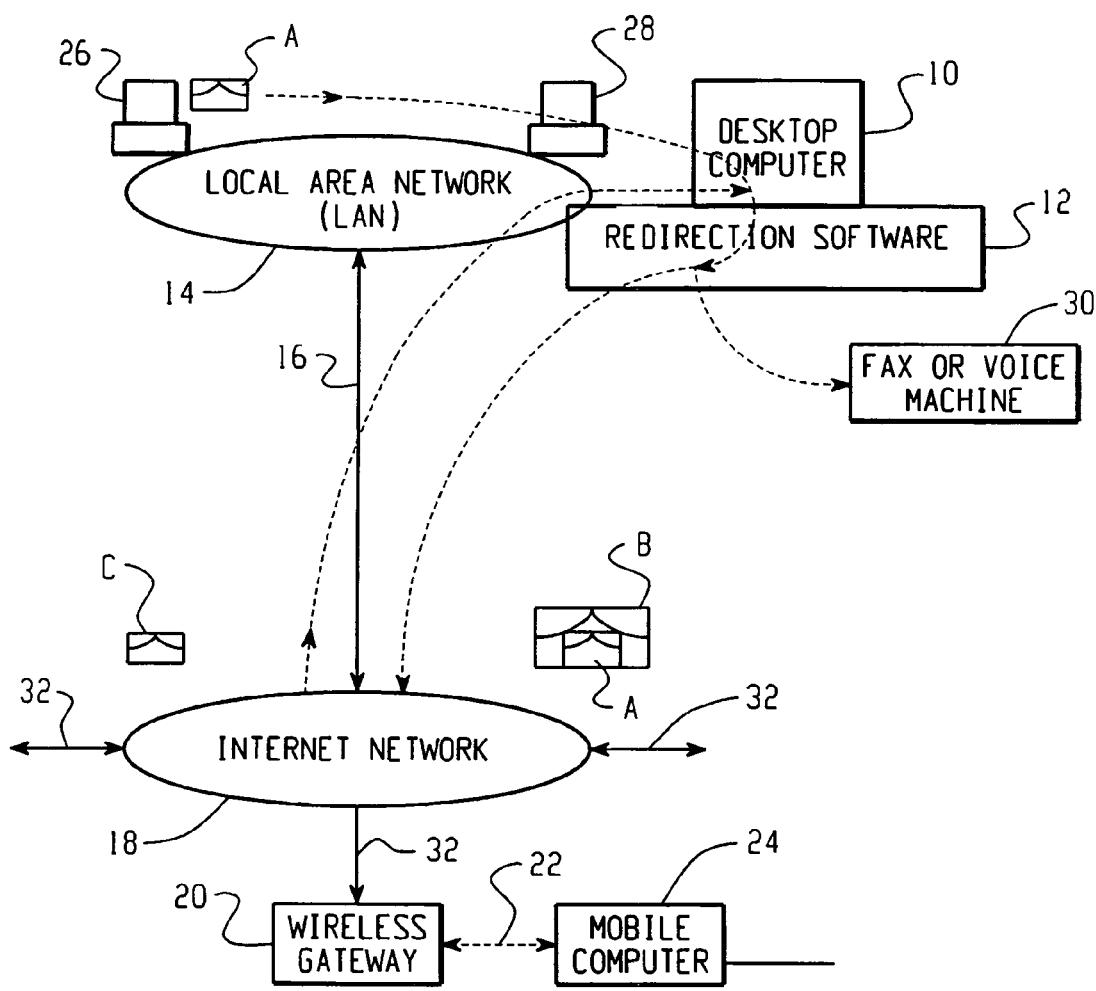
FIG. 1 is a system diagram showing the redirection of user data items from a user's desktop PC (host system) to the user's mobile data communication device, where the redirector software is operating at the user's desktop PC.

Referring now to the drawings, FIG. 1 is an example system diagram showing the redirection of user data items (such as message A or C) from a user's office PC (host system) 10 to the user's mobile data communication device 24, where the redirector software 12 is operating at the user's PC, at which the redirector software is stored on a computer-accessible medium. Message A in FIG. 1 represents an internal message sent from desktop 26 to the user's host system 10 via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46. In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol Internet Protocol ("TCP/IP") to exchange information, but which, alternatively could be any other type of WAN. The connection of the LAN 14 to the WAN 18 is via high bandwidth link 16, typically a T1 or T3 connection. The WAN 18, in turn, is connected to a variety of gateways 20, via connections 32. A gateway forms a connection or bridge between the WAN 18 and some other type of network, such as an RF wireless network, cellular network, satellite network, or other synchronous or asynchronous land-line connection.

In the present invention, the terms "redirector" or "redirector program" refers to one or more software modules and programs that perform together to preferably (1) identify information to be wirelessly exchanged, (2) compress and decompress the information, (3) encrypt and de-encrypt the information, and (4) envelop and recover from the envelope the information to be exchanged with a mobile data communication device. This redirector software may be a standalone program, or it could be incorporated into a larger mail program and perform wireless-centric actions that enables the exchange of information with wireless data communication devices.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video) or a machine capable of processing and playing audio files, such as a voice mail system. The present invention includes the ability to redirect certain message attachments to such an external machine 30 if the redirector program configuration data reflects that the mobile device 24 cannot receive and process the attachments, or if the user has specified that certain attachments are not to be forwarded to mobile device 24, even if such device can process those attachments. By way of example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the Internet, and to send the audio clip to the user's voice mail system. This example is not intended to limit the breadth and scope of the invention, but rather to illustrate the variety of possibilities embodied in the redirection concept.

Figure 4:
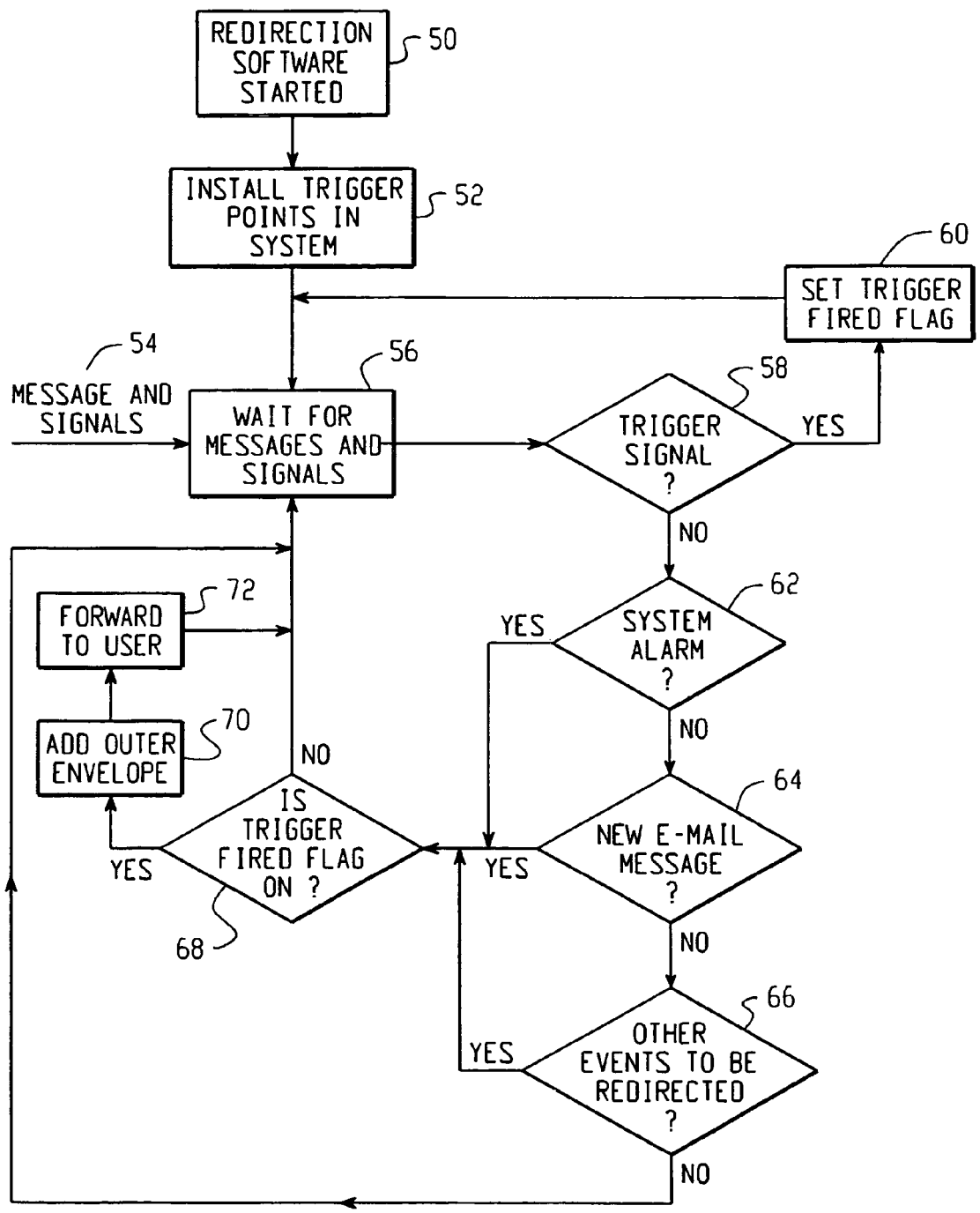
FIG. 4 is a flow chart showing the steps carried out by the redirector software operating at the host system.

The preferred mobile data communication device 24 is a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the invention could be beneficially used in a "one and one-half" or acknowledgment paging environment, or even with a one-way paging system. The mobile data communication device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

In an alternative embodiment of the present invention, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1-4.

A user of the present invention can configure the redirector program 12 to push certain user-selected data items to the user's mobile data communication device 24 when the redirector 12 detects that a particular user-defined event trigger (or trigger point) has taken place. User-selected data items preferably include E-mail messages, calendar events, meeting notifications, address entries, journal entries, personal alerts, alarms, warnings, stock quotes, news bulletins, etc., but could, alternatively, include any other type of message that is transmitted to the host, system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

The user-defined event triggers that can be detected by the redirector program 12 preferably include external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used with the present invention to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. The preferred method of detecting new messages is using Microsoft's® Messaging API (MAPI), in which programs, such as the redirector program 12, register for notifications or 'advise syncs' when changes to a mailbox take place. Other methods of detecting new messages could also be used with the present invention.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message A for redirection, the redirector program 12 could compress the original message A, could compress the message header, or could encrypt the entire message A to create a secure link to the mobile device 24.

Also programmed into the redirector 12 is the address of the user's mobile data communication device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30.

The redirector may also be programmed with a preferred list mode that is configured by the user either at the host system 10, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the particular data item was sent from a sender on the preferred list or has certain message characteristics that if present will trigger or suppress redirection of the message.

In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

After the redirector has determined that a particular message should be redirected, and it has prepared the message for redirection, the software 12 then sends the message A to a secondary memory store located in the mobile device 24, using whatever means are necessary. In the preferred embodiment this method is to send the message A back over the LAN 14, WAN 18, and through the wireless gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/IP repackaging and delivery method (most commonly used in the alternative server configuration shown in FIG. 2). The wireless gateway 20 requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the present invention causes the mobile computer 24 to appear to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, then the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment, this results in the outgoing redirected message from the user's host system 10 being sent using the E-mail address of the host mailbox, rather than the address of the mobile device, so that it appears to the recipient of the message that the message originated from the user's desktop system 10 rather than the mobile data communication device. Any replies to the redirected message will then be sent to the desktop system 10, which if it is still in redirector mode, will repackage the reply and resend it to the user's mobile data device, as described above.

Figure 2:
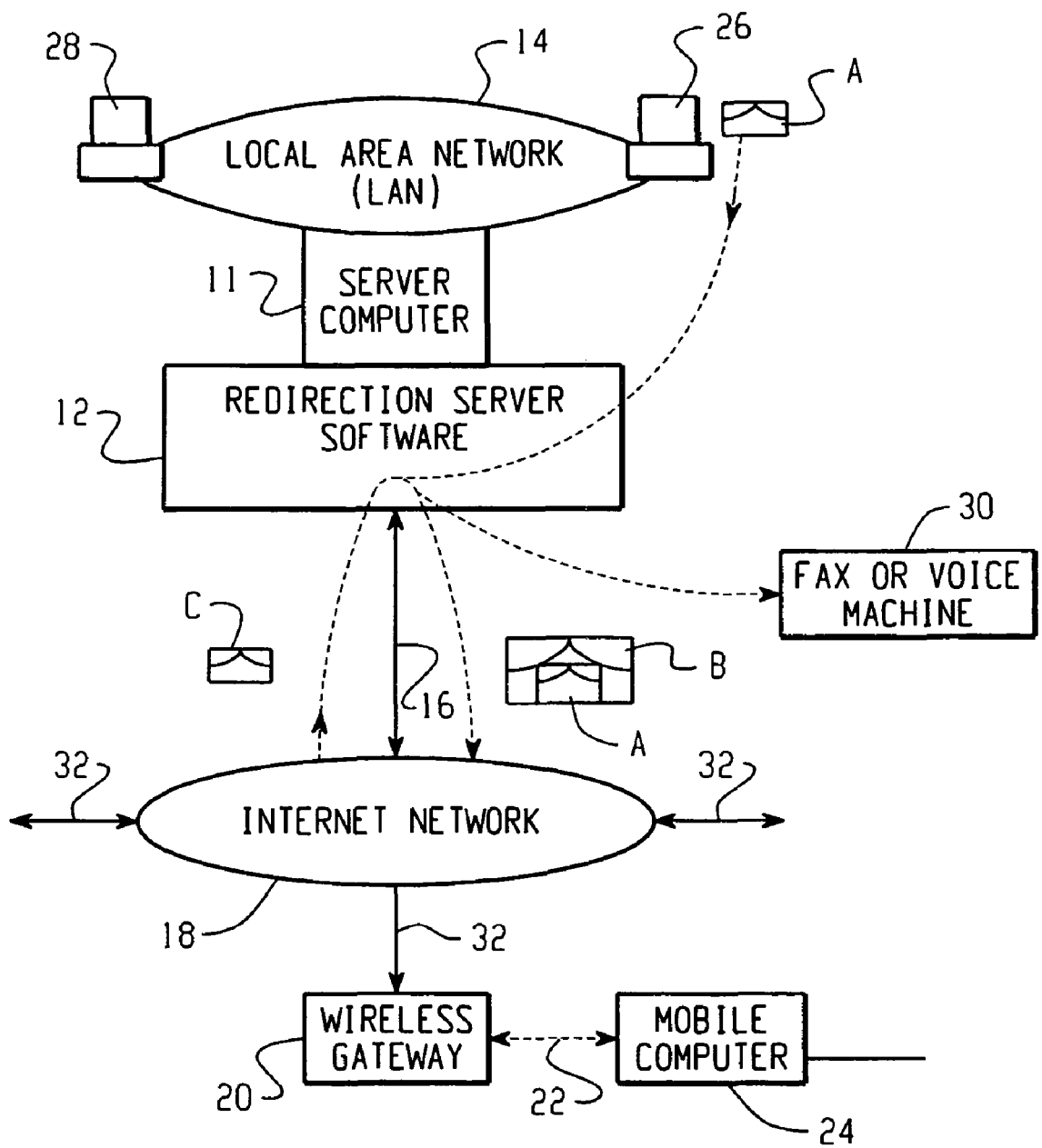
FIG. 2 is a system diagram showing the redirection of user data items from a network server (host system) to the user's mobile data communication device, where the redirector software is operating at the server.

FIG. 2 is an alternative system diagram showing the redirection of user data items from a network server 11 to the user's mobile data communication device 24, where the redirector software 12 is operating at the server 11 or in conjunction with a message server, wherein the redirector software is stored on a computer-accessible medium. For one skilled in the art is can be appreciated that the redirector software might be an integrated software program linked directly with a traditional message server to provide support for wireless two-way data communication devices. This configuration is particularly advantageous for use with message servers such as Microsoft's®. Exchange Server or Lotus's® Notes or Domino Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 10, 26, 28, including information such as whether a particular user can have data items redirected, which types of message and information to redirect, what events will trigger redirection, the address of the users' mobile data communication device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11 which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile data communication device 24, or it could be a message from an external computer, such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
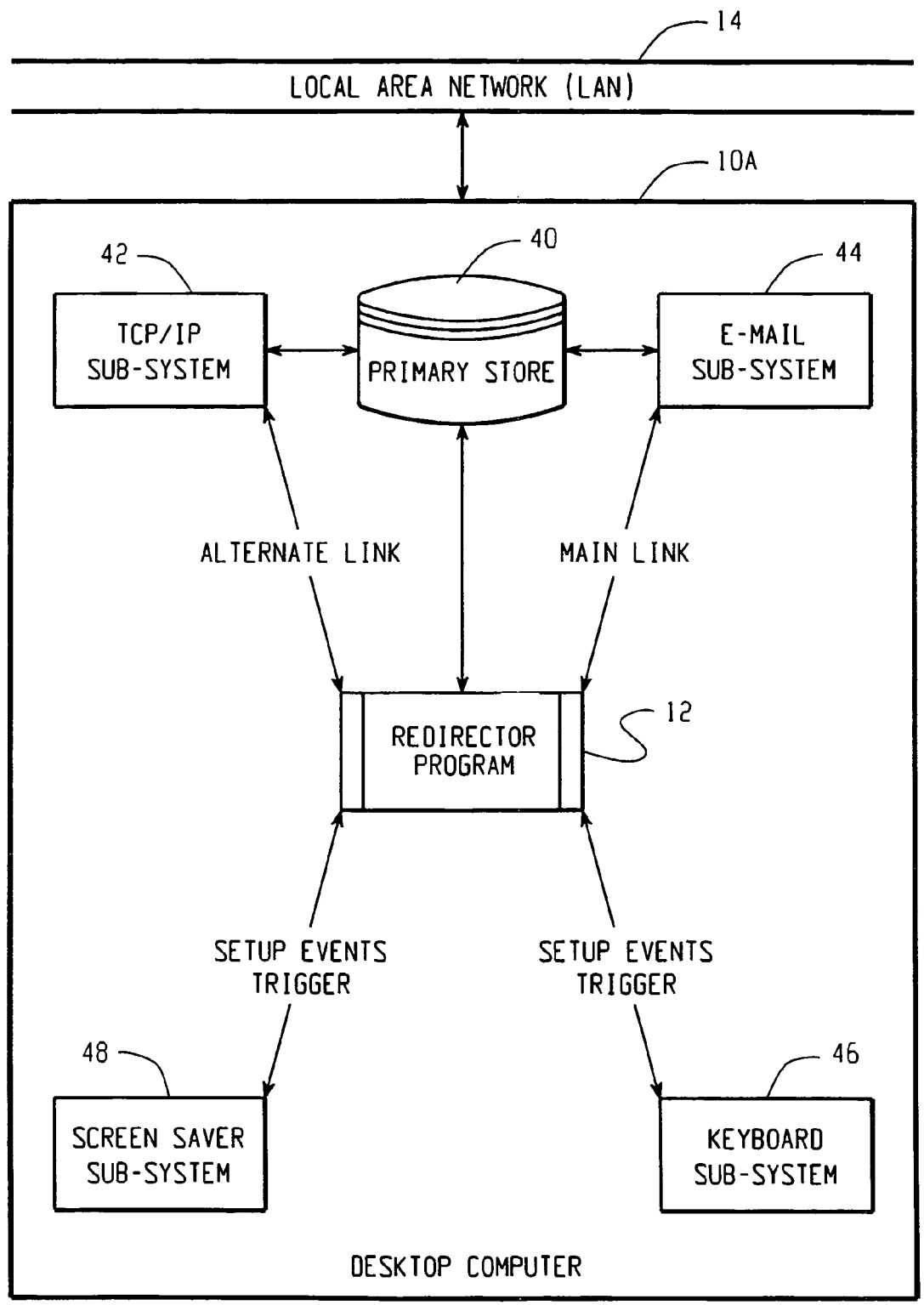
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12 with additional components of the host system 10 of FIG. 1 (the desktop PC) to enable more fully the pushing of information from the host system 10 to the user's mobile data communication device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP/IP sub-system 42, an E-mail sub-system 44, a primary data storage device 40, a screen saver sub-system 48, and a keyboard sub-system 46, wherein the software programs are stored on suitable computer-accessible media. The TCP/IP and E-mail subsystems 42, 44 are examples of repackaging systems that can be used to achieve the transparency of the present invention, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile data communication device; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10. In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, the present invention can be triggered to begin redirection upon detecting numerous external, internal and networked events, or trigger points. Examples of external events include: receiving a command message from the user's mobile data communication device 24 to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start the redirection process. For example, the screen saver system can be configured so that when the screen saver is activated, after, for example, 10 minutes of inactivity on the desktop system, an event trigger is transmitted to the redirector 12, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10 that can be used to generate internal event triggers.

Figure 5:
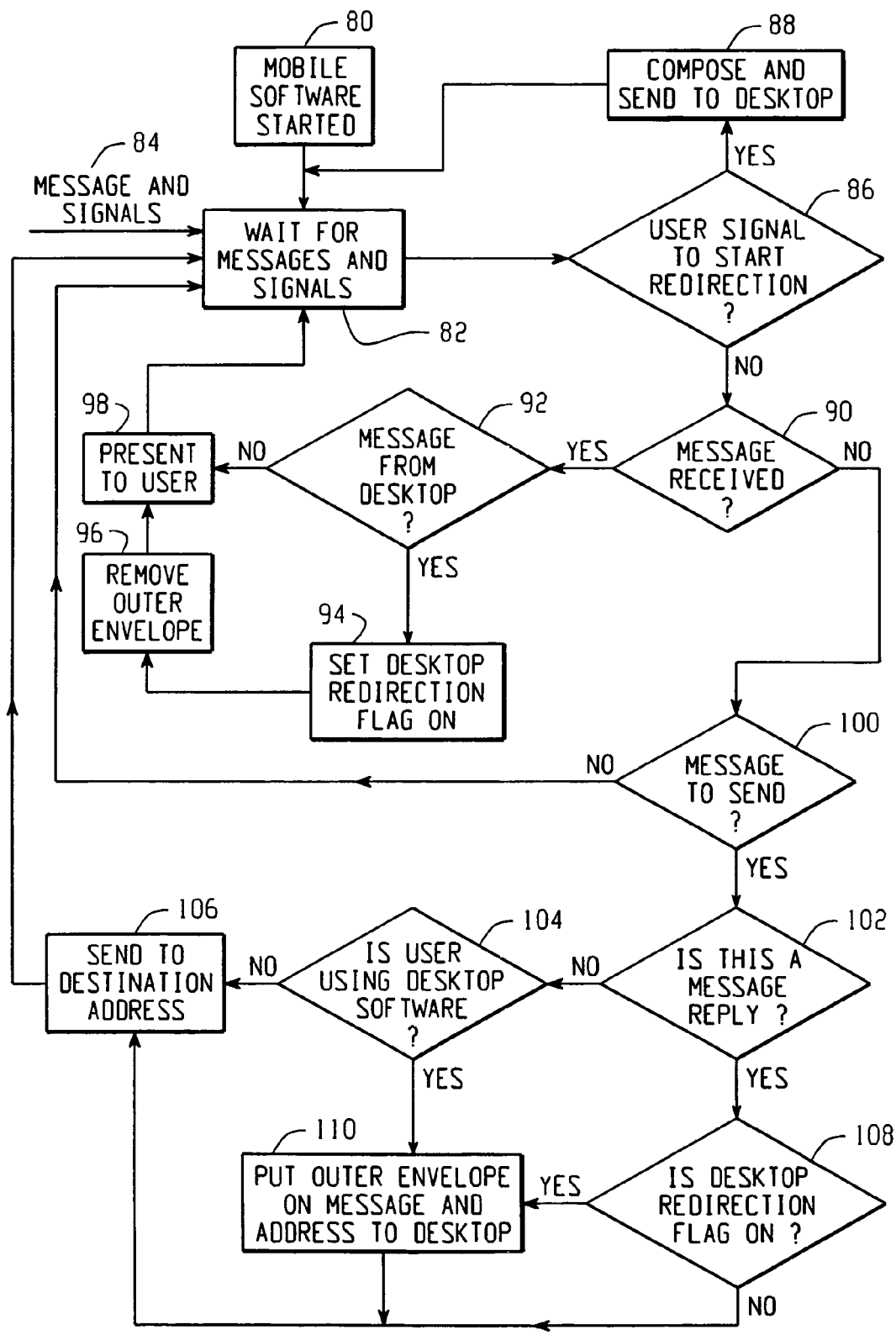
FIG. 5 is a flow chart showing the steps carried out by the mobile data communication device to interface with the redirector software operating at the host system.

FIGS. 4 and 5, set forth, respectively, flow charts showing the steps carried out by the redirector software 12 operating at the host system 10, and the steps carried out by the mobile data communication device 24 in order to interface with the host system. Turning first to FIG. 4, at step 50, the redirector program 12 is started and initially configured. The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device.

Once the redirector program is configured 50, the trigger points (or event triggers) are enabled at step 52. The program 12 then waits 56 for messages and signals 54 to begin the redirection process. A message could be an E-Mail message or some other user data item than may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag is set, then at step 70, the redirector 12 causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender was on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12 of the present invention. At step 80 the mobile software is started and the mobile device 24 is configured to operate with the system of the present invention, including, for example, storing the address of the user's desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86, the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine 10. In this situation where the mobile device 24 is sending a message directly to the desktop system 10, no outer wrapper is added to the message (such as message C in FIGS. 1 and 2). In addition to the redirection signal, the mobile device 24 could transmit any number of other commands to control the operation of the host system, and in particular the redirector program 12. For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; and (2) a message to instruct the host system to redirect an entire data item to the mobile device in the situation where only a portion of a particular data item has been redirected.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is repackaged with the outer envelope having the addressing information of the user's desktop system 10, and the repackaged message is then transmitted to the desktop system 10 at step 106. As described above, the redirector program 12 executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If, however, the mobile determines that the user is using the redirector software 12 at the desktop system 10, then control passes to step 110, where the outer envelope is added to the message. The repackaged original message is then transmitted to the desktop system 10 at step 106, which, as described previously, strips the outer envelope and routes the message to the correct destination. Following transmission of the message at step 106, control of the mobile returns to step 82 and waits for additional messages or signals.

Figure 14:
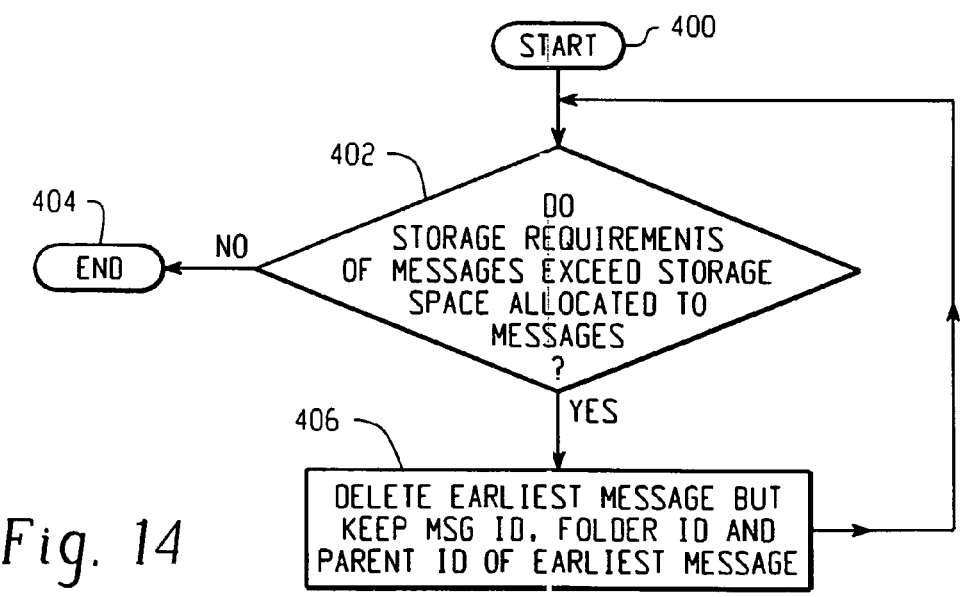
FIG. 14 is a flow chart showing the steps of purging a message.

FIGS. 1 through 5 presented a method for enabling a message server to exchange information with a wireless data communication device. This same method can also be used with the folder synchronization invention, although one skilled in the art can appreciate that other push methods could be used to enable the synchronization of folders. The next two sections detail two complementary ways for keeping information folders at a host system and mobile device in synchronization. The first section, which extends from FIG. 6 through to FIG. 14, provides a layout of how folders and information within folders can be identified and labeled to assist with synchronization. This first section also describes in detail a discrete synchronization step and covers broadly how over-the-air synchronization can complement a bulk plug-in method for synchronization. The second section illustrates more graphically how a continuous real-time synchronization takes place over the wireless link as any changes occur on either of the two systems.

Folder Synchronization Basics

Organizing and storing messages in the mobile device 24 and the host system 10 is set forth in FIGS. 6 through 18. The mobile device 24 preferably includes a hierarchical folder system, as does the host system 10. The user can select from multiple levels of folders to find a certain folder. For example, the user can organize messages into categories such as friends, co-workers, contacts, and "to do" list on the mobile device 24 and at the host system 10. Software on the mobile device 24 and the host system 10 organizes the messages so that filing a message on either the mobile device 24 or the host system 10 will be recognized at the other end either by commands sent through the redirector program or by synchronizing the mobile device with the host system. Synchronization can occur, for example, by plugging the mobile device into an interface cradle coupled to the host system or through a wireless device-to-host interface.

Figure 6:
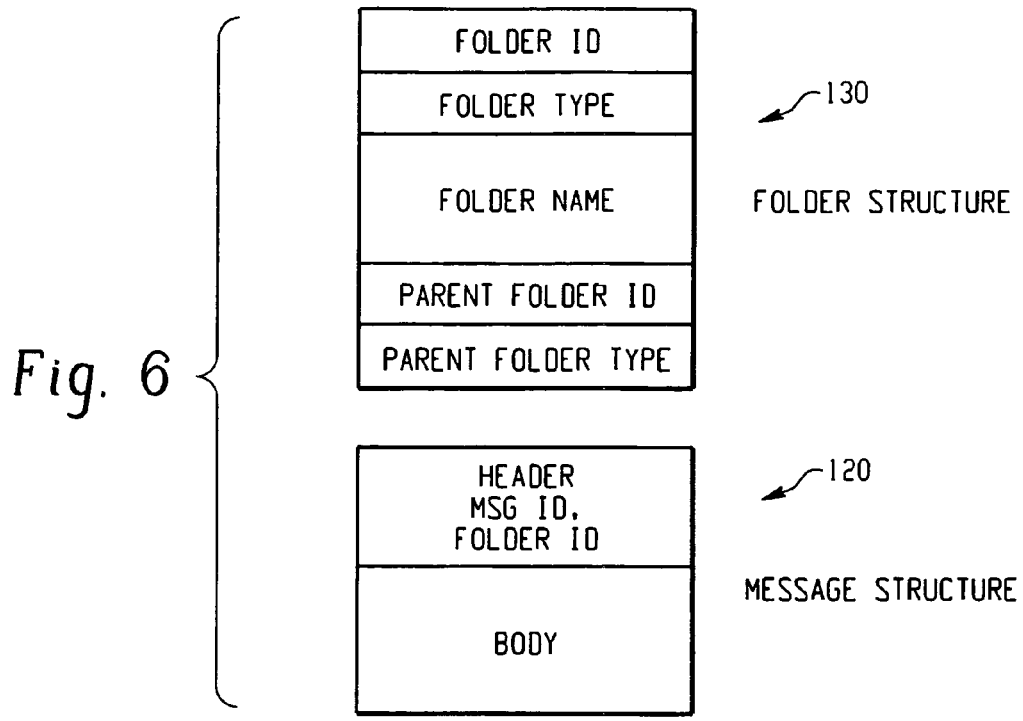
FIG. 6 is a schematic diagram of the logical structure of a folder and a message.

FIG. 6 sets forth a preferred message structure 120 and folder structure 130 for messages and folders that are stored on the host system 10 and the mobile device 24. The message structure 120 includes a message body and a message header. The message header preferably includes tags such as a message ID and a folder ID. The message ID is a unique tag that is associated with a single message. The message ID is assigned to a message when the message is received in the store. The folder ID is a tag that contains the unique ID of the folder in which the message is to be stored.

The folder structure includes a folder ID, folder type, folder name, parent folder ID, and parent folder type. The folder ID is a unique tag for each folder. The folder ID is generated when the mobile device 24 is synchronized to the host system 10. The folder type specifies attributes of the folder that differentiate it from other folders. One such folder could be a deleted items folder. The deleted items folder could be set to automatically purge messages after a given time. The folder name is the name of the folder that will be displayed on the device 24 or the host system 10. The parent folder ID is the folder ID of the folder that is one level above the current folder in the hierarchical system. The parent folder type specifies attributes of the parent folder that differentiates it from other folders. One skilled in the art will appreciate that this representation is just one format and method for identifying folders and information within folders. The invention itself would work just as well with any other format and identification method.

Figure 7:
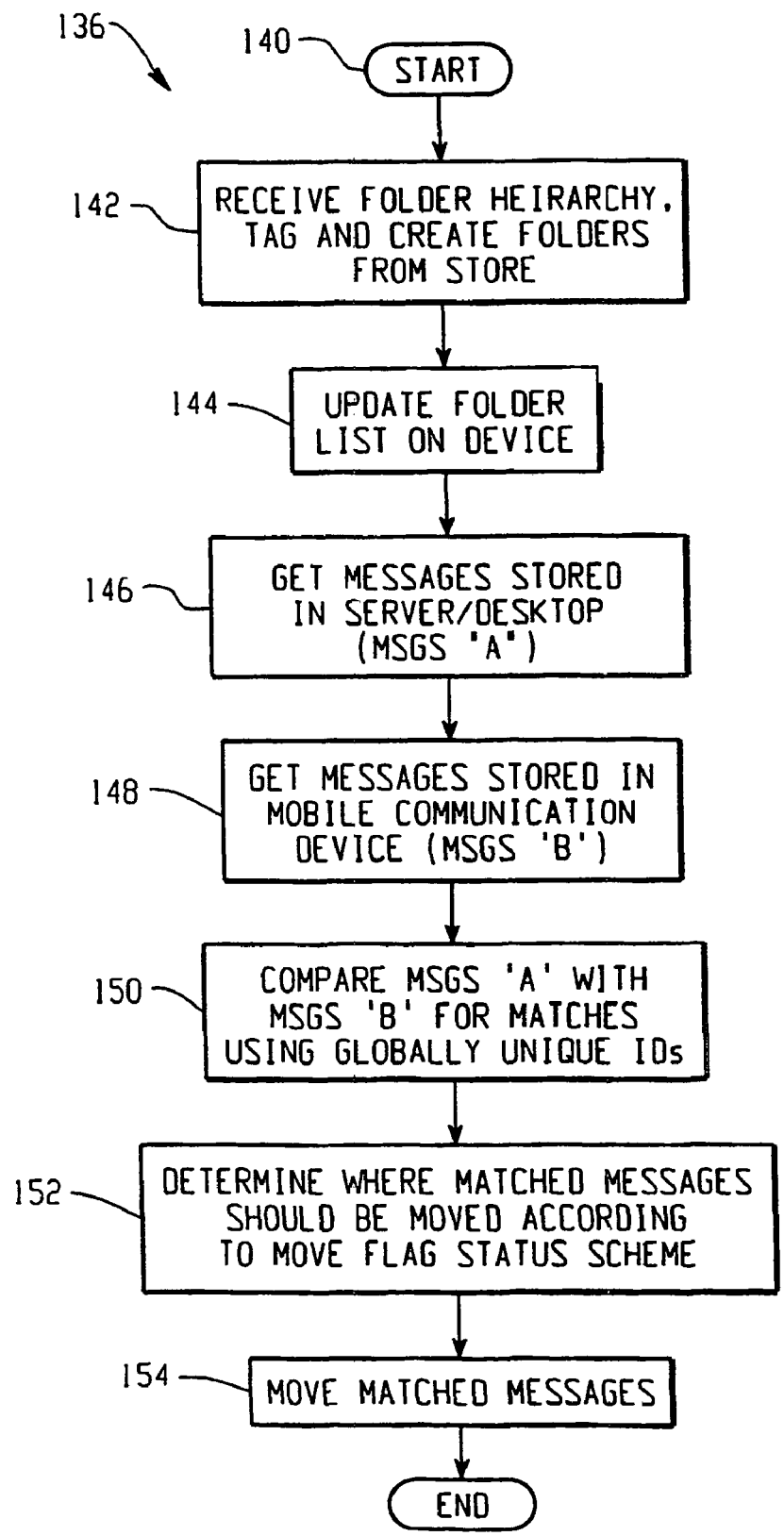
FIG. 7 is a flow chart showing the steps of synchronizing folders and messages between the host system and the mobile data communication device.

FIG. 7 is a flow chart illustrating the basic steps of synchronizing folders and messages between the host system 10 and the mobile device 24. Bulk synchronization starts in step 140 when the mobile device 24 is coupled to the host system 10 by, for example, (1) placing the device in an interface cradle or a suitable equivalent; or (2) initiating an over-the-wireless-network synchronization. In this step, the folder hierarchy is received and tagged and the folder list is created in step 142 from a store at the host system 10. In step 144, the mobile device 24 is updated using the list of folders from the store. After the folders on the mobile device are updated 144 to match the folder structures 130 in the host system 10, the messages stored in the host system 10 are retrieved in step 146. The messages in the mobile device 24 are similarly retrieved in step 148. Step 150 compares the unique message IDs of messages in the mobile device 24 and the host system 10 to find similar messages. Once similar messages are found on the mobile device 24 and the host system 10, step 152 determines whether or not a message has been moved within the folder system. When one of the two messages (host message and mobile device message) is determined to have been moved, the other message is moved to the folder that matches the folder ID of the moved message in step 154. All similar messages from the mobile device 24 and the host system 10 are checked to determine 152 where the messages should be placed and moved 154 accordingly.

The folder structure synchronization process 136 first synchronizes the folder hierarchy of the mobile device 24 to the hierarchy of the host system and then moves a message that the user has filed in a folder on the mobile device 24 to the corresponding folder on the host system 10. Correspondingly, when the user has filed a message in a folder on the host system 10, the folder structure synchronization process 136 will move the message to the corresponding folder on the mobile device 24. This is advantageous, for example, for a user who uses his default message receive folder (inbox) as a measure of incomplete and complete jobs. It also eliminates the need to deal with the message a second time once the user returns to the office and uses primarily the host system and the associated folder structure therein.

Figure 8:
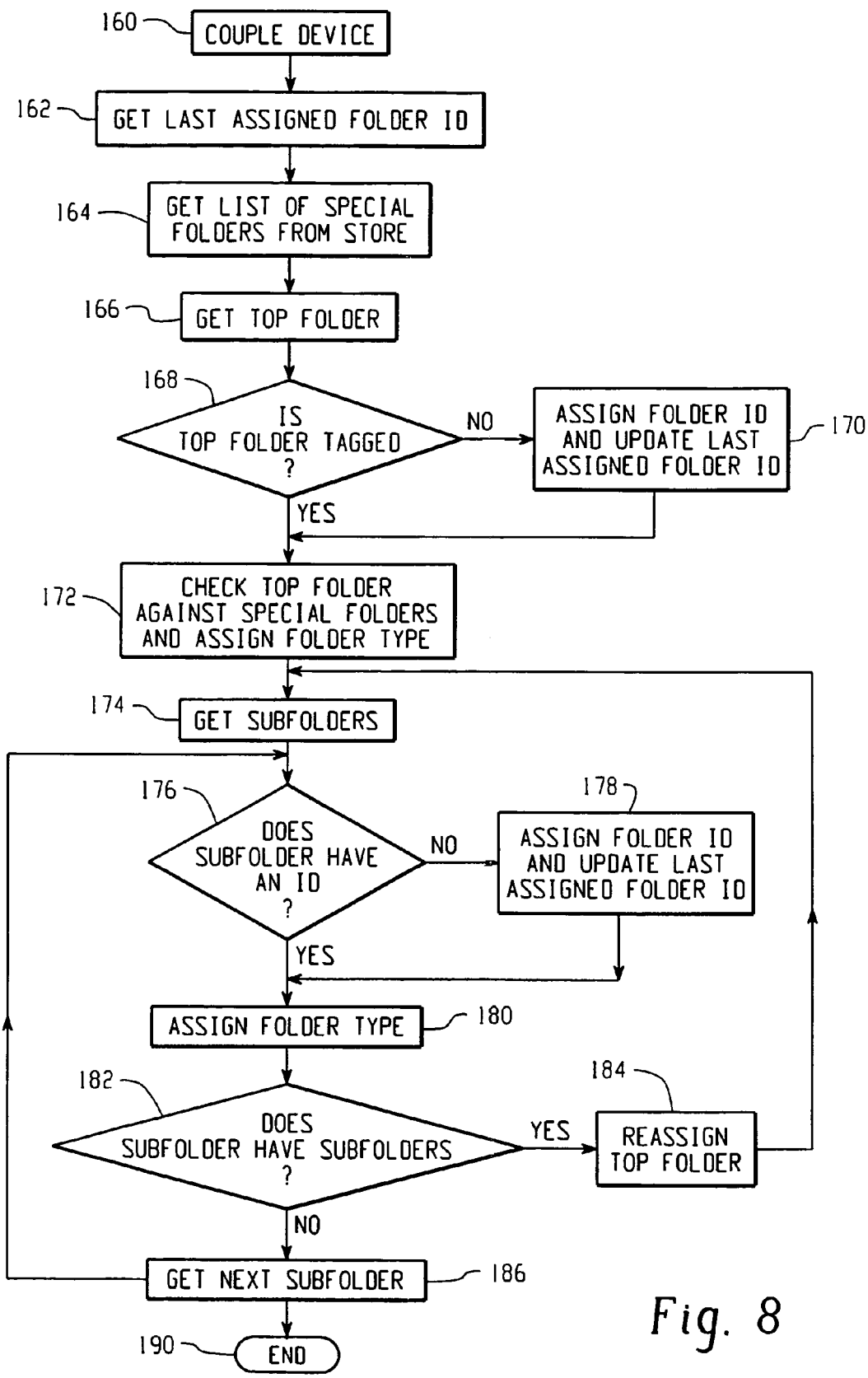
FIG. 8 is a flow chart showing the steps of assigning IDs to folders.

FIGS. 8 through 14 illustrate in more detail the steps required to synchronize the messages and folders of the mobile device 24 to the host system 10. FIG. 8 sets forth the method steps carried out by the host system 10 to assign folder IDs to the folders (step 142 from FIG. 7). When the mobile device 24 is coupled with 160 the host system 10, the last assigned folder ID is retrieved from the mobile device 24 at step 162. A "special" folder list is retrieved in step 164 from the store of the host system 10. A "special" folder is a folder such as a deleted folder or an inbox folder where specific rules are set for managing messages within the folder. Based on the hierarchical structure, the host system 10 gets the top folder in step 166 and checks if the top folder is flagged in step 168. If the top folder is not flagged, step 170 assigns a folder ID to the folder based on the last assigned number retrieved in step 162. Once the top folder is assigned an ID number, the top folder is checked against the special folders and assigned a folder type in step 172.

By continuing to select through the hierarchical folder structure, step 174 retrieves subfolders of the top folder. The subfolder is checked for a folder ID in step 176 and assigned a folder ID in step 178 if no folder ID is found in step 176. Step 180 assigns a folder type to the subfolder. Step 182 checks for a subfolder underneath the current folder. If another subfolder is found, it is assigned as the top folder in step 184 and returned to step 174. If there are no more subfolders underneath the current subfolder, step 186 retrieves the next subfolder and returns the retrieved subfolder to step 176. Once the last subfolder is retrieved, step 190 ends the tag and retrieve step 142 of the folder structure synchronization process 136. Overall, this is a recursive operation performed for all the subfolders starting from the top folder of the information store.

Figure 9:
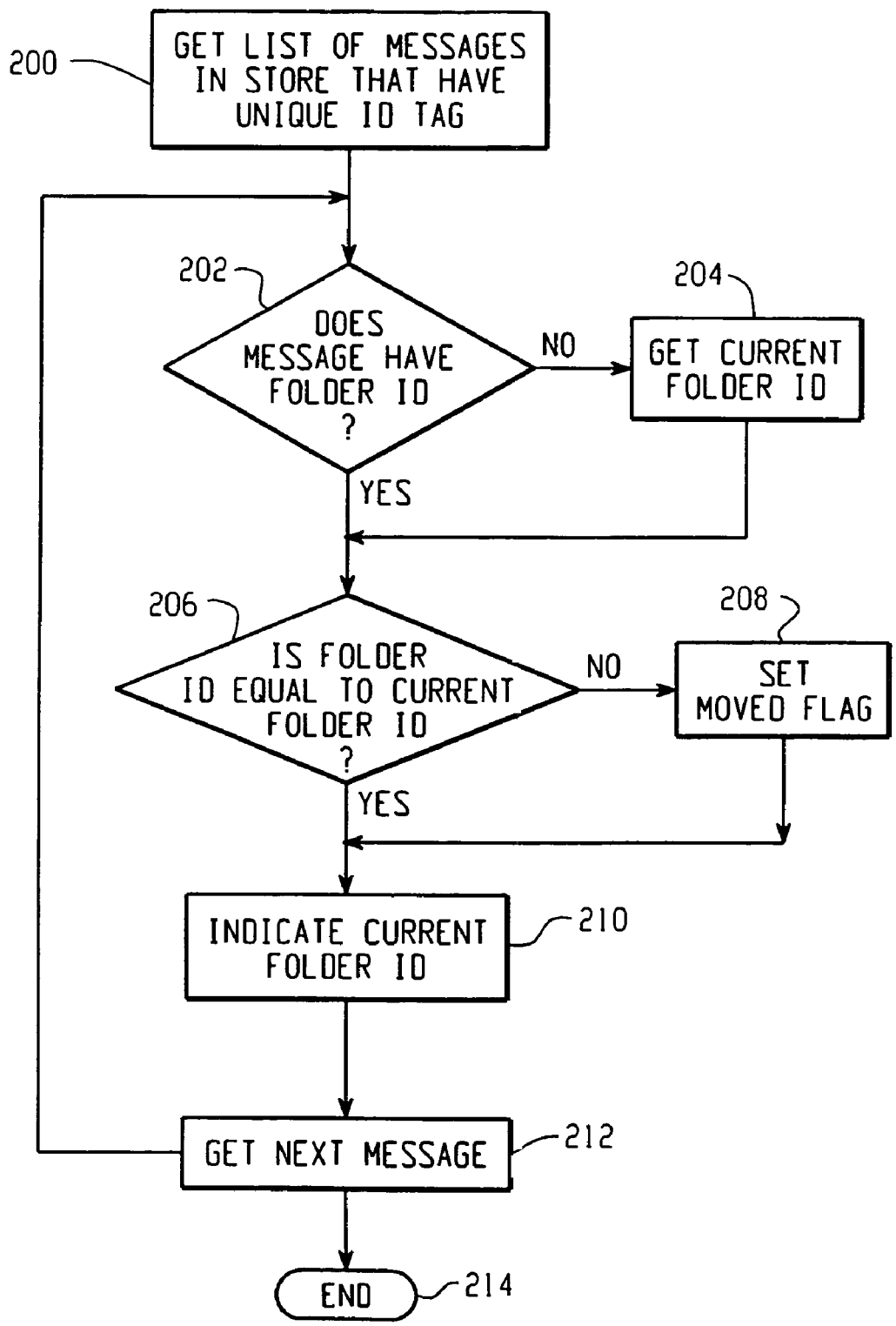
FIG. 9 is a flow chart showing the steps of retrieving messages from the store.

FIG. 9 sets forth the steps of retrieving the messages from the host system 10 as shown in step 146 of FIG. 7. Step 200 retrieves the list of messages from the store that have the unique IDs assigned to them. The message is checked for a folder ID in step 202. If a folder ID is not assigned, the current folder ID is assigned to the message in step 204. Step 206 checks the folder ID of the message against the current folder ID to see if they match. If the current folder ID and the folder ID on the message do not match, a move flag is set in step 208. The current folder ID is indicated in step 210, the next message is retrieved in step 212, and the next message is returned to step 202. Once all messages with unique IDs have been retrieved in step 212, the process ends in step 214. The list of messages with unique IDs retrieved from the store is referred to as messages 'A'.

The steps set forth in FIG. 9 are repeated for the mobile device 24. The messages from the mobile device 24 are referred to as messages 'B'. Once these steps have been accomplished, the folder structure synchronization process 136 includes a list of all unique messages 'B' and 'A' in the mobile device 24 and the host system 10, respectively. For each message in the list, a move flag is either on or off. The move flags of equivalent messages in the set of messages 'A' and 'B' are compared in FIGS. 10A and 10B to determine the proper folder placement of the message.

Figure 10A:
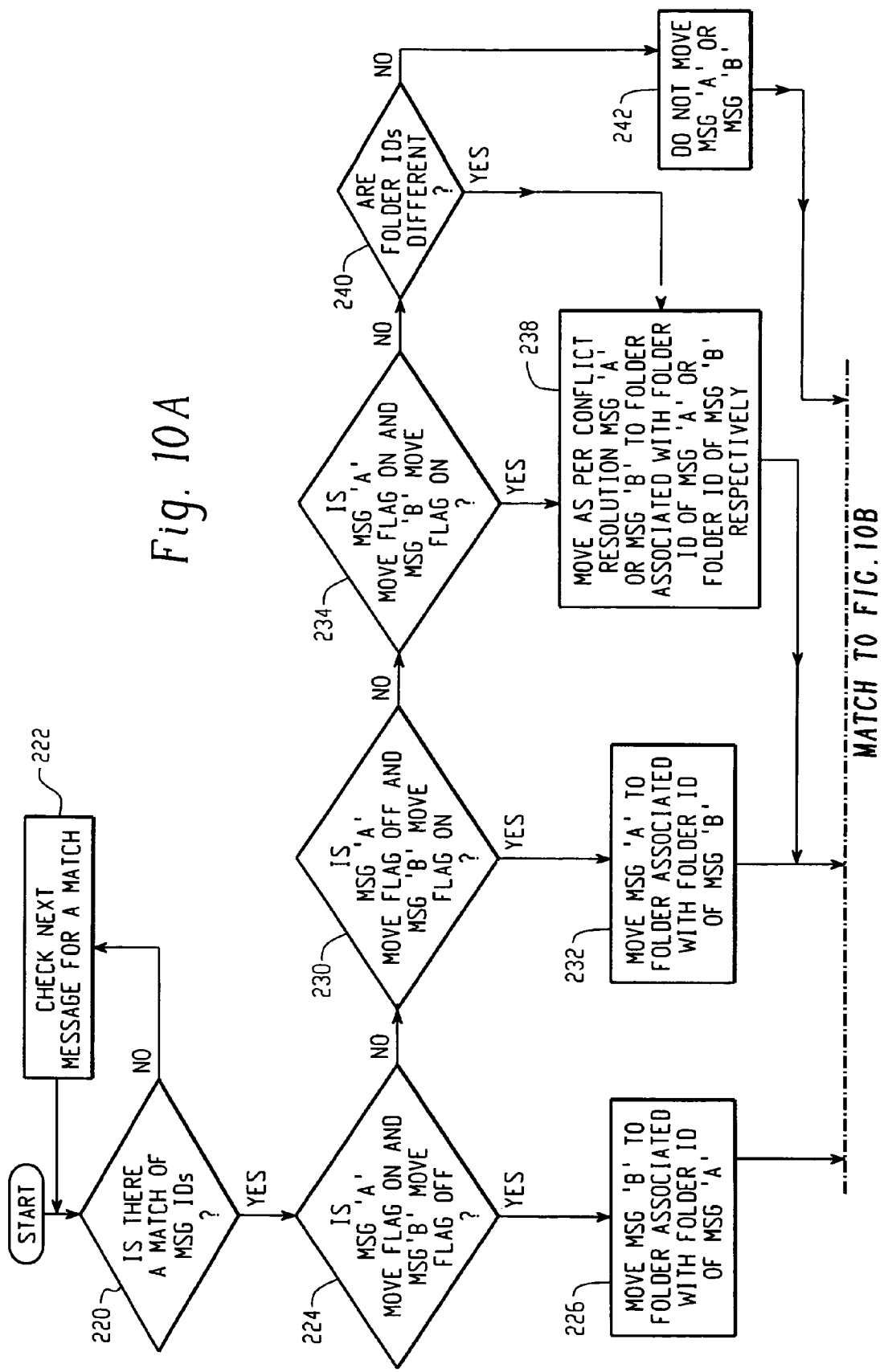
FIGS. 10A and B is a flow chart more specifically showing the steps of synchronizing messages between the host system and the mobile data communication device.
Figure 10B:
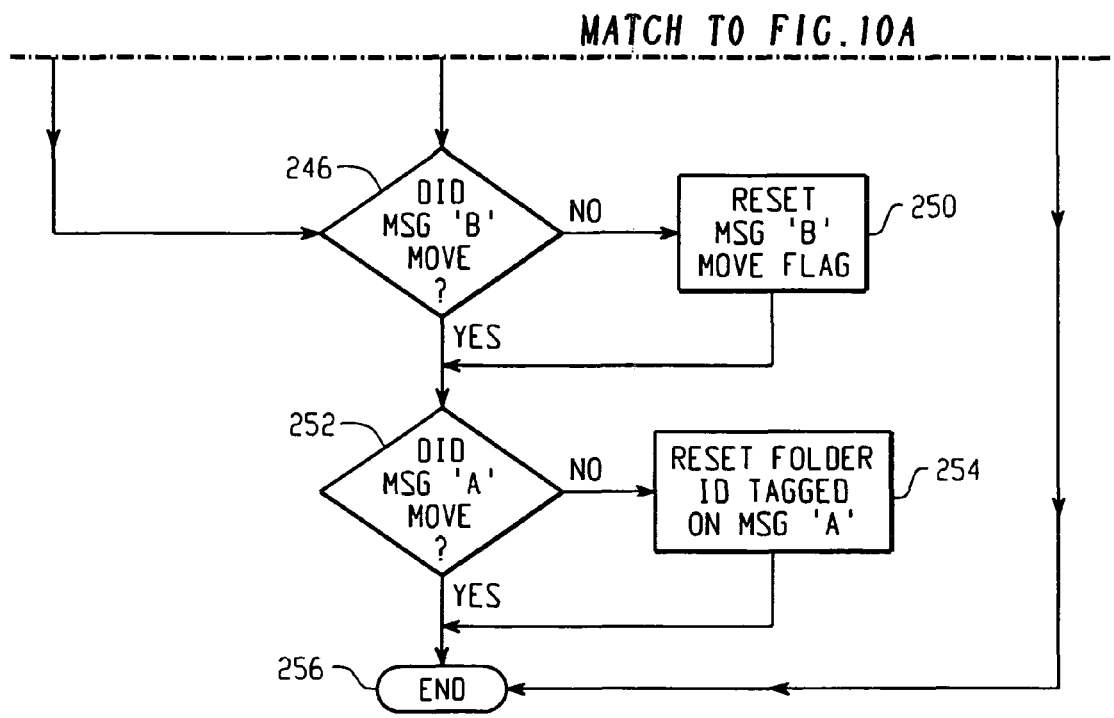

FIGS. 10A and 10B set forth the steps of synchronizing the messages between the host system 10 and the mobile device 24. Step 220 of FIG. 10 checks to see if there is a match between the message IDs of the current message 'A' and the first message 'B'. If the IDs do not match, step 222 updates message 'B' to the next message in the list of 'B' messages. Once a matching message is found, step 224 checks if the move flag for message 'A' is on and the move flag for message 'B' is off. If this is the case, message 'B' is moved to the folder having the folder ID of message 'A' on the mobile device 24 in step 226. If the move flag status is not equal to the check in step 224, step 230 checks for a different flag status.

Step 230 checks if the move flag for message 'B' is on and the move flag for message 'A' is off. If this is the case, message 'A' is moved to the folder having the folder ID of message 'B' on the host system in step 232. If the move flag status is not equal to the check in step 230, step 234 checks for move flags in both message 'A' and message 'B' to be on. If both flags are on, step 238 decides which message to move based on a conflict resolution structure. The conflict resolution structure is a predetermined rule where the software moves one of the messages based on the folder ID of the other message. If both flags are off, step 240 checks to see if the folder IDs of message 'A' and message 'B' are different. If the folder IDs are different, the conflict resolution structure of step 238 decides which message to move. If the folder IDs are the same, messages 'A' and 'B' remain in their current folders as shown in step 242.

Step 246 checks if message 'B' was moved. If message 'B' was not moved, the message 'B' move flag is reset in step 250. Message 'A' is checked in step 252 to see if it moved. If message 'A' did not move, the move flag for message 'A' is reset 254. This is accomplished by updating the folder ID on message 'A' with the folder ID that was found in during step 210. The procedure for checking the move status of the messages is completed in step 256.

Figure 11:
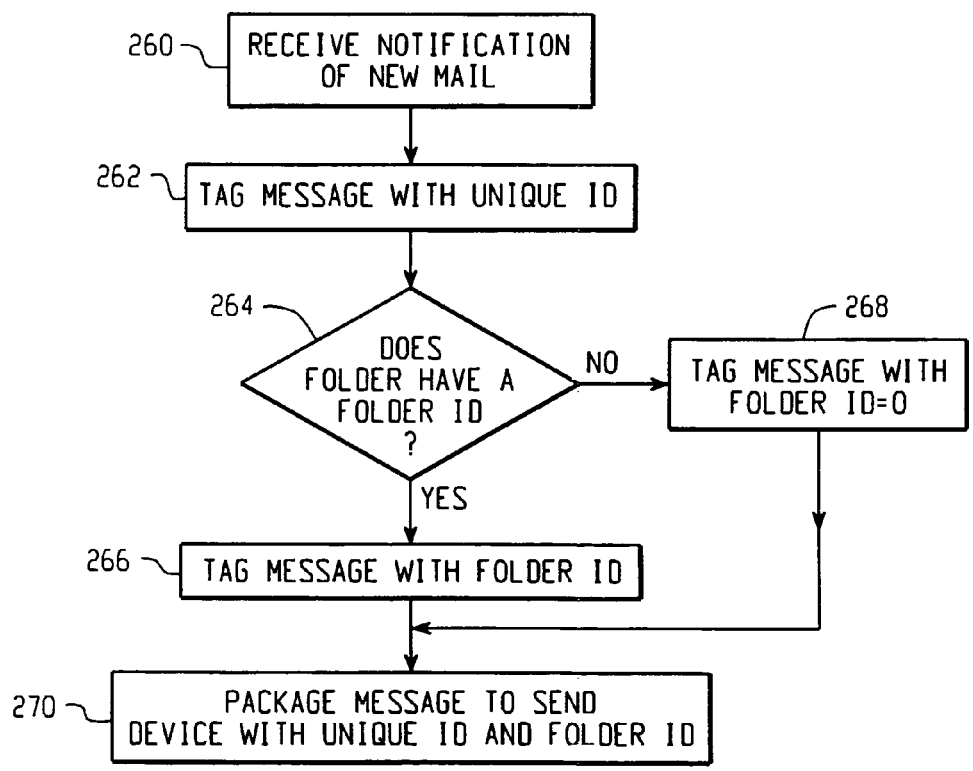
FIG. 11 is a flow chart showing the steps of attaching a folder ID to a message.

FIG. 11 sets forth the preferable method steps of assigning an ID to a newly received message at the host system for redirection. FIG. 11 is also used in the second section with respect to continuous real-time synchronization of messages between two folder hierarchies. When a new message is received in step 260, the message is tagged with a unique ID in step 262. Once the message has a unique ID, step 264 checks if the folder in which the message is to be stored has an assigned folder ID. If the folder has an ID, the folder ID of the message structure 120 for the new message is set to the folder ID value in step 266. If the folder does not have an ID, the folder ID of the message structure 120 for the new message is set to zero as shown in step 268. After the folder ID has been set in step 266 or 268, the message is sent to the device by the redirector in step 270.

The user has the option to move a message between folders on either the mobile device 24 or the host system 10. For example, a user who has a "to do" folder on both the host system 10 and the mobile device 24, might receive a message on the mobile device 24 when he is away from his host system 10. The redirector program might be instructed to place incoming messages into an Inbox folder on the device. After reviewing the message, the user decides to file the message into the "to do" folder on the mobile device 24. The software system for organizing messages and folders on the mobile device 24 sends a move signal to the host system 10 to move the same message to the "to do" folder on the host system. Later, the user decides to move the message again to a "completed tasks" folder which also resides on both the mobile device 24 and the host system 10, but this time the user initiates the move at the host system 10. The host system 10 sends a move signal to the mobile device 24 to initiate the same move on the mobile device 24. This method and system of moving messages between folders on the host system 10 and the mobile device 24 employs the "push" paradigm of the redirector software. The method steps for moving the message between folders are shown in FIG. 12 and the method steps of FIGS. 13-17 show the steps taken at the host system 10 and the mobile device 24 when the user has initiated a move on at either the host system or mobile device.

Figure 12:
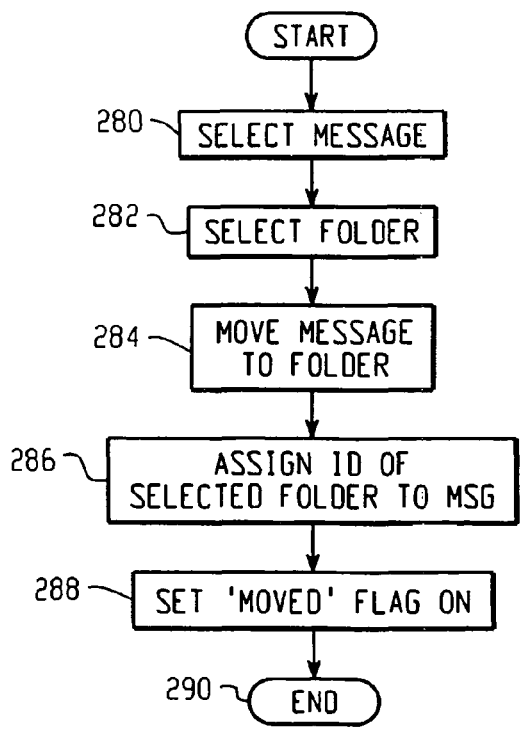
FIG. 12 is a flow chart showing the steps of moving a message locally on a device.

As shown in FIG. 12, to file a message on the mobile device 24, the message is selected in step 280. A folder to place the message is selected in step 282. The selected message is moved to the selected folder in step 284. The folder ID of the selected folder is assigned to the folder ID of the message structure 120 for the selected message in step 286 and the move flag status is set in step 288. Finally, the message has been properly moved and the steps end at step 290.

The method of continuous over-the-air-synchronization process is preferable; however, such continuous real-time synchronization has drawbacks when continuously (or frequently) transmitting data packets over the wireless network. Some of the drawbacks include (1) low bandwidth on the particular wireless network that the mobile device works with is not very robust to handle an overwhelming amount of data transfers, (2) higher costs for the service provider, user or both are generally associated with such frequent data exchanges and (3) heavier power usage on the mobile device's power source may prematurely drain the power resources of the mobile device. Therefore, it may be desirable to (1) switch the over-the-air-synchronization feature off and to leave synchronization of information organization until device-host synchronization through the wired interface cradle or (2) leave the option to the user to switch on the feature for a period of time until switched off by the user or after the expiration of predetermined period of time. In another embodiment of the present invention, the mobile device 24 bundles together and preferably compresses the various synchronizations, move commands (or other operations) created during the day and transmits the bundled information as one or more data packet transmissions during non-peak network usage or transmission times. Preferably, the bundling and the optional compression step reduces the number of data packets to be sent over the wireless network. At the host system, the redirector component receives, unbundles and appropriately acts on the information. Advantageously, this store, delay and transmit method reduces the power requirements for the mobile device thereby conserving the power store of the mobile device and may be used for any type of data item or certain types of data items. For example, the device may do the automatic over-the-network continuous transmission of emails and calendar events from the device, but delay the transmission of folder moves until non-peak times or alternatively, delay communication of such changes until a physical synchronization occurs.

Figure 13:
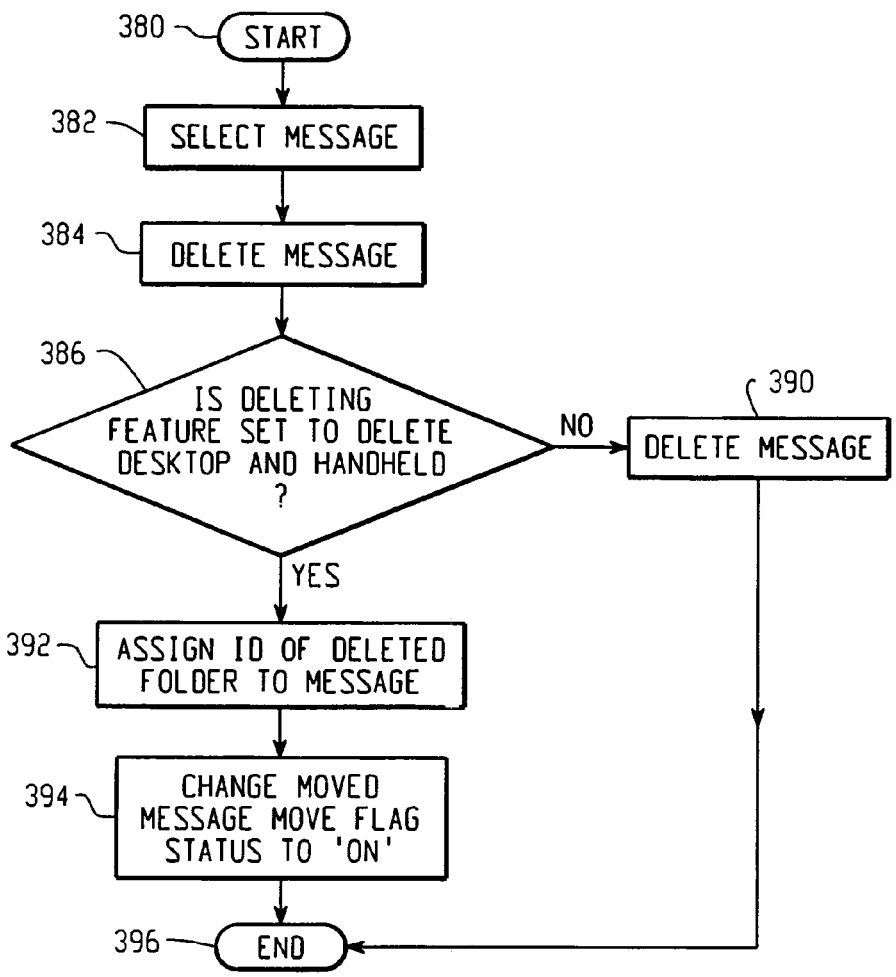
FIG. 13 is a flow chart showing the steps of deleting a message.

The steps set forth in FIG. 13 show how the device accordingly handles a delete request. The step of deleting a piece of information could be considered the same as moving the information to a deleted folder. As such once the user preforms this step it cannot be lost and must be synchronized with the host system so that the folder contents are mirrored between the two systems. The delete process is started 380 when the user has selected a message for deleting. The message is selected 382 and then deleted 384 by the software on the mobile device 24. The software on the device then determines 386 if the delete feature is set to delete messages on both the mobile device 24 and the host system 10. If the delete feature is not set for the host system and the device, the software simply deletes the message locally 390. If the delete feature is set for the host system and the device, the folder ID of the deleted folder is assigned to the message in step 392. The move flag for the message is set on 394 so that the deletion can be detected on the other device. The delete process is completed 396. In the case where the user deletes a message on the host system, the deletion of that message will be reflected upon synchronization.

Finally, the folder management system controls wasted use of resources by purging the earliest messages once allocated space is exceeded, as shown in FIG. 14. The purge process is started in step 400. The software determines 402 if storage requirements exceed the storage space allocated for messages. If the storage requirements are not exceeded, the purge process is ended 404. If the storage space is exceeded the earliest message is deleted, but the message structure 120 is retained in step 406.

Figure 15:
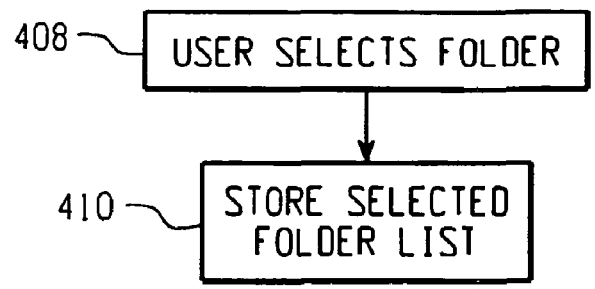
FIG. 15 is a flow chart showing the steps of generating a folder list for redirecting messages received at a store.
Figure 16:
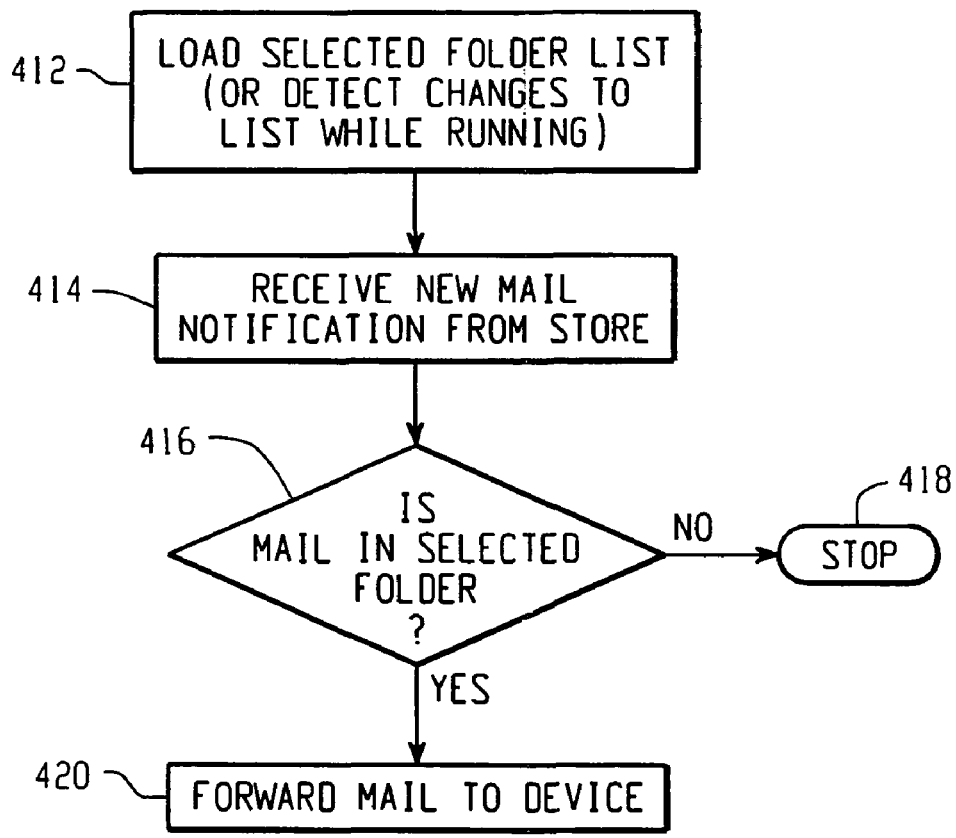
FIG. 16 is a flow chart showing the steps of redirecting a message received and filed in the folder list of FIG. 15.

FIGS. 15 and 16 set forth a method of using folder lists as a trigger source for the redirector program 12. In FIG. 15, the user selects 408 a folder and the folder is stored 410 in the folder list. FIG. 16 shows the steps set forth for forwarding a message based on the folder list. The message could, for instance be a new piece of mail. The folder list is loaded 412. A new mail notification is received 414. The software checks if the mail is in a folder from the folder list in step 416. If the mail is not in a folder listed in the folder list, the process stops 418. If the mail is in a folder listed in the folder list, then the redirector forwards the message to the mobile device 24 in step 420, as described above.

Another embodiment of the current invention is the ability to modify the message status and folder status icons as changes are synchronized with the host system. This embodiment can work either over-the-air or during a bulk transfer of message status information. Traditionally, message status icons are associated with messages at the host system 10. A message status icon is a graphical image indicating the state of the message. States may indicate that: a message is new, a message has been read, a message has been deleted, a message has been forwarded, a message has been replied to, a message has been filed or any combination thereof. The message status icon is preferably in close physical proximity, when viewed by the user as a list of messages, to the corresponding message and other corresponding message details (such as subject, sender's name, arrival time, etc.) in the graphical user interface. By way of example, if a user at the host system forwards a message from the host system to another party, the message status icon will be altered in appearance to indicate to the user a forwarding action has been applied to that particular message. In this manner and advantageously, the user has a quick visual method of reviewing a list of messages in a folder and the states of the messages, thereby knowing the actions that have already taken place with respect to those messages at the host system 10.

In accordance with the present invention and preferably, as a consequence of receiving a set of folders and messages within those folders at the mobile device 24, the mobile device 24 will either remember message state changes or they will be communicated with a message. For example if the user performs a 'Reply' to a message then when the host system 10 receives that reply it will modify the message status icon in the appropriate folder. The host system 10 will be able to process at least one of a plurality of action signals from the mobile 24 (i.e., a read signal, a filed signal, a forward signal or a reply signal), a graphical change will occur at the host system 10 to a message status icon, which is associated with the message acted upon at the mobile, to indicate to the user upon his return and access to the host system that the message has been acted upon (i.e., read, replied to, forwarded and/or filed, etc.) at the mobile. The graphical change will result in a second message status icon distinguishable from the first message status icon and, preferably, the graphical representation of the second message status icon clearly illustrates the state of the message. In one embodiment of the present invention, described in detail in the next section, and preferably as a consequence of receiving a filed signal, the host system application associated with the message will move the message to the appropriate folder so that the user upon his return and access of the host system will see information organized in the same manner as in the mobile device. In the case of a filed message that is also read at the mobile, the corresponding message, at the host system, is moved and the message status icon associated therewith at the host system is altered to indicate the read status. Likewise, in the case where a message is read and forwarded to another party at the mobile, a single second message status icon will preferably represent both statuses (i.e, read and forwarded). Preferably, any second message status icon graphical representation resulting from an action event taking place at the mobile is the same graphical representation that would occur if the action event had been undertaken at the host system 10 rather than the mobile 24. Alternatively and at the user's control preferably, any graphical representation is clearly distinguishable as to be the status change resulting from an action taking place at the mobile versus an action taking place at the host system. In the latter embodiment, the user of the redirector system herein will have quick and reliable information as to where the message was read, filed, forwarded, or replied from. Preferably and where a read-receipt is requested by a sender of the message, upon receiving the read signal from the mobile, the redirector or any associated message application such MS Exchange™ or Lotus Notes™ will direct a read-receipt signal to the read-receipt requester.

Folder Synchronization Advanced Methods

As laid out in the first section there are many basics necessary for any folder synchronization to take place. The idea of a one-time bulk synchronization, a step of labeling the folders in a consistent fashion and the idea of a bulk synchronization after many changes have been made are all important to any synchronization. The main advantage of using a bulk method for synchronization is to reduce airtime costs. If the cost factor were to be eliminated it is possible to perform all the steps over the air or to mix the modes so the only time a bulk synchronization would be performed is when the user uses the invention for the first time ("The Setup Stage").

The process of synchronizing all this information between these two data stores can take place in several possible ways. As mentioned the user might select a 'batch-mode' method to reduce air-time costs and save battery life. If the batch mode is used then the software could either use a very slow and time consuming method of compare each message to determine which messages from the mobile data store had moved from the host data store. The next most advanced method would be to use folder Ids and message Ids, combined with 'move' indicator flags to facilitate knowing which messages had been moved from a first folder into a second folder. This effectively would create a 'change list' of actions performed: by the user. In the preferred embodiment if the user did not select the batch-mode approach but performed the real-time over-the-air method, this later technique would be the best method. This method would also use folder Ids and message Ids to facilitate the identification and movement of messages and the modification of folders. This advanced real-time, over-the-air mirroring of information (i.e., synchronized) is illustrated in FIGS. 17 through 25. The advanced method of performing all synchronization over the wireless network is referred hereinafter as the "over-the-air-move" process.

Figure 17:
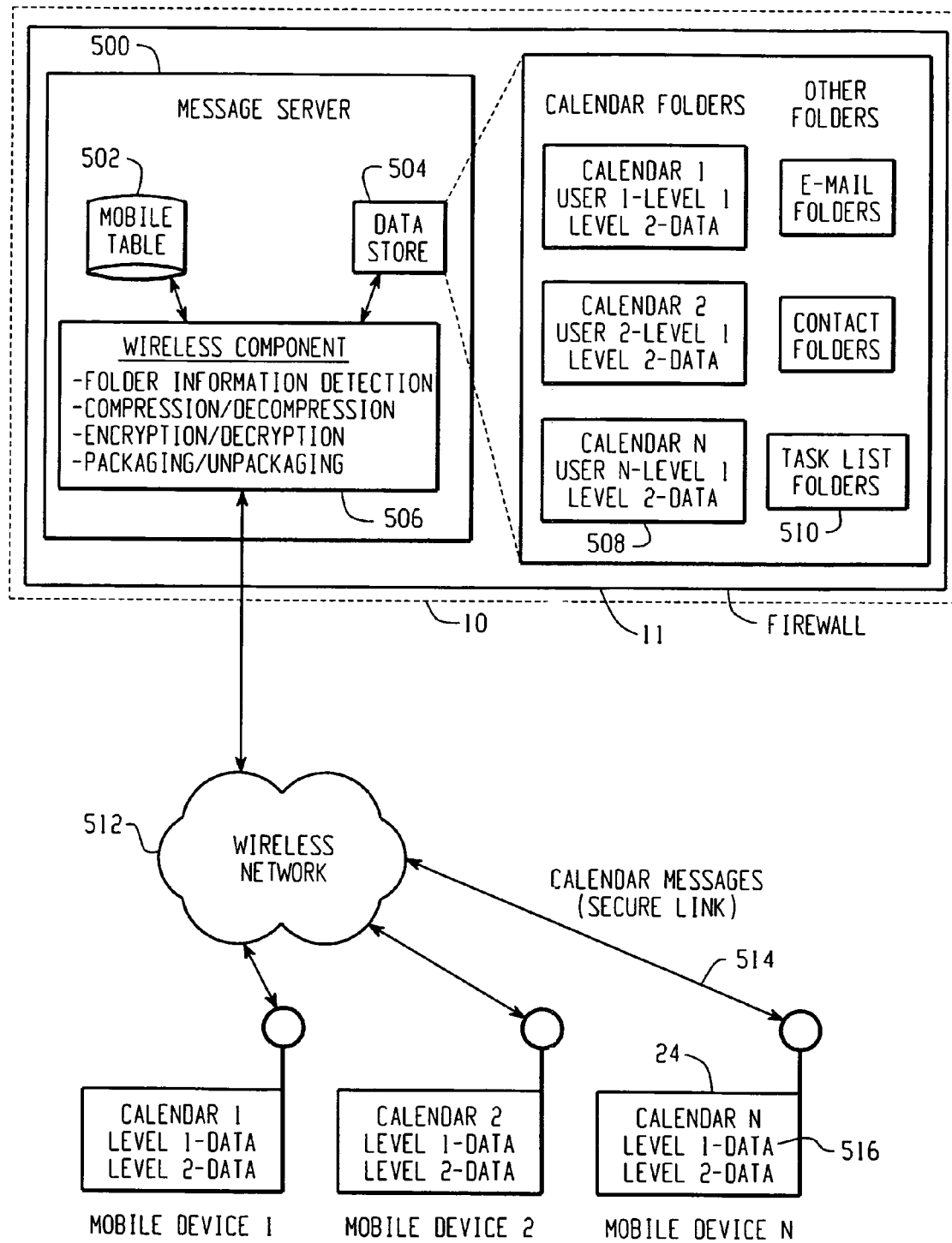
FIG. 17 is an overview of the invention showing both the data store at the host system and the data store at the mobile device.

FIG. 17 presents several elements of the overall system. The data store that is part of the message server is comprised of many sub-data stores, in this example shown are calendar stores for different users. One of the responsibilities of the wireless component, which is integrated with the message server, is to mirror all or part of the data store at or associated with the message server with corresponding data stores on mobile devices.

Turning now to FIG. 17 there is a message server 500, that is operating at, associated with or working in conjunction with the host system 10. The message server 500 is generally a very complex piece of software that might manage all the information within a corporation that preferably resides behind the host system or corporate firewall 11. The heart of this message server could be a Microsoft Exchange Server™, Lotus Notes Server™, an Oracle™ Database Server, an SQL Server, or some combination thereof Furthermore, the preceding list of message servers could also be the next generation of message servers that has one or more components to manage and handle data traffic flow to and from mobile devices associated with users or accounts of the message server. One component of the message server 500 is a data storage 504 facility that holds each individual users data that is configured to access the message server. In this example the message server 500 also has a Wireless Component 506, and a mobile table 502. The mobile table 502 may be part of the Wireless Component 506, but is preferably populated by the Wireless Component 506, as users are configured. In this example the data store 504 is composed of many Calendar storage areas 508, that are all sub-components of the data store. The Calendar Folders are effectively just one group of folders that are present in the message server. Also shown are a series of other folders 510 including an e-mail folder, a contact folder and a task list folder.

Some of the functions of the Wireless Component 506 include interfaces to the mobile device 24 through a wireless network 512 and encoding and decoding messages and commands that must be exchanged. Another element of the Wireless Component 506 is the detection of folder changes or the execution of folder changes on behalf of the mobile device 24. As changes take place on either the host system 10 or the mobile device 24, calendar messages 514 are exchanged over a secure communication link via the wireless network 512. The wireless component 506 uses a mobile table, that is kept either in the message server or in the data store, to map a user of the host system or message server to a mobile device. Effectively this mapping allows changes between the message server data store and the mobile device's data store to be mapped to each other. The wireless component 506 maintains a constant, real-time link between the two systems over the wireless network 512. On each mobile device 24 is a copy of parts of the data store that was on the host system. In this example a calendar data store 516 is shown, but other data stores could also be present simultaneously on the mobile device 24.

Figure 18A:
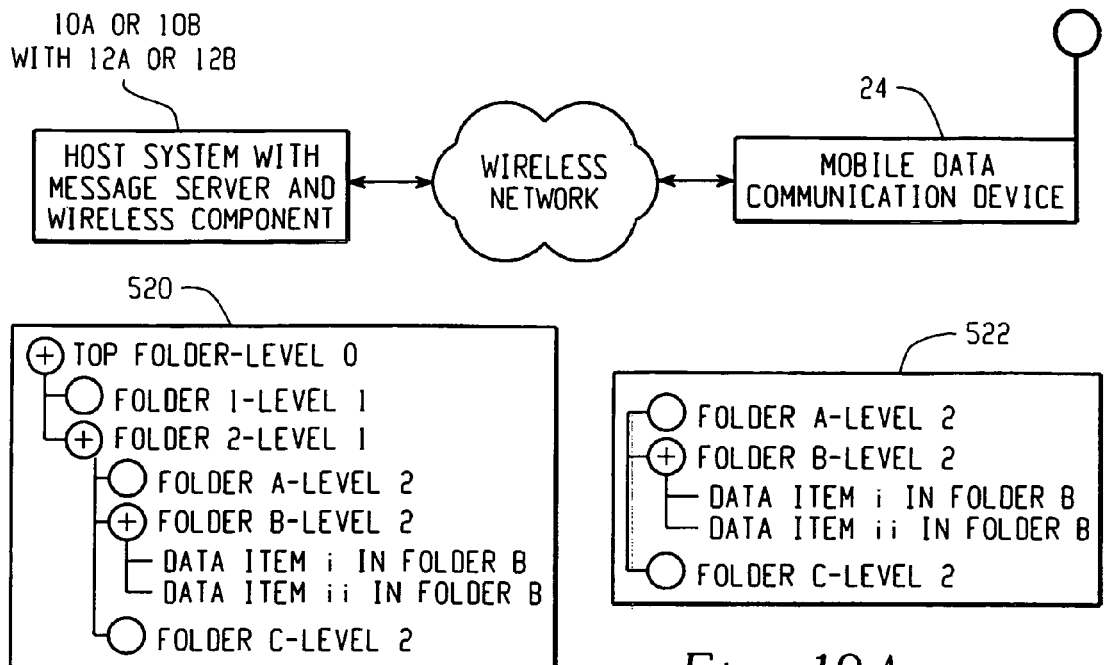
FIG. 18 a sample representation of host and mobile device data store hierarchies, this also includes a specific calendar data store example.
Figure 18B:
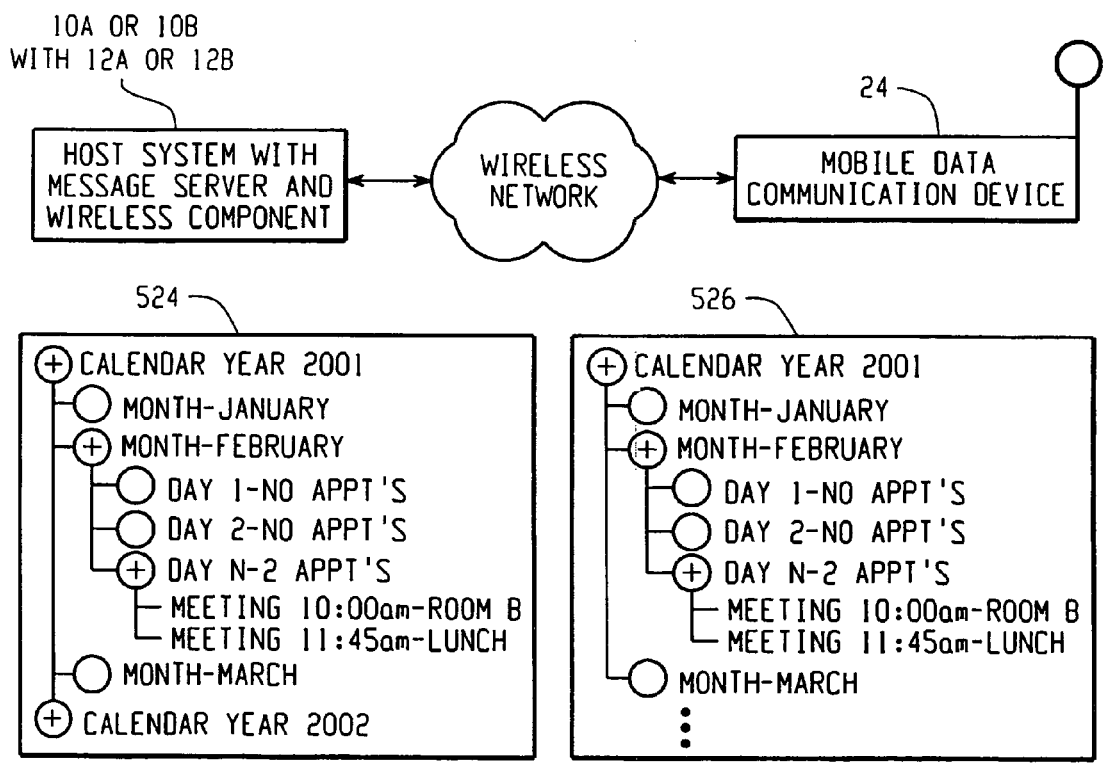
Figure 19A:
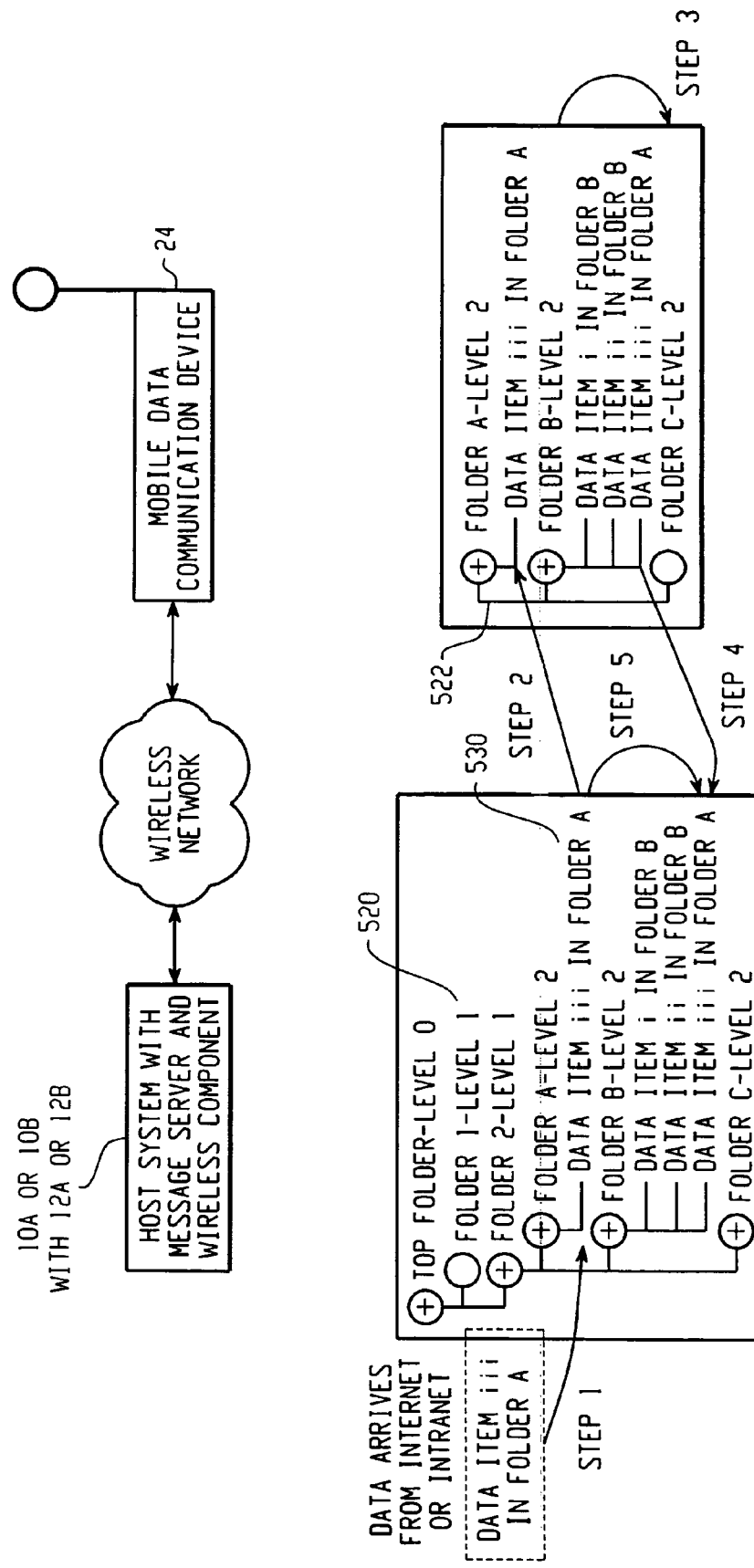
FIG. 19 is an example of what happens when a new data item arrives into the folder hierarchy, include a specific calendar hierarchy example.
Figure 19B:
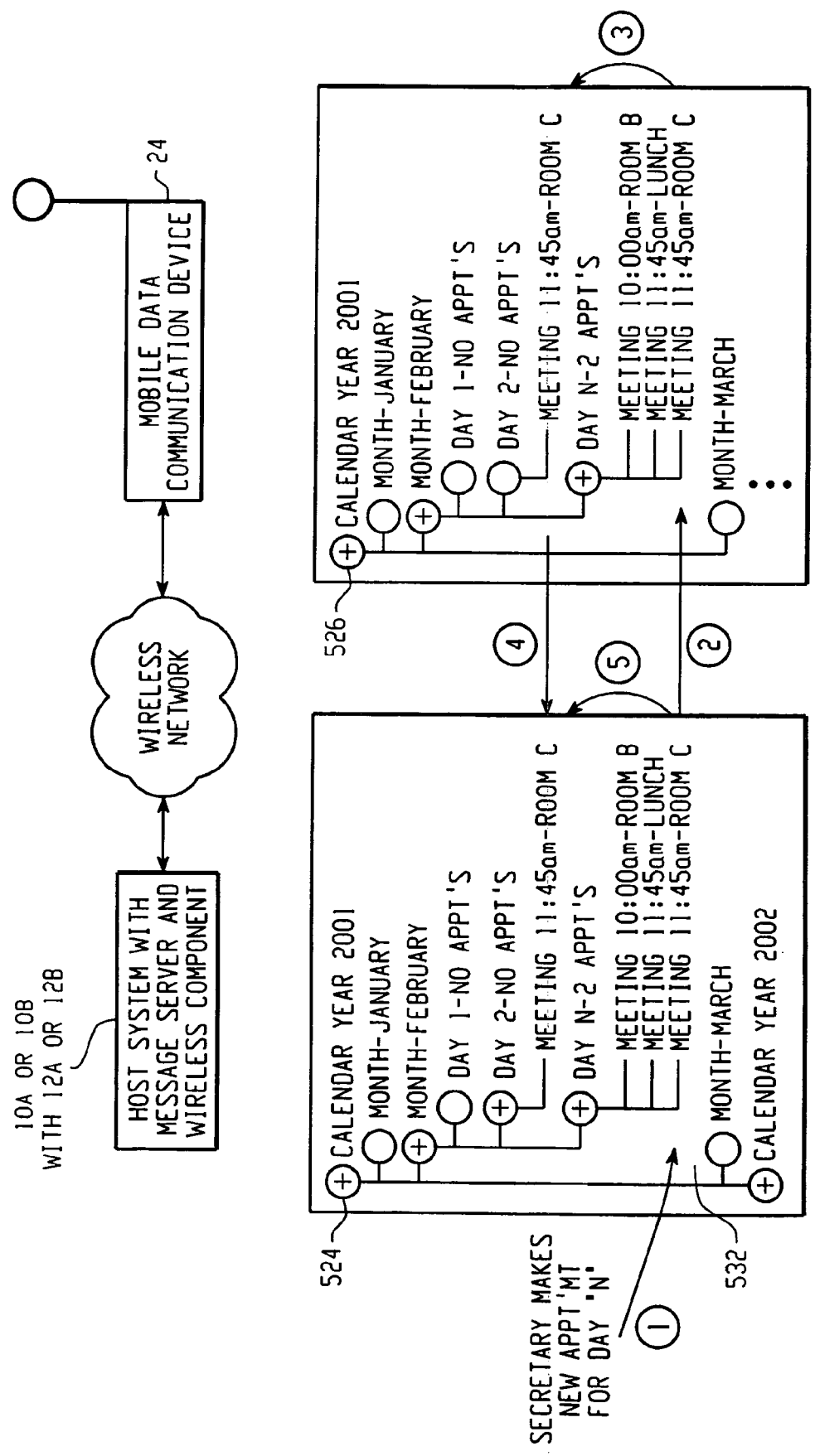
Figure 20A:
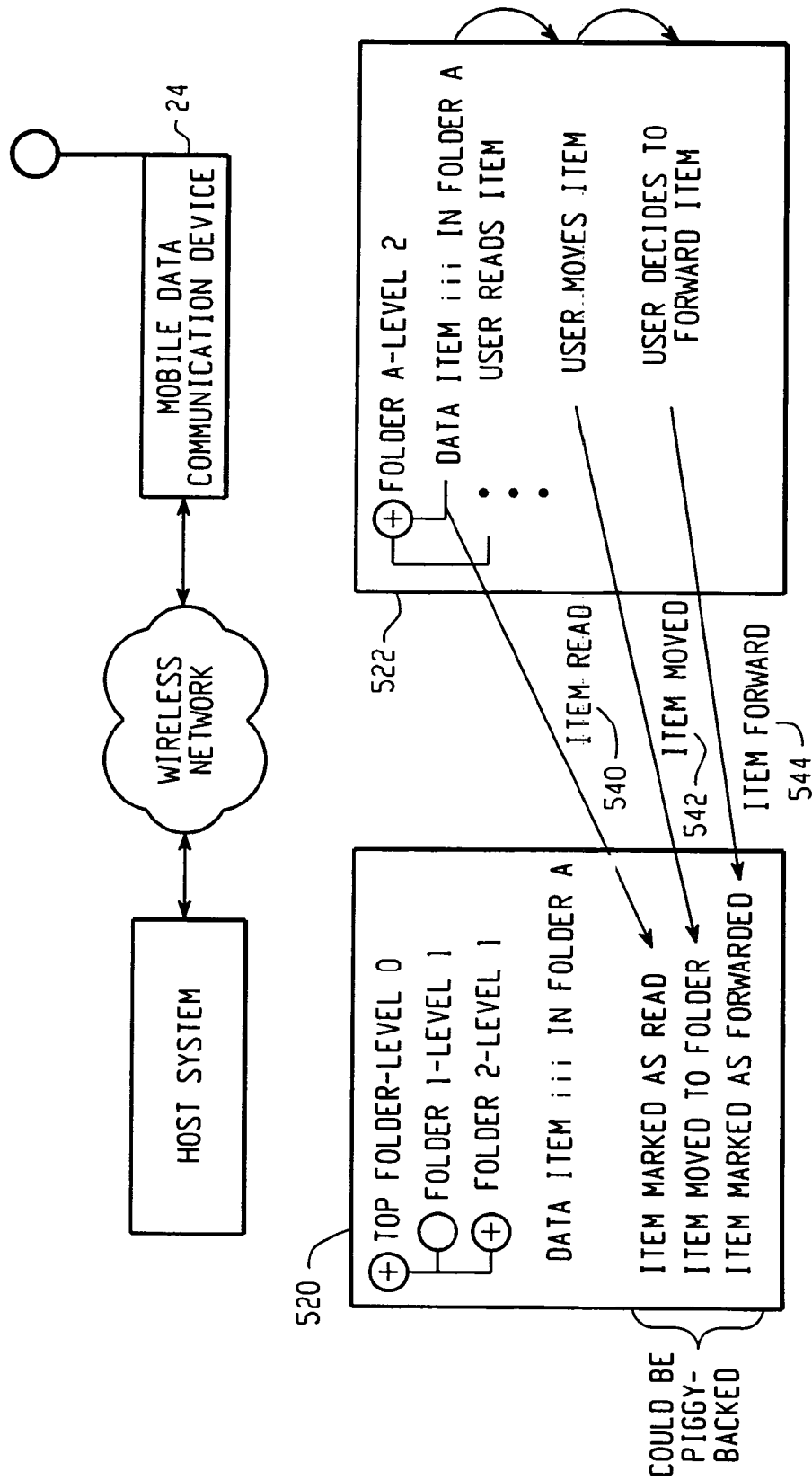
FIG. 20 is an example of advanced message status signals being sent between the host and mobile system.
Figure 20B:
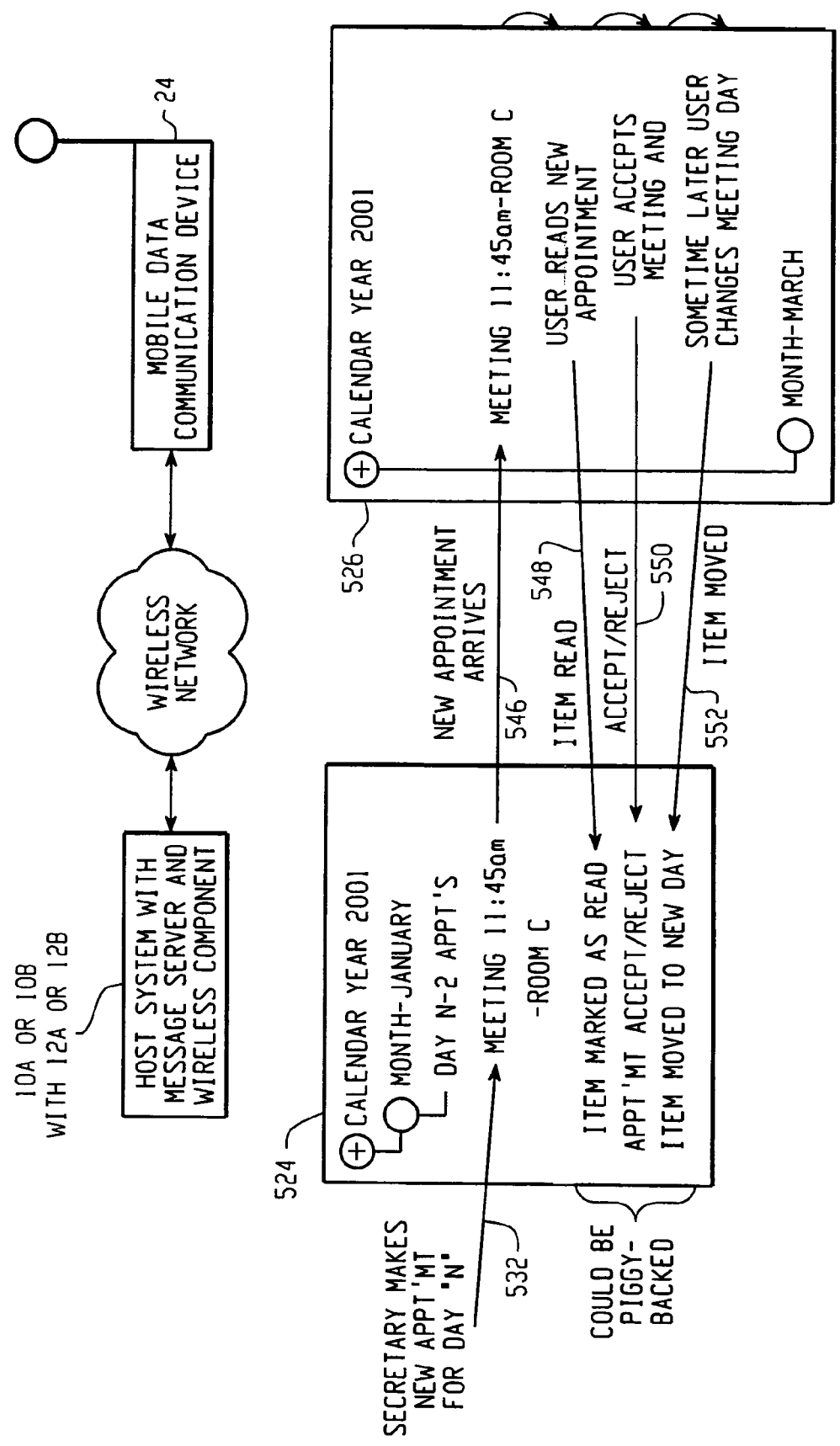

Looking at FIGS. 18, 19 and 20 these are a series of diagrams showing a sample representation of two data store hierarchies and how these hierarchies interact with each other. The advanced concept of real-time data storage mirroring between a host system and a mobile device is unique to this invention. In the preferred embodiment, the user's experience with the mobile device virtually or at least substantially mirrors their experience on the host system. Whether the data store has categories and folders of contact names, e-mail messages, to-do items, expense lists, calendar entries, work flow jobs or journal entries the user can have a consistent filing experience on both the mobile device and the host system.

Turning now to FIG. 18 there are two message stores both for a host system 10A/10B and a mobile device 24. Within the host system 10A/10B there is also present redirection software 12A or 12B being used to exchange data items with the mobile computer 24. These two systems each have their own individual hierarchies 520 and 522 respectively. In this example the mobile device 24 hierarchy 522 is a subset of the larger host 10 folder hierarchy 520. The hierarchies are defined with both folder names (like folder 1—Level 1) and data items stored within those folders (like data item i in folder B). Each folder name has a level based on its relationship to other folders within the system. In the preferred embodiment the user's mobile device folders 24 might start out matching the host's folders, but this is not a requirement and the user could change the configuration of their folders while they are traveling by adding or modifying the folders. At some point in time, either by a direct serial connection or via wireless data exchange the folders are synchronized to match each other. In this description of the embodiment the changes are synchronized using a real-time, over-the-air link.

Once the folders are synchronized the software can then proceed to synchronize data items within those folders. This is done either by retrieving messages at the host system 10 and the mobile system 24 and comparing their locations (520 and 522), or by marking those message that have moved. The later case is called 'batch-mode' synchronization; and was discussed in the last section. In the preferred embodiment there is no batch synchronization and every message that is moved or changed on the mobile device 24 eventually causes a command to be sent back to the host system 10. Such a command might be piggybacked on top of a normal data message leaving the mobile device to reduce overall traffic from the mobile device. In other words, the command and the data message could be packaged together and then transmitted from the device, or alternatively, the command could be packaged, the data message could also be packaged and then the two packaged items may be then be collectively packaged and then transmitted from the device.

To help understand how a folder hierarchy is used with convention user data there is a further example in FIG. 18 showing a calendar hierarchy. In the Host Calendar Folder 524 the top folder is represented by a Calendar Year, like 2001. The next subsequent folder level called Level 1, is represented by a month like January or February. The next subsequent folder level, called level 2, is represented by a day of the week. As one skilled in the art can appreciate there might be other ways to divide up the folder hierarchy but the intention is the same. Each level has a relationship to each other, and message are filed into the hierarchy based on their relationship to the levels. For example as shown there is a meeting present in Room B on Day 'N', in the month of February, within the year 2001. This meeting was filed here specifically because the meeting information entered by the user corresponded to this folder location. Also shown in this example is the fact that the mobile device 24 does not have the calendar year 2002. This is possible to save memory or space on the mobile device 24, and can be controlled by the user when they are setting up the system and configuring the host system 10 and mobile device 24.

Turning now to FIG. 19 there is an exchange of information between the host system and the mobile device. In this example a data item 530 is exchanged between the host system 10 and the mobile device 24. In the preferred embodiment in step 1 a data item 530 arrives from the Internet or the Intranet and is placed in a folder based on a pre-configured rule established by the user or that is part of the host's reception system. Data item iii (530) has been added to folder A—Level 2. In step 2 this data item iii 530 is then redirected to the mobile device 24 as described in earlier sections following the trigger and redirection rules that are part of the redirection software 12. This data item 530 then arrives at the mobile device 24 and is placed into a certain folder by default, in this case matching the original folder A—Level 2. In step 3 after reviewing the new data item 530 the user decides to file the message into another folder, folder B—Level 2, as part of their categorization process. In step 4 this movement is then reflected back to the host system 10 in a command sequence that might also include: an special Id (identification) assigned to the message and an Id for the folder it should be moved into. For one skilled in the art these Ids are easily assigned and maintained for tracking folders and data items between the two independent systems. The entire sequence is then terminated in step 5 where the user's actions on the mobile device 24 is carried out on the host system 10 and the data item iii is also moved to Folder B—Level 2 on behalf of the user. This action at the host system 24 effectively mirrors exactly the action performed on the data item iii 530 on the mobile device 24.

FIG. 19 also shows a real life example where the same set of steps is performed on a calendar data store on a host system 524 and a mobile device 526. In step 1 of this calendar example the user's secretary enters a new appointment 532 for the user in their own calendar on the companies message server 500. The meeting is at 11:45 am in Room C on what appears to be a very busy day already. Step 2 has this new calendar entry redirected to the mobile device 24 as previous described using the wireless component 506 of the message server 500. In step 3 the user reviews the new calendar entry and moves it to Day 2, which is currently empty. This movement causes step 4 to take place and results in a 'move command' being sent to the message server 500, via the wireless component 506 indicating the item number that has been moved. This command also provides the data items original folder (Day N) and its new folder (Day 2). Step 5 is when the message server 500 moves the calendar entry 532 into the new Day 2 folder just as the user requested from the mobile device 24.

Reviewing FIG. 20 there is example of how every change to data items within the folder hierarchy can be mirrored back to the host system in order to keep the two systems completely in synchronization. Once the user does arrive back to their host system desktop computer this real-time synchronization also has the benefit of allowing the user to see exactly what has happened to their data folders while they were traveling. The method used to maintain this real-time synchronization is to send a series of signals or message status flags back to the message server. This additional information may or may not be piggy-backed with real message data, and can include one or more of the following actions, the fact that the message: has been read (the information associated therewith is a "read signal"); has been filed in a specific folder (the information associated therewith is a "filed signal"); has been forwarded to another recipient (the information associated therewith is a "forward signal"); or, has been replied to (the information associated therewith is a "reply signal"). These actions can then be synchronized with the host system, thus eliminating the need for the user to perform these actions a second time.

Traditionally, message status icons are associated with messages at the host system 10. A message status icon is a graphical image indicating the state of the message. States may indicate that: a message is new, a message has been read, a message has been deleted, a message has been forwarded, a message has been replied to, a message has been filed or any combination thereof. The message status icon is preferably in close physical proximity, when viewed by the user as a list of messages, to the corresponding message and other corresponding message details (such as subject, sender's name, arrival time, etc.) in the graphical user interface. By way of example, if a user at the host system forwards a message from the host system to another party, the message status icon will be altered in appearance to indicate to the user a forwarding action has been applied to that particular message. In this manner and advantageously, the user has a quick visual method of reviewing a list of messages in a folder and the states of the messages, thereby knowing the actions that have already taken place with respect to those messages at the host system 10.

In accordance with the present invention and preferably, as a consequence of receiving at the host system 10 at least one of a plurality of action signals from the mobile 24 (i.e., a read signal, a filed signal, a forward signal or a reply signal), a graphical change will occur at the host system 10 to a message status icon, which is associated with the message acted upon at the mobile, to indicate to the user upon his return and access to the host system that the message has been acted upon (i.e., read, replied to, forwarded and/or filed, etc.) at the mobile. The graphical change will result in a second message status icon distinguishable from the first message status icon and, preferably, the graphical representation of the second message status icon clearly illustrates the state of the message. In one embodiment of the present invention and preferably, as a consequence of receiving a filed signal, the host system application associated with the message will move the message to the appropriate folder so that the user upon his return and access of the host system will see information organized in the same manner as in the mobile device. In the case of a filed message that is also read at the mobile, the corresponding message, at the host system, is moved and the message status icon associated therewith at the host system is altered to indicate the read status. Likewise, in the case where a message is read and forwarded to another party at the mobile, a single second message status icon will preferably represent both statuses (i.e, read and forwarded). Preferably, any second message status icon graphical representation resulting from an action event taking place at the mobile is the same graphical representation that would occur if the action event had been undertaken at the host system 10 rather than the mobile 24. Alternatively and at the user's control preferably, any graphical representation is clearly distinguishable as to be the status change resulting from an action taking place at the mobile versus an action taking place at the host system. In the latter embodiment, the user of the redirector system herein will have quick and reliable information as to where the message was read, filed, forwarded, or replied from. Preferably and where a read-receipt is requested by a sender of the message, upon receiving the read signal from the mobile, the redirector or any associated message application such MS Exchange™ or Lotus Notes™ will direct a read-receipt signal to the read-receipt requester.

In one embodiment of the present invention, the invention allows for a notification of the state of a redirected message at the mobile. It is to be understood that the status signals may be forwarded to the host system during other times as well, such as during synchronization or real-time over-the-air-moves as described below.

In another embodiment of the present invention, there is provided a method of indicating at the host system the state of the message at the mobile communications device. The steps of this method preferably include: (A) altering the state of a first message at the mobile communications device thereby creating an altered state; (B) forwarding a status signal to the host system; and, (C) changing at the host system a first message status icon based on the altered state at the mobile communications device. Therefore, according to one aspect of the invention, the message status icon change indicates an altered state of the message at the mobile communication device.

In another embodiment of the present invention, there is provided a method of indicating at the host system the state of the message at the mobile communications device. The steps of this method preferably include: (A) redirecting a first message from the host system to the mobile communications device, wherein the first message at the host system has a first message status icon; (B) receiving the redirected first message from the host system at the mobile communications device; (C) altering the state of the first message at the mobile communications device thereby creating an altered state; (D) forwarding a status signal to the host system; and, (E) changing at the host system the first message status icon based on the action taken at the mobile communications device.

In one embodiment of the invention, there is provided a method of indicating at a first device such as a sender's host system or mobile device, via the host system the state of the message at the mobile communications device. The steps of this method preferably include: (A) redirecting a first message from the host system to the mobile communications device, wherein the first message at the host system has a first message status icon; (B) receiving the redirected first message from the host system at the mobile communications device; (C) altering the state of the first message at the mobile communications device thereby creating an altered state; (D) forwarding a status signal to the host system; and, (E) changing at the host system the first message status icon based on the action taken at the mobile communications device; and (F) forwarding a read-receipt to a read-receipt requester's device.

Turning now to FIG. 20 there are again two data stores each with folder hierarchy. Within the host system folder hierarchy 520 there is a truncated view of the same folder presented in FIGS. 18 and 19. On the mobile device the folder hierarchy 522 is shown with various actions being performed on it by the user. This example shows the preferred and most like embodiment of the invention as new data items arrive and are placed into folders. In this example the user receives a new message from the host system, which is opened and read. This action triggers a special command sequence or signal is generated to tell the host that this action has taken place 540. This signal may or may not be immediately sent to the host, in the preferred embodiment this signal is piggybacked on real data leaving the mobile device 24 whenever possible. The user then decides to move the message to a new folder, which generates another signal 542, which again may or may not be immediately sent to the host system 10. Finally the user has decided to reply to the message or to forward the message after they have filed it 544. This process final step definitely causes a message to leave the mobile device accompanied by any other pending command signals indicating the message has changed it's status. As mentioned already in an advanced implementation of the invention the movement of the message to the folder might be piggybacked on another data message that is leaving the system by using a time delay on all signals being sent to the host system indicating message status changes. In this example the host system not only moves the message to another folder but also changes an icon associated to the message within that folder. As a result the user is then able to scan the folder and visually check which messages have been dealt with during their trip. This combination of message movement between folders and status icon alternation allows the host to immediately reflect the changes made at the mobile device. This creates a mirroring effect between the mobile device data store and the host system data store for all those data items present in both systems.

As a concrete example FIG. 20 also includes a calendar folder with a series of actions being performed on them. The first step in this example occurs when a new calendar appointment is entered by the secretary 532 in the host system folders 524. This new appointment is sent to the mobile device calendar folder 526 and the user is notified of its arrival 546. The user first opens the new appointment which generates a 'read signal' 548 that will eventually be sent to the host system. This is important as the user might decide to ignore the calendar appointment but the secretary needs to know the user has at least seen the appointment. In this example however the user does decide to accept the meeting request, which generates another signal 550 indicating that an acceptance or rejection of the calendar event has taken place. Several days later the user decides the meeting doesn't work so they move the calendar event to another day. This movement causes an item moved signal to be sent to the host system 552. These data item state changes and others are all part of how the invention manages to keep two folder hierarchies synchronized in real-time across a wireless network.

As presented in FIGS. 18, 19 and 20 the simple action of reading a message on the mobile device causes a change in state for the message on the mobile device. In the advanced embodiment this change of state will also be communicated back to the host system and change the status icon. Further, if requested by the sender and allowed by the user, a read-receipt can be returned to the original sender. Effectively this means the mobile device can generate a read-receipt and it can be automatically pushed to the host system and relayed on to the original message sender.

Figure 21:
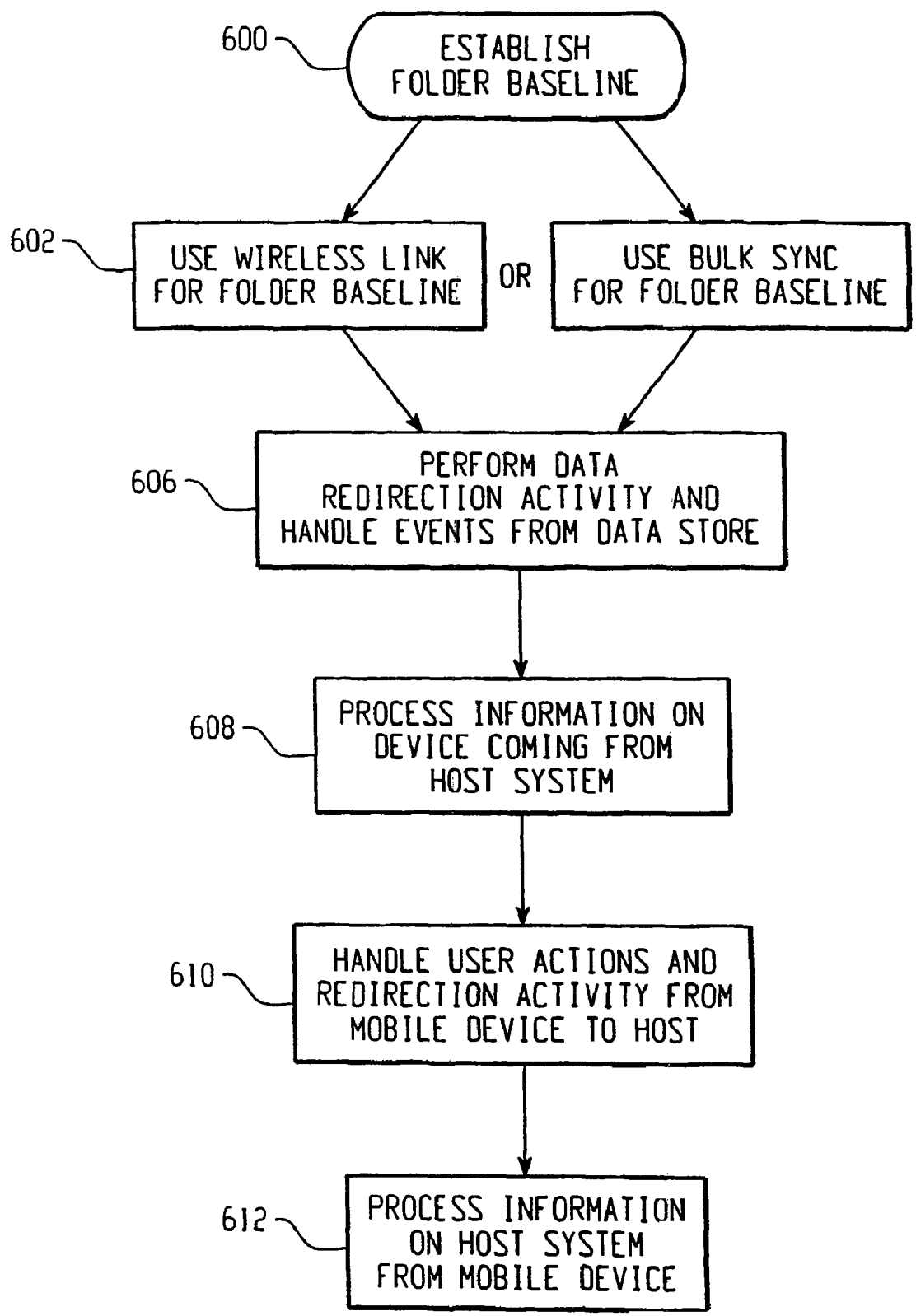
FIG. 21 is a flow chart showing an overview of the steps needed to perform over the air folder synchronization.

Turning now to FIG. 21 there is an overview flow chart of the steps necessary to allow a message server and a mobile device to maintain their respective folder hierarchies in synchronization. The first step 600 is to establish a folder baseline or starting point between the two devices. As discussed in the first section this requires first that the folders be assigned Ids and the user selects which folders should be mirrored between the two systems. Depending on wireless bandwidth and costs the user has two methods they might choose to establish the baseline. In the preferred embodiment the wireless link is used 602 for exchanging the selected folders to be mirrored between the two systems. This step is the same as shown in FIG. 7, step 144 where the host system sends each folder one by one to the mobile over the air. Each folder comes as a 'folder update' command and includes a folder Id for later use. Alternatively, the user must perform a bulk synchronization step 604, either via a serial link or high-speed land line like over the Internet using a TCP/IP connection to the host. The bulk method 604 is described in detail through FIGS. 7, 8, 9 and 10. In the bulk method 604 the user might also choose to have all the data items within the folders also moved to the mobile device 24. In the over the air method 602 normally only the folders would be sent across and only new data messages would be sent to the mobile device 24 to populate the folders.

On the folder baseline has been set between the message server 500 and the mobile device 24, the normal process of redirecting data items between the host system 10 and the mobile device 24 can take place 606. This was thoroughly described in FIGS. 1, 2, 3, 4 and 5 in the first section of this patent. Additionally the host must also handle events coming from the data store 606, which are highlighted in FIG. 25. This covers events to the data store like local changes performed by secretaries, co-workers or system administrators. Newly arriving data items and changes to the data store can trigger the wireless component 506, within the message server 500, to send message and commands to the mobile device 24. These wireless component 506 messages and commands must then be processed 608 by the mobile device 24. These events include new data items, new folders, folder name changes, folder deletes, moving data items between folders and other similar synchronization commands for folder management, these are described in FIG. 22. As the user receives new data items they perform their own commands and actions on the data items. The mobile device 24 must then handle user actions and redirection activities 610, these are described in FIG. 23. Finally the host must deal with the user's actions on the mobile device 24, including new data items 612. This final step is described in detail in FIG. 24. In summary the goal of the over the air system is to mirror actions on either the host system 10 or the mobile device 24. Once the message has been moved or changed on either the mobile device 24 or the host system 10, the redirector preferably attempts to move the identical message to the corresponding folder on the other end to provide a true mirrored (i.e., synchronized) organization of information. The preferred steps of maintaining an end-to-end synchronized folder hierarchy are referred hereinafter to as the "over-the-air-move" process.

Figure 22B:
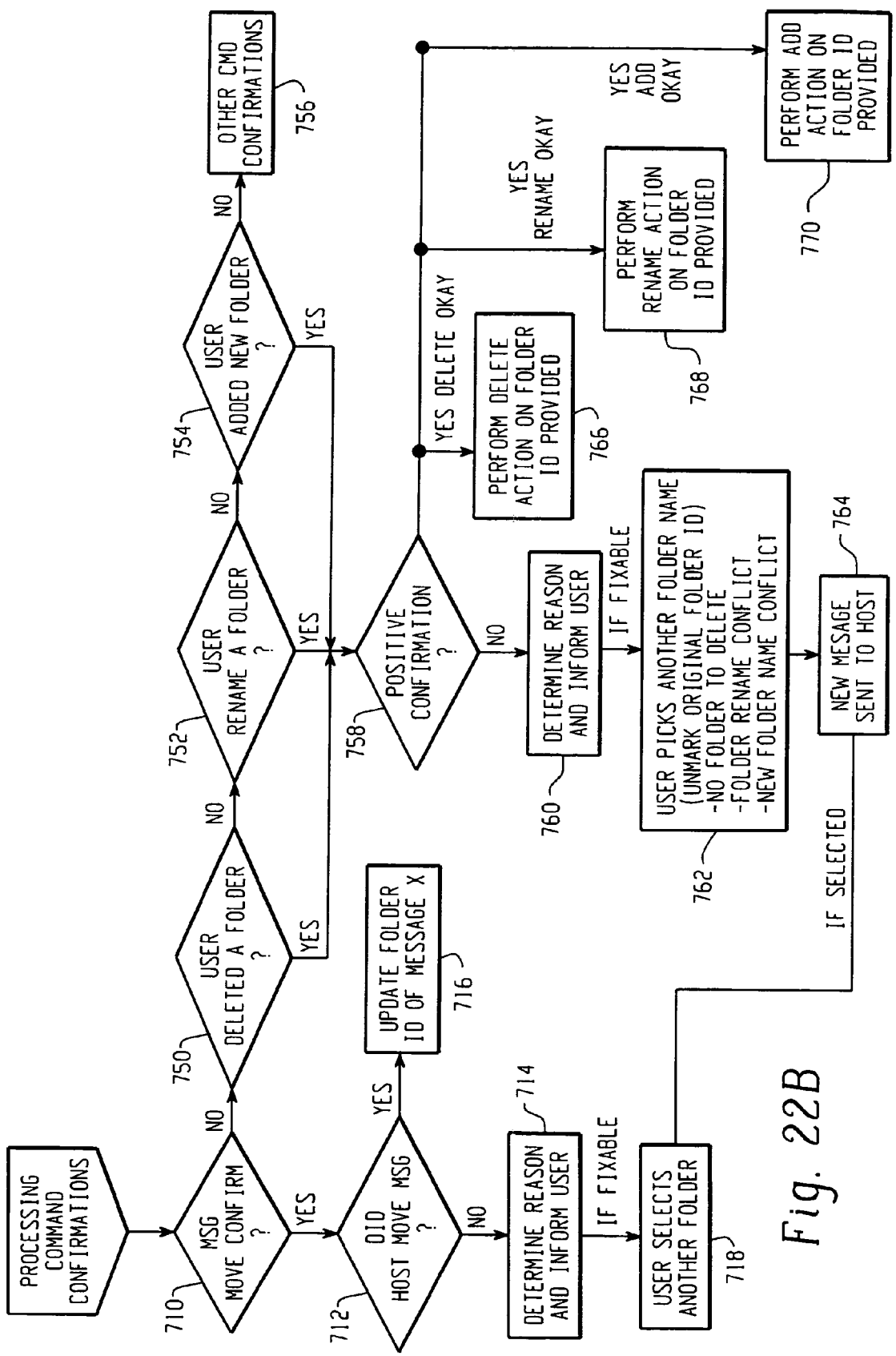
FIG. 22 is a flow chart showing the steps of acting upon messages arriving from the host system at the device.

Referring now to FIGS. 22a and 22b these figures highlight the steps that take place when incoming host information is received at the mobile device 24. The types of data items and commands from the wireless component 506 running within the message server 500 have been broken into 3 main groupings. The first grouping is for processing new data items 700 arriving into mobile device 24. These are not dealt with in detail as it is outside the scope of this patent. The second grouping is to process command confirmations 702. Command confirmations arrive for many events, but the most important ones related to folder actions that had been previously sent by the mobile device. Finally the third grouping is for specific folder commands 704 arriving from the host system 10.

Turning now to step 700 of FIG. 22a there is a test to see if the information arriving from the host system 10 is a new data item. If the item is a new data item it is inserted into the correct folder in the data store and the user is informed that the item has been added 708. The data item could be an e-mail message, a calendar entry, a contact name, an action item, an expense entry, a database record, a MP3 sound recording, a video clip or some other form of data that is being managed on the mobile device 24 in a folder hierarchy. Then the user is notified of the new items arrival following whatever configured notification methods selected by the user. As one skilled in the art can appreciate there are many steps here but they are not included, as they don't directly affect the real-time synchronization of folder hierarchies.

If the information from the host is not a new data item the invention checks for a Folder Command 702. If the information is a folder command 702 then a series of checks are performed to see what change the host has performed on a folder. If the information is not a folder command 702 there is a test to see if the item is a command confirmation 704. If it is a command confirmation 704 the invention proceeds to FIG. 22b presented later in this patent 720. If it is not a command confirmation 704 then further checks could be performed for other host information messages 706.

If the host has sent a folder command 702 then there are 4 main checks to see which folder operation is required. These four checks include the creation of a new folder 722, the deletion of a folder 724, the renaming of a folder 726 or a movement of a message between folders 728. The first check that is performed is to see if a new folder has been created 722 if the folder command matches this then the software on the device checks to see if the folder already exists on the device 732. This would be a rare situation but it is possible the user creates a folder on the mobile device 24 at about the same time that someone creates a similar folder on the host system 10. If this does happen then a negative response is sent back to the host system 734. If the folder does not exist then the new folder is created 734 and a positive confirmation is sent to the host 742 to confirm the create was successful. If possible this confirmation is delayed for a few minutes in an attempt to piggyback it with real data that might be leaving the mobile device 24. The next folder command check is for a delete folder command 724. In this situation a test is performed to see if the folder still exists 732 on the device. Naturally it is possible the user has already removed it at the same time as the host is removing it. If the folder is already gone an negative confirmation is sent to the host 736. Otherwise the folder is removed 738 and a positive confirmation is sent to the host 742. The third: test for a folder command checks to see if the host has renamed a folder 726. In this case the same test is preformed to confirm the folder still exists 732. It might have been deleted or renamed already to something different. If the folder with the same Id does not exist a negative confirmation is sent back to the host 736, otherwise the folder is renamed 740 and a positive confirmation is returned to the host 742.

Finally the software checks to see if a move message command 728 was requested by the host. If it was not this then some other command may have been sent from the host 730 that is outside the description for this invention. If it was a move message command 728 the software first checks to ensure the message Id and Folder Ids still exist 744 on the mobile device 24. If either the message is not on the device, or the destination folder is not present a negative response is sent to the host 746. Otherwise a tag is created with the new folder Id 748, the message is updated with the new folder Id 749 and a positive confirmation is sent to the host 742.

If the message from the host system 10 is a command confirmation 704 then the command must be processed, as shown in FIG. 22b. The types of confirmations are directly related to the actions performed by the user in FIG. 23. That means for every action the user performs on messages and folders the host will return a confirmation for that action. The first test that is performed in FIG. 22b is to see if a confirmation for a message move has been received 710. If it is then a further check is performed to see if the host did move the message successfully 712. If the message was moved okay then the message folder Id is updated with the new folder Id as accepted by the host 716. If the message moved failed the software reviews the reasons why it failed 714. If the problem is fixable, for example the destination folder had been removed or renamed at the host system 10, the user is allowed to pick another folder 718 to file the message into. If they do select another folder an additional message is sent to the host issuing another message move command 755.

If the command was not a message move a test is performed to see if the confirmation is for a folder deletion action 750. If it is a folder delete confirmation a further check is performed to see if it was a positive confirmation 758. If the delete was successful on the host the same action is performed on the indicated folder Id 766. Otherwise the delete failed for some reason so the reason is determined from the host message 760. If the problems if fixable the user may be able to pick another folder to delete or cancel their delete command 762. Whatever happens the original folder that was marked for deletion is unmarked. The next confirmation command test is to see if the user had renamed a folder 752. If this was the command a test is performed to see if the confirmation is positive 758. If the rename was successful the rename action is performed on the folder Id provided 768. If the rename failed a check is performed to see if the problem is fixable, i.e. can the user make another selection 760? If so the user is given a chance to try another name change on the same folder 762. If they do try another name, since the first one may not have been unique, another message is sent to the host 764. Finally the final test on the command confirmation is to see if the user added a new folder on the device 754. If this was not the command other command tests are performed 756. If it was an add command confirmation then the software checks to see if the confirmation is positive 758. If it was positive the new folder is added and the user is given full access to the folder for filing message and data into 770. Otherwise a further check is performed to see why the add request failed 760. If the name was in conflict and it can be corrected by the user 762, they are allowed to enter a new name and message is sent to the host 764.

Figure 23A:
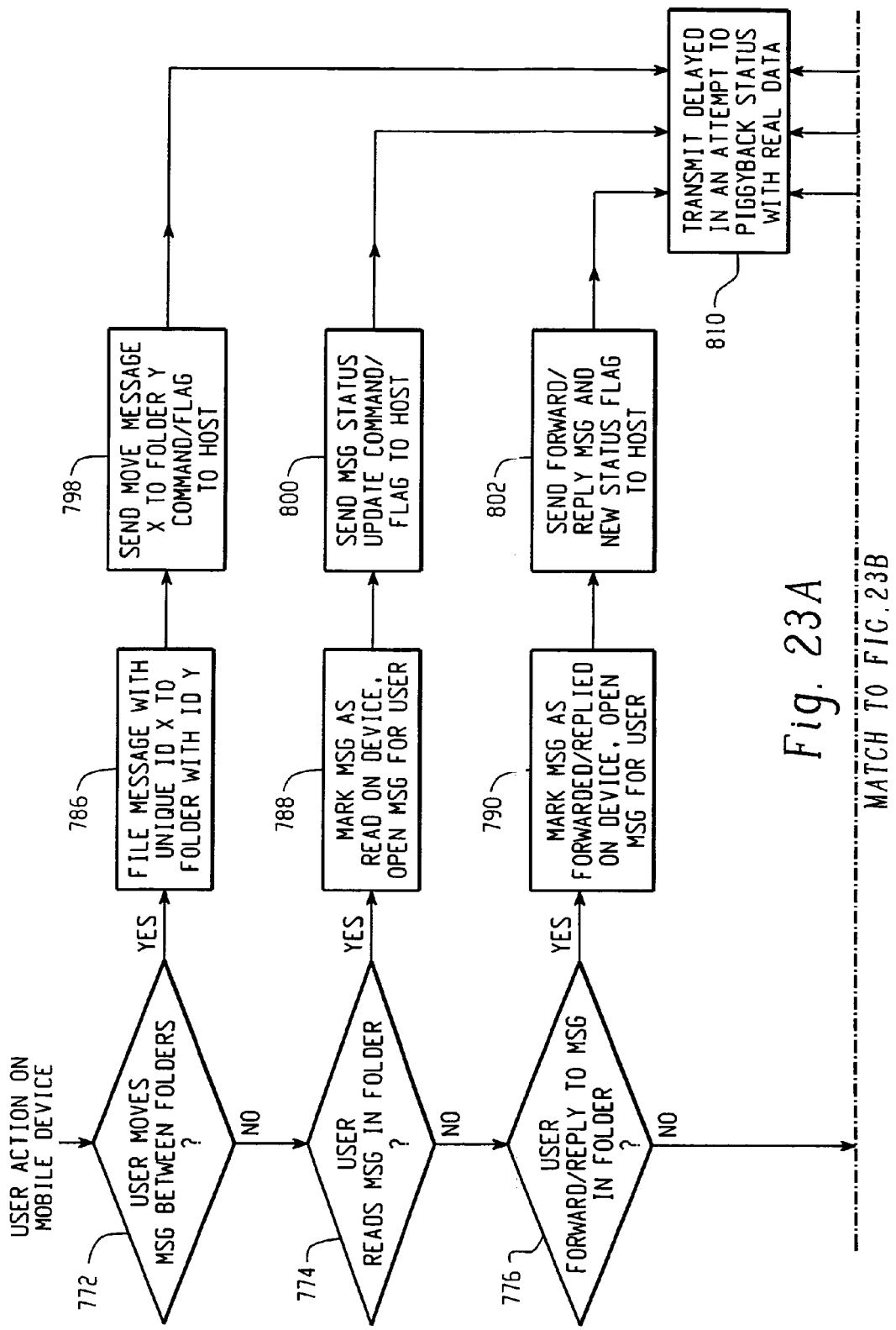
FIG. 23 is a flow chart showing possible user actions and some of the actions resulting from important user functions.
Figure 23B:
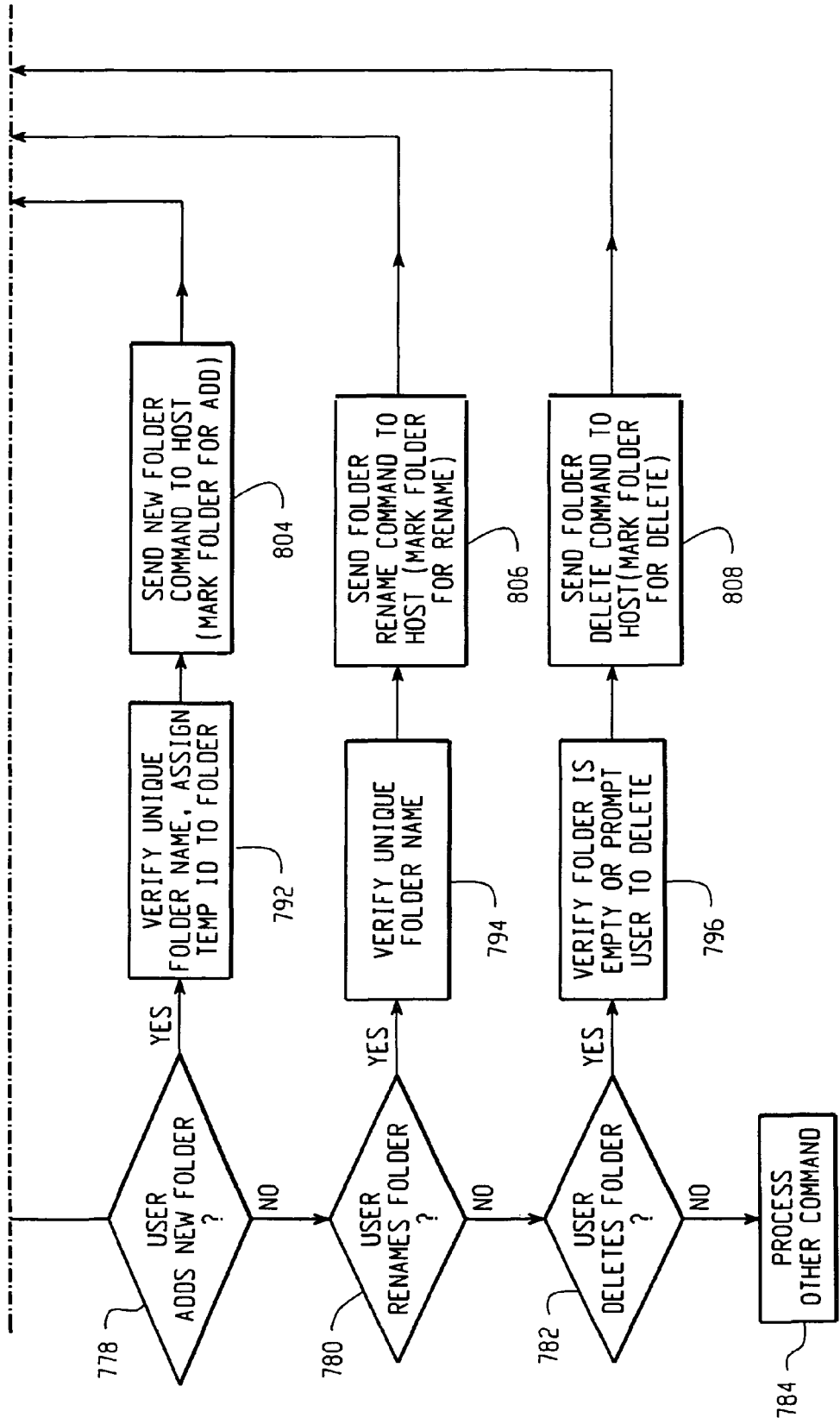

Turning now to FIG. 23 there is a flow chart illustrating what the mobile device 24 does with user actions. On a mobile device there could be hundreds of functions available for the user, in this patent the focus will be made on folder and message related activities. The main actions that will be examined, which match the command confirmations from the host, involve moving messages between folders 772, reading a message within a folder 774, forwarded or replying to a message 776, adding a new folder on the device 778, renaming a folder on the device 780 and deleting a folder on the device 782.

If the user wants to move a message between folders 772 the message in question, labeled X, is flagged with the new folder Id 'Y' 786 and a move message x to folder y command or flag is sent to the host 798. The flag might be used when piggybacking with a real message, or a command is sent when no data is being sent to the host. To assist in this piggybacking the transmission of the request is optionally deleted to wait for data from the user going to the host 810. The delete may only be for a few sections but it could save valuable battery and transmit power. If the user action is not a message move a check is performed to see if the user is simply reading a message 774. If the user is reading the message then the message is marked as read on the handheld and the message is opened for the user 788. As the user is reviewing the message a status update command/flag is generated to send to the host 800. The transmission of this flag or command is delayed to the host just in case they reply or forward the message and generate real traffic going to the host. The user might also be replying or forwarding a message 776 as part of the reading of a new or old message. In this case the message is marked as replied-to or forwarded and the user attaches their comments 790. The software also generated a flag that will be sent with the forwarded or replied message 802. The message and the flag are then transmitted to the host system 810.

The user might also be performing folder operations on the handheld device, for example the user might add a folder 778. In this case the folder name selected by the user is verified on the device to ensure it is unique and a temporary folder Id is generated 792. Once this command is given to the host the final folder Id might be changed by the host to ensure it is unique. The software then sends a Add Folder Command to the host 804, which is piggybacked if possible with other data being sent to the host 810. The user might decide to rename a folder on the device 780. In this case the folder name is again verified to be unique 794 and a Rename Folder Command is generated 806 for transmission to the host system 810. Finally the user might decide to delete a folder on the device 782. The first check in this case is to ensure the folder is empty before the user deletes it 796. One skilled in the art can appreciate that it would be easy to simply prompt the user to override this restriction and delete all message in the folder before deleting the folder. After ensuring the user is accepted the action, the folder is marked for deletion, a command is generated for the host system 808 and is then transmitted to the host 810.

Figure 24A:
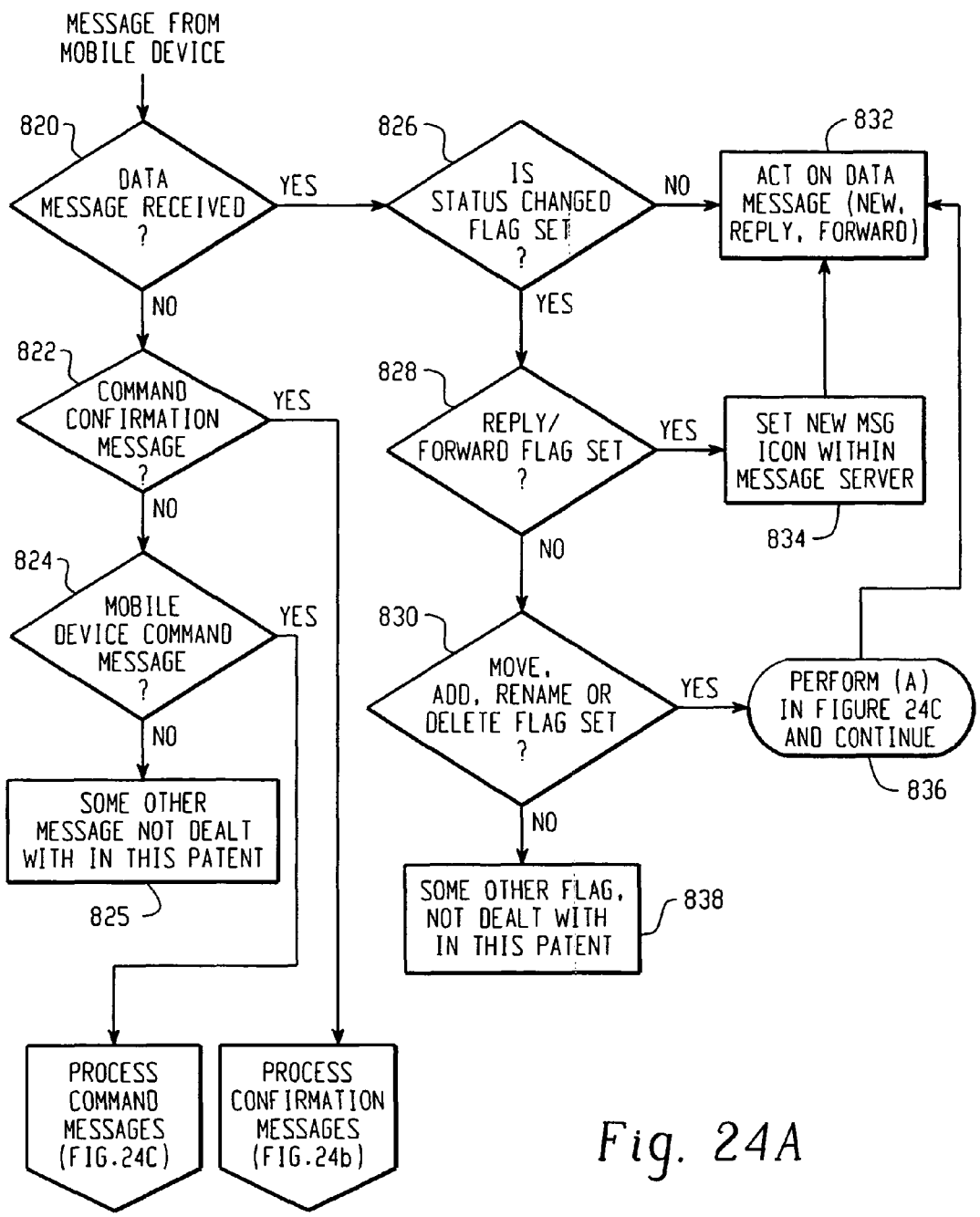
FIG. 24 is a flow chart showing how the host system reacts to messages and commands arriving from the mobile device.

Turning now to FIG. 24a there is a data flow diagram for how the host deals with messages from mobile devices. For the sake of this patent these messages have been broken into three types: data messages received 820, command confirmations 822 and command messages 824. If the message from the mobile device 24 is a command message 820 then the status-changed flag is tested 826. If the status-changed flag is not set then the message is processed as requested 832, as either a new message, a reply message or a forwarded message. If the status has changed then there is an additional check to see if the reply or forward flag has been set 828. If the flag indicates a reply or forward on the message, the message icon representing the message is modified 834 before the message is acted upon 832. If the reply or forward flag is not set then the move, add, rename and delete flag is checked. If one of these flags is not set then there must be other flags that could be set 838 not dealt with in this patent. If one of these flags is set the data flow proceeds to FIG. 24c to process the flag before returning to process the actual data 832.

If the message is not a data message then a further test is performed to see if the message is a command confirmation 822. If it is then the data flow proceeds to FIG. 24b to process the confirmation. Otherwise if the message was not a command confirmation 822 the software tests for a mobile device command message 824. If the mobile device has sent a command the data flow proceeds to FIG. 24c to process that command. Otherwise there is a message from the mobile that is not part of this patent 825.

Figure 24B:
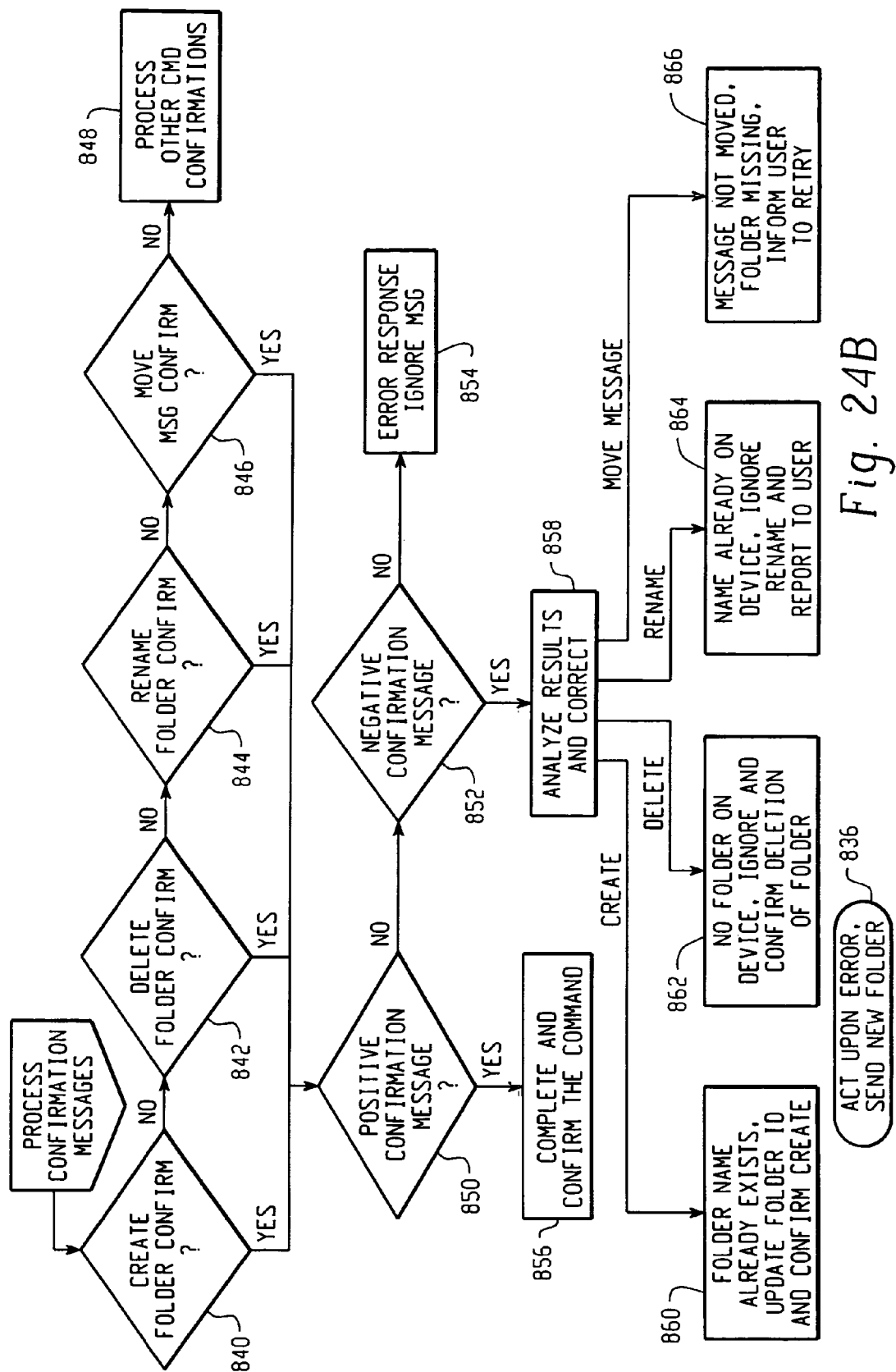
Figure 25A:
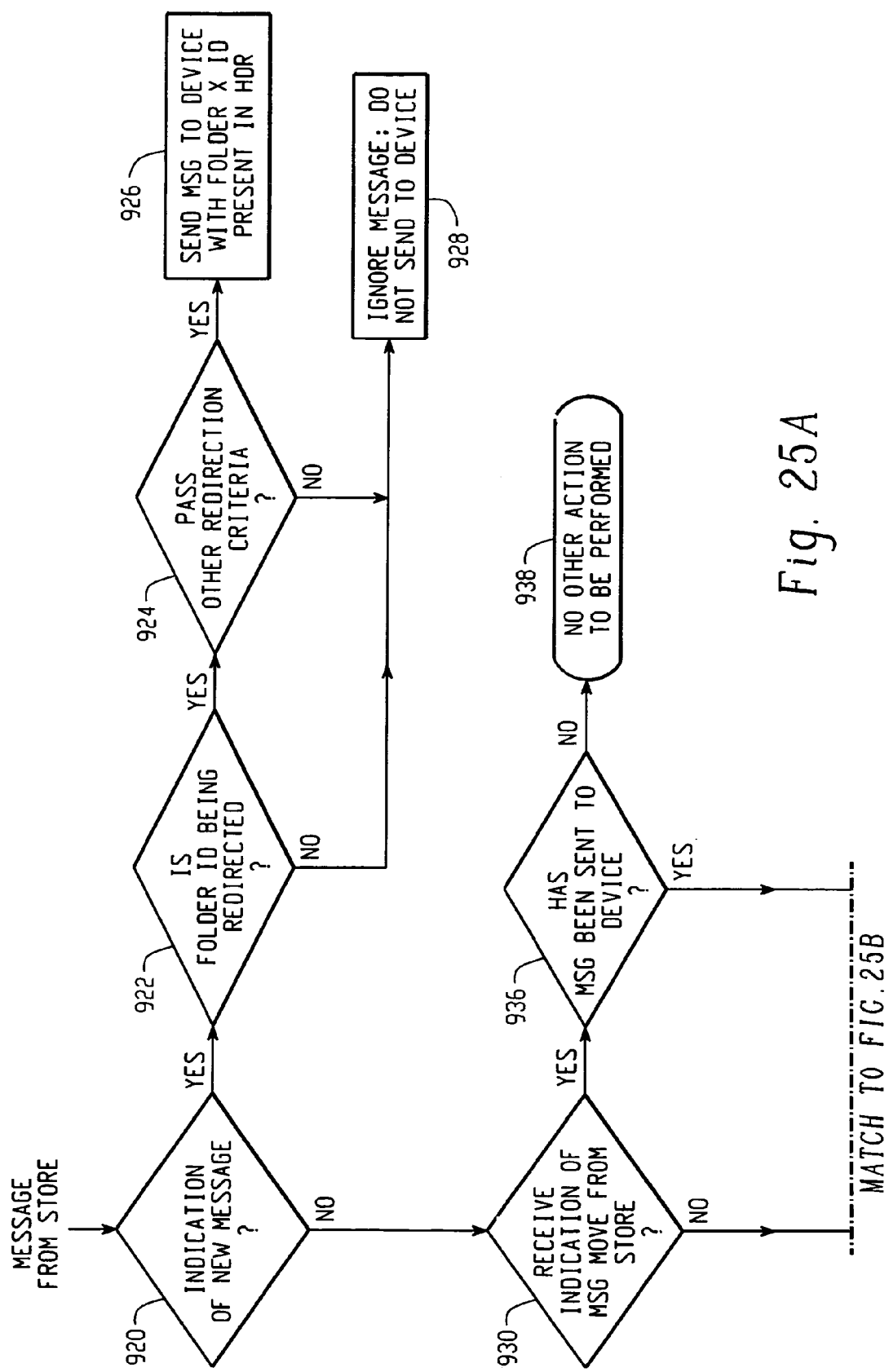
FIG. 25 is a flow chart showing how the host reacts to messages arriving from the host system.
Figure 25B:
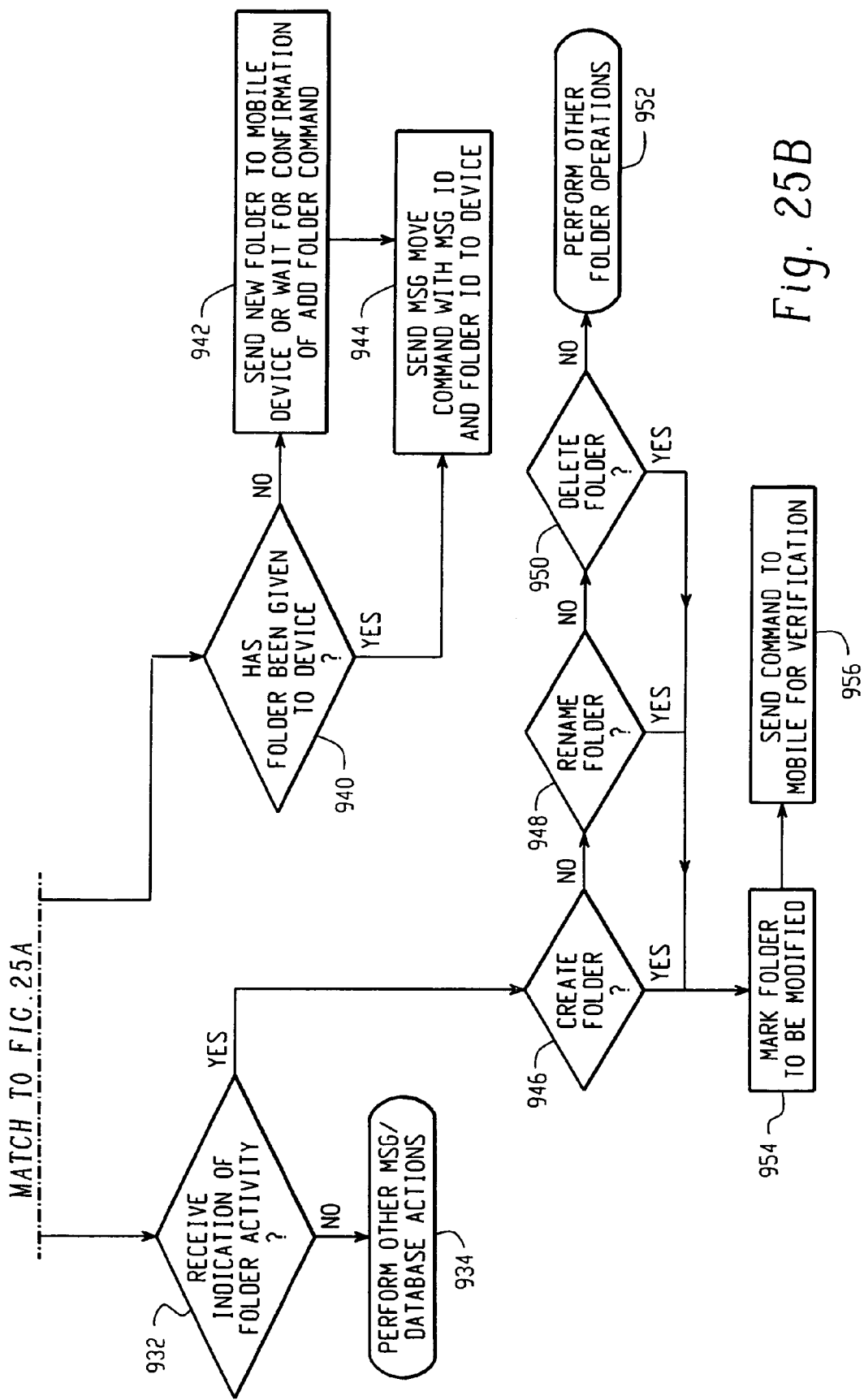

Turning now to FIG. 24b the host processes a command confirmation 822 first detected in FIG. 24a. These confirmations originated with commands sent by the host for actions that took place in the data store, see FIGS. 25a and 25b. The actions include creating a folder 840, deleting a folder 842, renaming a folder 844 and a message move between folders 846. There could be other confirmations 848, but they are not dealt with within this patent disclosure. For call command confirmations listed above there can either be a positive confirmation 850, or a negative confirmation 852. If it is not one of these two choice then the response is in error and will be ignored 854. When the command confirmation is a positive one, the operation can be completed. This means a created folder can be made available for all normal folder operations, a deleted folder can be completely removed from the system, the renamed folder can be completed and the moved message can be fulfilled 856. If the confirmation is negative 852 then the result must be analyzed 858 to see if corrective action can be taken. For the create if the folder name already exists this can be considered a positive action, but the folder Id associated with the folder must be updated so that the mobile device 24 and the host system 10 both have the same folder Id for this newly created folder 860. If the delete failed it might be because the folder didn't exist on the device, i.e. the user had already deleted it. This error can be ignored and the folder in question can be removed 862. If the rename failed due to the name not being unique, then we could update the folder Id and take the rename or ignore the rename and inform the user/operator that the rename command has been ignored 864. Any necessary changes to the folder that must be undone should take place at this time. Finally if the move message failed it would be because the message or folder was absent off the device 866. If the message was absent from the device, i.e. the user had already deleted it, we should move the message anyway. If the folder was absent from the device the move should be aborted and the user/operator should be informed of the error.

Turning now to FIG. 24c the host must process a command that was first detected in FIG. 24a. These commands are the result of actions taken by the user on the mobile device 24. The actions include moving a message between folders 870, adding a new folder 886, renaming a folder 894 and deleting a folder 896. FIG. 24c can also be reached when the mobile device sets the status changed flag within a data message 872. In this case the flag is treated like a command and control is returned to the message processing code when the flag is handled.

If the command from the mobile user is a move message command 870 the software checks the message store to ensure the message Id provide is still in the folder indicated 872. If the message is missing then the command fails and a negative confirmation 908 is returned to the mobile device 24. Otherwise a check is made to ensure that the source folder and the destination folder is still in the message store 874. If one of the folders is missing a negative response is sent back to the mobile device 876. Otherwise the message is moved from one folder to another folder 878. If the move was successful 880 the folder id in the message is updated to the new folder Id and a positive confirmation is sent to the mobile device 882. Otherwise the move failed due to memory or some other serious error and a negative confirmation is sent to the mobile device 884.

If the command from the user was not a move command then the software checks for a folder add command 886. If a folder was added on the device the host checks to see if the folder exists already on the host 888. If the folder already exists on the host the software sends a negative confirmation, an error code and the folder Id of the folder that already has that name 892. If the folder does not exist the folder is created, assigned an Id as provided by the mobile, unless the Id is not unique in which case a new Id will be assigned 890. After this a positive confirmation is sent to the mobile user 904. If possible these confirmations are also piggybacked on real data messages 904. If the command was not an add command then a check is made to look for a rename folder command 894. If the command is a rename there is a check to see if the new folder name already exists on the host 898. If the source folder does not exist, or if the destination folder does exist 898 the rename command will fail and a negative confirmation will be sent to the mobile 892. If the source folder does exist, and the destination folder does not exist 898 the command is successful and the folder is renamed 902. After the renaming the host send a confirmation message to the mobile device 904. Finally the command might be a delete folder command 896, this is the last processed command in this patent otherwise other commands are handled in 906. When deleting a folder on the mobile device 24 there is a check to ensure the folder exists 898. If the folder does exist the folder is deleted from the host 900 and a positive confirmation is returned to the mobile 904. Otherwise the folder may already be deleted and the command fails 892. This type of failure is okay and the mobile can still go ahead and remove the folder.

Turning now to FIG. 25 there is a data flow diagram showing how the host deals with messages from the data store indicating changes. For this patent these changes are focused on just three main changes that include a new message arriving to the data store 920, a movement of messages between folders 930 and an indication that a folder has been modified 932. If a new message reaches the data store 920 the software receives a notification of this event. For one skilled in the art this type of indication is typical for message servers 500, database systems and certain mail servers like Microsoft's™ Exchange Server. The first test is to verify the folder that has received the data item is being redirected to the mobile user 922. If the user doesn't care about this folder the message is ignored 928. After this the software checks to ensure the message passes other redirection criteria, like the forwarding rules and trigger flags 924. If it does not pass this test then the message is again ignored 928. Otherwise the message is sent to the device with the folder Id where it was first placed 926.

If the message from the data store was not a new message then the software checks for an indication of a moved message 930. If a message has been moved between folders then a check is performed to see if the message has been previously sent to the mobile device 936. If the device never received the message there is no action to be performed 938. Otherwise there is a further check to ensure the folder has been given to the device 940. It is possible that an add folder command has been given to the device and the host is waiting for a confirmation. If not the new folder is sent to the device or the host waits for the confirmation before sending the message move command 942. If the folder is already on the device the host sends a message move command with the message Id and two folder Ids to the device 944. The device optionally needs the source folder Id and the destination folder Id to execute the command the fastest. Otherwise the mobile device could search for the message in all folders before moving it to the destination folder Id.

If the message from the data store is not a message move indication then a check is performed to see if there has been folder modification activity 932. If it is not folder modification activity 932 then it might be other data store messages 934 not dealt with in this patent. In the situation when a folder has been modified it could be a folder create 946, a folder rename 948 or a folder delete 950. If it is not one of these three then other processing logic handles folder changes not part of this patent 952. For all three commands the folder that has been modified is marked to indicate a change is pending 954. This will be used on the command confirmation to complete the change to the data store. Finally the host sends a command to the mobile for verification of the action 956.

Figure 26:
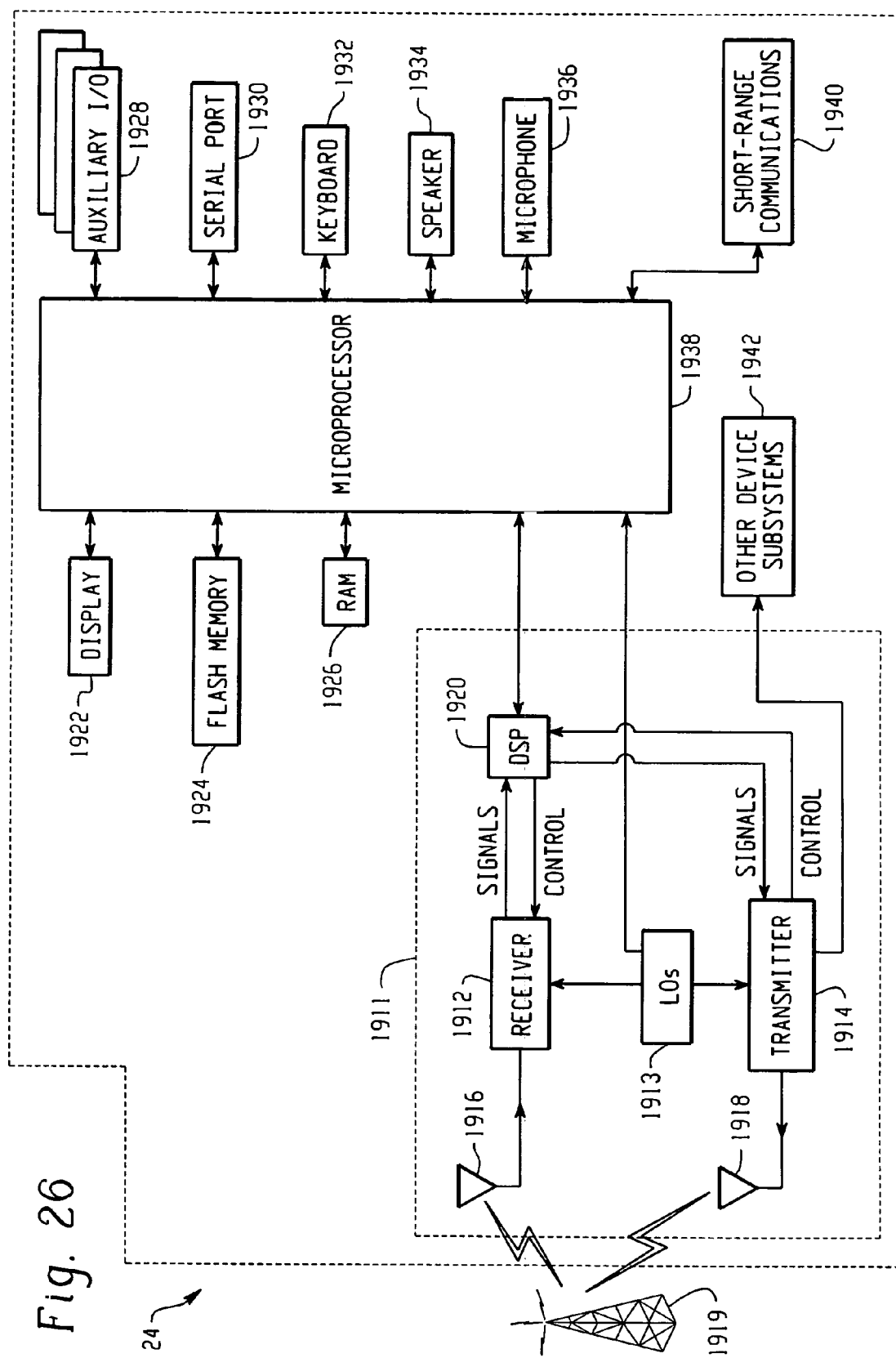
FIG. 26 is a block diagram of yet another mobile communication device 24 in which the instant invention may be implemented.

Turning now to FIG. 26 this is a block diagram of yet another mobile communication device 24 in which the instant invention may be implemented. The mobile communication device 24 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 24 is enabled for two-way communications, the device will incorporate a communication subsystem 1911, including a receiver 1912, a transmitter 1914, and associated components such as one or more, preferably embedded or internal, antenna elements 1916 and 1918, local oscillators (LOs) 1913, and a processing module such as a digital signal processor (DSP) 1920. As will be apparent to those skilled in the field of communications, the particular design of the communication subsystem 1911 will be dependent upon the communication network in which the device is intended to operate. For example, a device 24 destined for a North American market may include a communication subsystem 1911 designed to operate within the Mobitex™ mobile communication system or DataTAC™ mobile communication system, whereas a device 24 intended for use in Europe may incorporate a General Packet Radio Service (GPRS) communication subsystem 1911.

Network access requirements will also vary depending upon the type of network 1919. For example, in the Mobitex and DataTAC networks, mobile devices such as 24 are registered on the network using a unique personal identification number or PIN associated with each device. In GPRS networks however, network access is associated with a subscriber or user of a device 24. A GPRS device therefore requires a subscriber identity module (not shown), commonly referred to as a SIM card, in order to operate on a GPRS network. Without a SIM card, a GPRS device will not be fully functional. Local or non-network communication functions (if any) may be operable, but the device 24 will be unable to carry out any functions involving communications over network 1919. When required network registration or activation procedures have been completed, a device 24 may send and receive communication signals over the network 1919. Signals received by the antenna 1916 through a communication network 1919 are input to the receiver 1912, which may perform such common receiver functions as signal amplification, frequency down conversion, filtering, channel selection and the like, and in the example system shown in FIG. 26, analog to digital conversion. Analog to digital conversion of a received signal allows more complex communication functions such as demodulation and decoding to be performed in the DSP 920. In a similar manner, signals to be transmitted are processed, including modulation and encoding for example, by the DSP 920 and input to the transmitter 914 for digital to analog conversion, frequency up conversion, filtering, amplification and transmission over the communication network 1919 via the antenna 1918.

The DSP 1920 not only processes communication signals, but also provides for receiver and transmitter control. For example, the gains applied to communication signals in the receiver 1912 and transmitter 1914 may be adaptively controlled through automatic gain control algorithms implemented in the DSP 1920.

The device 24 preferably includes a microprocessor 1938 which controls the overall operation of the device. Communication functions, including at least data and voice communications, are performed through the communication subsystem 1911. The microprocessor 1938 also interacts with further device subsystems such as the display 1922, flash memory 1924, random access memory (RAM) 1926, auxiliary input/output (I/O) subsystems 1928, serial port 1930, keyboard 1932, speaker 1934, microphone 1936, a short-range communications subsystem 1940 and any other device subsystems generally designated as 1942.

Some of the subsystems shown in FIG. 26 perform communication-related functions, whereas other subsystems may provide "resident" or on-device functions. Notably, some subsystems, such as keyboard 1932 and display 1922 for example, may be used for both communication-related functions, such as entering a text message for transmission over a communication network, and device-resident functions such as a calculator or task list.

Operating system software used by the microprocessor 1938 is preferably stored in a persistent store such as flash memory 1924, which may instead be a read only memory (ROM) or similar storage element (not shown). Those skilled in the art will appreciate that the operating system, specific device applications, or parts thereof, may be temporarily loaded into a volatile store such as RAM 1926. It is contemplated that received communication signals may also be stored to RAM 1926.

The microprocessor 1938, in addition to its operating system functions, preferably enables execution of software applications on the device. A predetermined set of applications that control basic device operations, including at least data and voice communication applications for example, will normally be installed on the device 24 during manufacture. A preferred application that may be loaded onto the device may be a personal information manager (PIM) application having the ability to organize and manage data items relating to the device user such as, but not limited to e-mail, calendar events, voice mails, appointments, and task items. Naturally, one or more memory stores would be available on the device to facilitate storage of PIM data items on the device. Such PIM application would preferably have the ability to send and receive data items, via the wireless network. In a preferred embodiment, the PIM data items are seamlessly integrated, synchronized and updated, via the wireless network, with the device user's corresponding data items stored or associated with a host computer system. Further applications may also be loaded onto the device 24 through the network 1919, an auxiliary I/O subsystem 1928, serial port 1930, short-range communications subsystem 1940 or any other suitable subsystem 1942, and installed by a user in the RAM 1926 or preferably a non-volatile store (not shown) for execution by the microprocessor 1938. Such flexibility in application installation increases the functionality of the device and may provide enhanced on-device functions, communication-related functions, or both. For example, secure communication applications may enable electronic commerce functions and other such financial transactions to be performed using the device 24.

In a data communication mode, a received signal such as a text message or web page download will be processed by the communication subsystem 1911 and input to the microprocessor 1938, which will preferably further process the received signal for output to the display 1922, or alternatively to an auxiliary I/O device 1928. A user of device 24 may also compose data items such as email messages for example, using the keyboard 1932, which is preferably a complete alphanumeric keyboard or telephone-type keypad, in conjunction with the display 1922 and possibly an auxiliary I/O device 1928. Such composed items may then be transmitted over a communication network through the communication subsystem 1911.

For voice communications, overall operation of the device 24 is substantially similar, except that received signals would preferably be output to a speaker 1934 and signals for transmission would be generated by a microphone 1936. Alternative voice or audio I/O subsystems such as a voice message recording subsystem may also be implemented on the device 24. Although voice or audio signal output is preferably accomplished primarily through the speaker 1934, the display 1922 may also be used to provide an indication of the identity of a calling party, the duration of a voice call, or other voice call related information for example.

The serial port 1930 in FIG. 2 would normally be implemented in a personal digital assistant (PDA)-type communication device for which synchronization with a user's desktop computer (not shown) may be desirable, but is an optional device component. Such a port 1930 would enable a user to set preferences through an external device or software application and would extend the capabilities of the device by providing for information or software downloads to the device 24 other than through a wireless communication network. The alternate download path may for example be used to load an encryption key onto the device through a direct and thus reliable and trusted connection to thereby enable secure device communication.

A short-range communications subsystem 1940 is a further optional component which may provide for communication between the device 1924 and different systems or devices, which need not necessarily be similar devices. For example, the subsystem 1940 may include an infrared device and associated circuits and components or a Bluetooth™ communication module to provide for communication with similarly-enabled systems and devices.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

It is claimed:

1. A method of redirecting information between a messaging host system and a wireless mobile data device that is associated with a computer connected over a network to the messaging host system, the method comprising:
    receiving a notification at a redirector component associated with the messaging host system indicating receipt of a mail item by the messaging host system, wherein the mail item is addressed to a data store associated with the messaging host system that is viewable via the computer;
    processing the mail item at the redirector component to add identification information associated with the wireless mobile data device;
    sending the mail item from the redirector component to the wireless mobile data device over a wireless network;
    receiving a read command from the wireless mobile data device at the redirector component indicating the mail item was read at the wireless mobile data device; and
    interfacing the read command to the messaging host system by the redirector component such that a message status change indicator is associated with the mail item and is viewable via the computer, wherein the message status change indicator indicates that the mail item was read and further wherein the message status change indicator is a read icon that is associated with the mail item and is viewable via the computer and the read icon provides an indication that the mail item was read at the wireless mobile data device.

2. The method as recited in claim 1 wherein the redirector component is operating on the messaging host system.

3. The method as recited in claim 1 wherein the redirector component is operating on a host system that is coupled to the messaging host system via the network.

4. The method as recited in claim 1 wherein the processing step further comprises encrypting the mail item.

5. The method as recited in claim 1 wherein the processing step further comprises compressing the mail item.

6. The method as recited in claim 1 wherein the processing step further comprises encoding the mail item.

7. The method as recited in claim 1 wherein the processing step further comprises encoding the mail item using Multi-purpose Internet Mail Extensions.

8. The method as recited in claim 1 wherein the step of receiving a read command from the wireless mobile data device at the redirector component further comprises receiving the read command as one of a plurality of commands bundled together for transmission from the wireless mobile data device to the redirector component.

9. The method as recited in claim 8 wherein the step of receiving the read command as one of a plurality of commands bundled together for transmission from the wireless mobile data device to the redirector component further comprises receiving the bundled commands after a predetermined delay period.

10. A system for redirecting information between a messaging host system and a wireless mobile data device that is associated with a computer connected over a network to the messaging host system, the system comprising:
    means for processing a notification received from the messaging host system, the notification indicating receipt of a mail item by the messaging host system, wherein the mail item is addressed to a data store associated with the messaging host system that is viewable via the computer;
    means for processing the mail item to add identification information associated with the wireless mobile data device;
    means for sending the mail item to the wireless mobile data device over a wireless network;
    means for receiving a read command from the wireless mobile data device indicating the mail item was read at the wireless mobile data device; and
    means for interfacing the read command to the messaging host system such that a message status change indicator is associated with the mail item and is viewable via the computer, wherein the message status change indicator indicates that the mail item was read and further wherein the message status change indicator is a read icon that is associated with the mail item and is viewable via the computer and the read icon provides an indication that the mail item was read at the wireless mobile data device.

11. The system as recited in claim 10 wherein the means for processing a mail item further comprises means for encrypting the mail item.

12. The system as recited in claim 10 wherein the means for processing a mail item further comprises means for compressing the mail item.

13. The system as recited in claim 10 wherein the means for processing a mail item further comprises means for encoding the mail item.

14. The system as recited in claim 10 wherein the means for processing a mail item further comprises means for encoding the mail item using Multipurpose Internet Mail Extensions.

15. The system as recited in claim 10 wherein the means for receiving a read command from the wireless mobile data device further comprises means for receiving the read command as one of a plurality of commands bundled together for transmission from the wireless mobile data device to the redirector component.

16. The system as recited in claim 15 wherein the means for receiving the read command as one of a plurality of commands bundled together for transmission from the wireless mobile data device further comprises means for receiving the bundled commands after a predetermined delay period.

17. A non-transitory computer-accessible medium having a sequence of instructions which, when executed by a processing entity, effectuate redirection of information between a messaging host system and a wireless mobile data device that is associated with a computer connected over a network to the messaging host system, the computer-accessible medium having stored thereon:
 a code portion for processing a notification received from the messaging host system, the notification indicating receipt of a mail item by the messaging host system, wherein the mail item is addressed to a data store associated with the messaging host system that is viewable via the computer;
 a code portion for processing the mail item to add identification information associated with the wireless mobile data device;
 a code portion for sending the mail item to the wireless mobile data device over a wireless network;
 a code portion for receiving a read command from the wireless mobile data device indicating the mail item was read at the wireless mobile data device; and
 a code portion for interfacing the read command to the messaging host system such that a message status change indicator is associated with the mail item and is viewable via the computer, wherein the message status change indicator indicates that the mail item was read and further wherein the message status change indicator is a read icon that is associated with the mail item and is viewable via the computer and the read icon provides an indication that the mail item was read at the wireless mobile data device.

18. The computer-accessible medium as recited in claim 17 wherein the code portion for processing a mail item further comprises a code portion for encrypting the mail item.

19. The computer-accessible medium as recited in claim 17 wherein the code portion for processing a mail item further comprises a code portion for compressing the mail item.

20. The computer-accessible medium as recited in claim 17 wherein the code portion for processing a mail item further comprises a code portion for encoding the mail item.

21. The computer-accessible medium as recited in claim 17 wherein the code portion for processing a mail item further comprises a code portion for encoding the mail item using Multipurpose Internet Mail Extensions.

22. The computer-accessible medium as recited in claim 17 wherein the code portion for receiving a read command from the wireless mobile data device further comprises a code portion for receiving the read command as one of a plurality of commands bundled together for transmission from the wireless mobile data device to the redirector component.

23. The computer-accessible medium as recited in claim 22 wherein the code portion for receiving the read command as one of a plurality of commands bundled together for transmission from the wireless mobile data device further comprises a code portion for receiving the bundled commands after a predetermined delay period.

* * * * *